US010540178B2

United States Patent
Mekkat et al.

(10) Patent No.: US 10,540,178 B2
(45) Date of Patent: *Jan. 21, 2020

(54) ELIMINATING REDUNDANT STORES USING A PROTECTION DESIGNATOR AND A CLEAR DESIGNATOR

(71) Applicant: Intel Corporation, Santa Clara, CA (US)

(72) Inventors: Vineeth Mekkat, San Jose, CA (US); Youfeng Wu, Palo Alto, CA (US); Sebastian Winkel, Los Altos, CA (US); Oleg Margulis, Los Gatos, CA (US)

(73) Assignee: Intel Corporation, Santa Clara, CA (US)

( * ) Notice: Subject to any disclaimer, the term of this patent is extended or adjusted under 35 U.S.C. 154(b) by 500 days.

This patent is subject to a terminal disclaimer.

(21) Appl. No.: 15/265,587

(22) Filed: Sep. 14, 2016

(65) Prior Publication Data

US 2018/0074827 A1 Mar. 15, 2018

(51) Int. Cl.
*G06F 12/0875* (2016.01)
*G06F 9/30* (2018.01)
(Continued)

(52) U.S. Cl.
CPC ...... *G06F 9/30043* (2013.01); *G06F 9/30181* (2013.01); *G06F 9/328* (2013.01);
(Continued)

(58) Field of Classification Search
CPC ..... G06F 9/00–3897; G06F 15/00–825; G06F 8/00–78; G06F 9/30181; G06F 9/30043; G06F 9/3834; G06F 9/328
See application file for complete search history.

(56) References Cited

U.S. PATENT DOCUMENTS 5,737,758 A * 4/1998 Merchant ............ G06F 12/0831
711/146
6,128,775 A * 10/2000 Chow ...................... G06F 8/441
717/156
(Continued)

FOREIGN PATENT DOCUMENTS

WO WO-0104746 A1 * 1/2001 ............ G06F 9/3802

OTHER PUBLICATIONS

X. Zhang, Q. Guo, Y. Chen, T. Chen and W. Hu, "Hermes: A fast cross-ISA binary translator with post-optimization," 2015 IEEE/ACM International Symposium on Code Generation and Optimization (CGO), San Francisco, CA, 2015, pp. 246-256. (Year: 2015).*

(Continued)

*Primary Examiner* — Keith E Vicary
(74) *Attorney, Agent, or Firm* — Alliance IP, LLC

(57) ABSTRACT

A processor for redundant stores includes a front end including circuitry to decode instructions from an instruction stream, a data cache unit including circuitry to cache data for the processor, a binary translator, and a memory execution unit. The binary translator includes circuitry to identify a first region of the instruction stream including a redundant store, mark a first starting instruction of the first region with a protection designator, mark a first ending instruction of the first region with a clear designator, and store an amended instruction stream with the markings. The memory execution unit includes circuitry to track the first redundant store based on the protection designator and the clear designator to eliminate the first redundant store.

13 Claims, 34 Drawing Sheets

(51) Int. Cl.
*G06F 9/38* (2018.01)
*G06F 9/32* (2018.01)

(52) U.S. Cl.
CPC ........ *G06F 9/3834* (2013.01); *G06F 12/0875* (2013.01); *G06F 2212/452* (2013.01)

(56) References Cited

U.S. PATENT DOCUMENTS

| | | | | |
|---|---|---|---|---|
| 6,826,679 | B1* | 11/2004 | Laurenti | G06F 9/30047 |
| | | | | 712/225 |
| 2004/0015927 | A1* | 1/2004 | Haber | G06F 8/443 |
| | | | | 717/155 |
| 2006/0218542 | A1* | 9/2006 | Liu | G06F 8/443 |
| | | | | 717/154 |
| 2010/0058000 | A1* | 3/2010 | Moyer | G06F 12/0831 |
| | | | | 711/146 |
| 2010/0169870 | A1* | 7/2010 | Dice | G06F 8/4441 |
| | | | | 717/141 |
| 2011/0167416 | A1* | 7/2011 | Sager | G06F 8/4442 |
| | | | | 717/149 |
| 2016/0364330 | A1* | 12/2016 | Hughes | G06F 12/0844 |

OTHER PUBLICATIONS

Carlos Molina, Antonio González, and Jordi Tubella. Reducing Memory Traffic via Redundant Store Instructions. In Proceedings of the 7th International Conference on High-Performance Computing and Networking (HPCN Europe '99) (Year: 1999).*

Intel Corporation, IA-32 Intel® Architecture Software Developer's Manual—vol. 2: Instruction Set Reference, 978 pages, 2003.

* cited by examiner

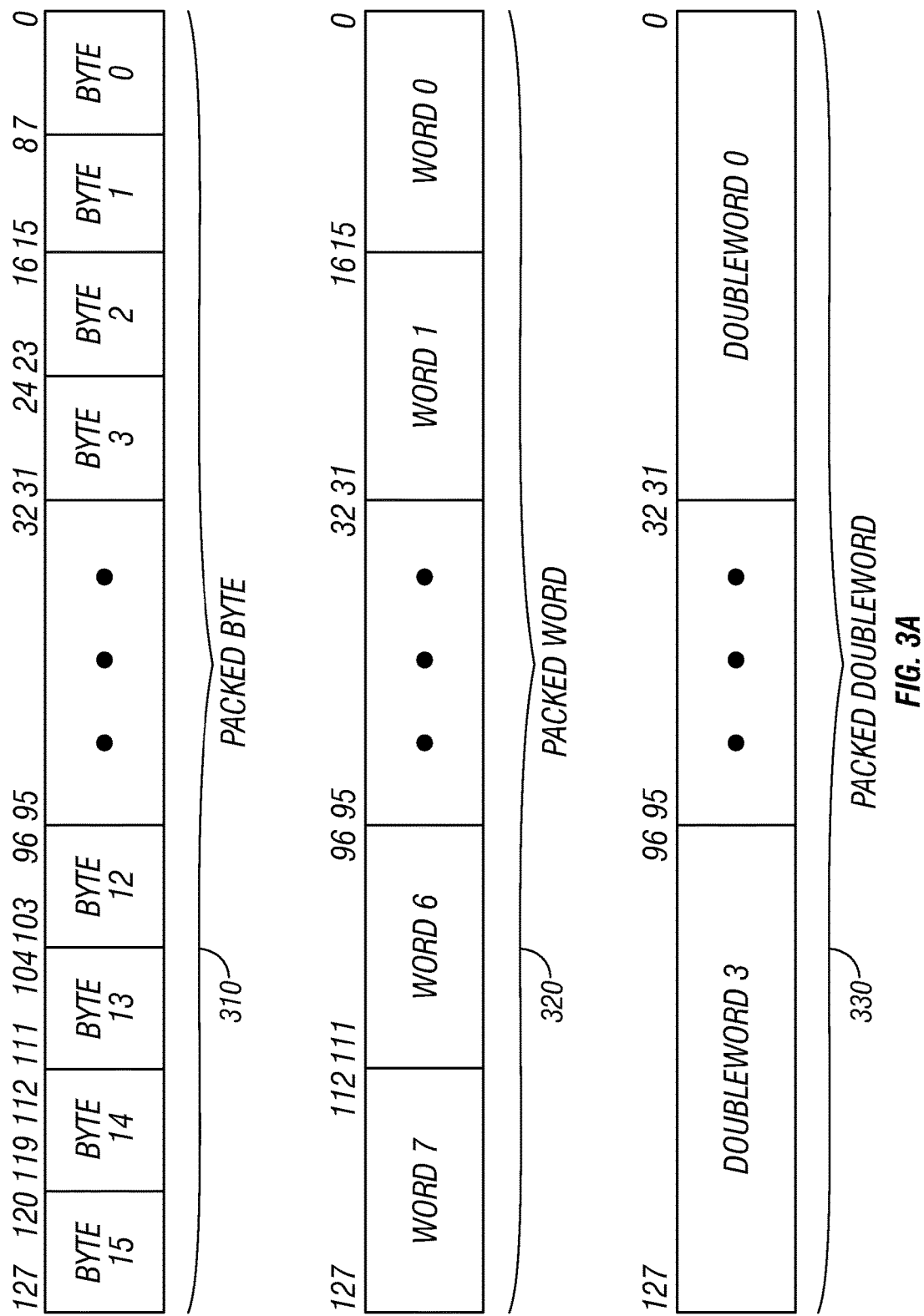

| 127 | 120 119 | 112 111 | 104 103 | ... | 24 23 | 16 15 | 8 7 | 0 |
|---|---|---|---|---|---|---|---|---|
| bbbb bbbb | bbbb bbbb | bbbb bbbb | ... | | bbbb bbbb | bbbb bbbb | bbbb bbbb | |

UNSIGNED PACKED BYTE REPRESENTATION 344

| 127 | 120 119 | 112 111 | 104 103 | ... | 24 23 | 16 15 | 8 7 | 0 |
|---|---|---|---|---|---|---|---|---|
| sbbb bbbb | sbbb bbbb | sbbb bbbb | ... | | sbbb bbbb | sbbb bbbb | sbbb bbbb | |

SIGNED PACKED BYTE REPRESENTATION 345

| 127 | 112 111 | ... | 16 15 | 0 |
|---|---|---|---|---|
| wwww wwww wwww wwww | ... | | wwww wwww wwww wwww | |

UNSIGNED PACKED WORD REPRESENTATION 346

| 127 | 112 111 | ... | 16 15 | 0 |
|---|---|---|---|---|
| swww wwww wwww wwww | ... | | swww wwww wwww wwww | |

SIGNED PACKED WORD REPRESENTATION 347

| 127 | 92 91 | 32 31 | 0 |
|---|---|---|---|
| dddd dddd dddd dddd dddd dddd dddd dddd | ... | dddd dddd dddd dddd dddd dddd dddd dddd | |

UNSIGNED PACKED DOUBLEWORD REPRESENTATION 348

| 127 | 92 91 | 32 31 | 0 |
|---|---|---|---|
| sddd dddd dddd dddd dddd dddd dddd dddd | ... | sddd dddd dddd dddd dddd dddd dddd dddd | |

SIGNED PACKED DOUBLEWORD REPRESENTATION 349

FIG. 3C

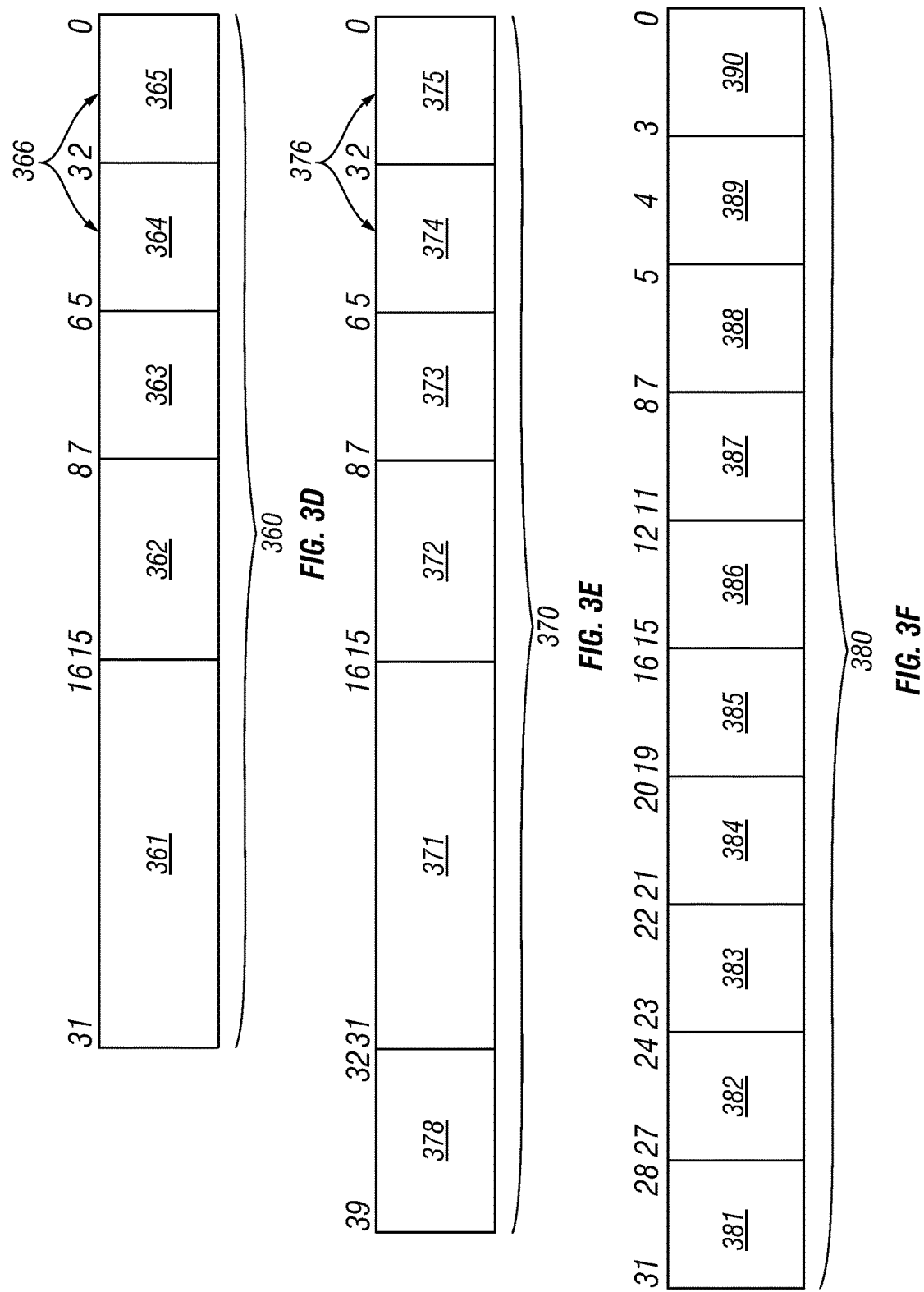

US 10,540,178 B2

ELIMINATING REDUNDANT STORES USING A PROTECTION DESIGNATOR AND A CLEAR DESIGNATOR

FIELD OF THE INVENTION

The present disclosure pertains to the field of processing logic, microprocessors, and associated instruction set architecture that, when executed by the processor or other processing logic, perform logical, mathematical, or other functional operations.

DESCRIPTION OF RELATED ART

Multiprocessor systems are becoming more and more common. Applications of multiprocessor systems include dynamic domain partitioning all the way down to desktop computing. In order to take advantage of multiprocessor systems, code to be executed may be separated into multiple threads for execution by various processing entities. Each thread may be executed in parallel with one another. To increase the utility of a processing entity, out-of-order execute may be employed. Out-of-order execution may execute instructions as input to such instructions is made available. Thus, an instruction that appears later in a code sequence may be executed before an instruction appearing earlier in a code sequence.

DESCRIPTION OF THE FIGURES

Embodiments are illustrated by way of example and not limitation in the Figures of the accompanying drawings:

FIG. 3A illustrates various packed data type representations in multimedia registers, in accordance with embodiments of the present disclosure;

FIG. 3C illustrates various signed and unsigned packed data type representations in multimedia registers, in accordance with embodiments of the present disclosure;

FIG. 3D illustrates an embodiment of an operation encoding format;

FIG. 3E illustrates another possible operation encoding format having forty or more bits, in accordance with embodiments of the present disclosure;

FIG. 3F illustrates yet another possible operation encoding format, in accordance with embodiments of the present disclosure;

DETAILED DESCRIPTION

Figure 1A:
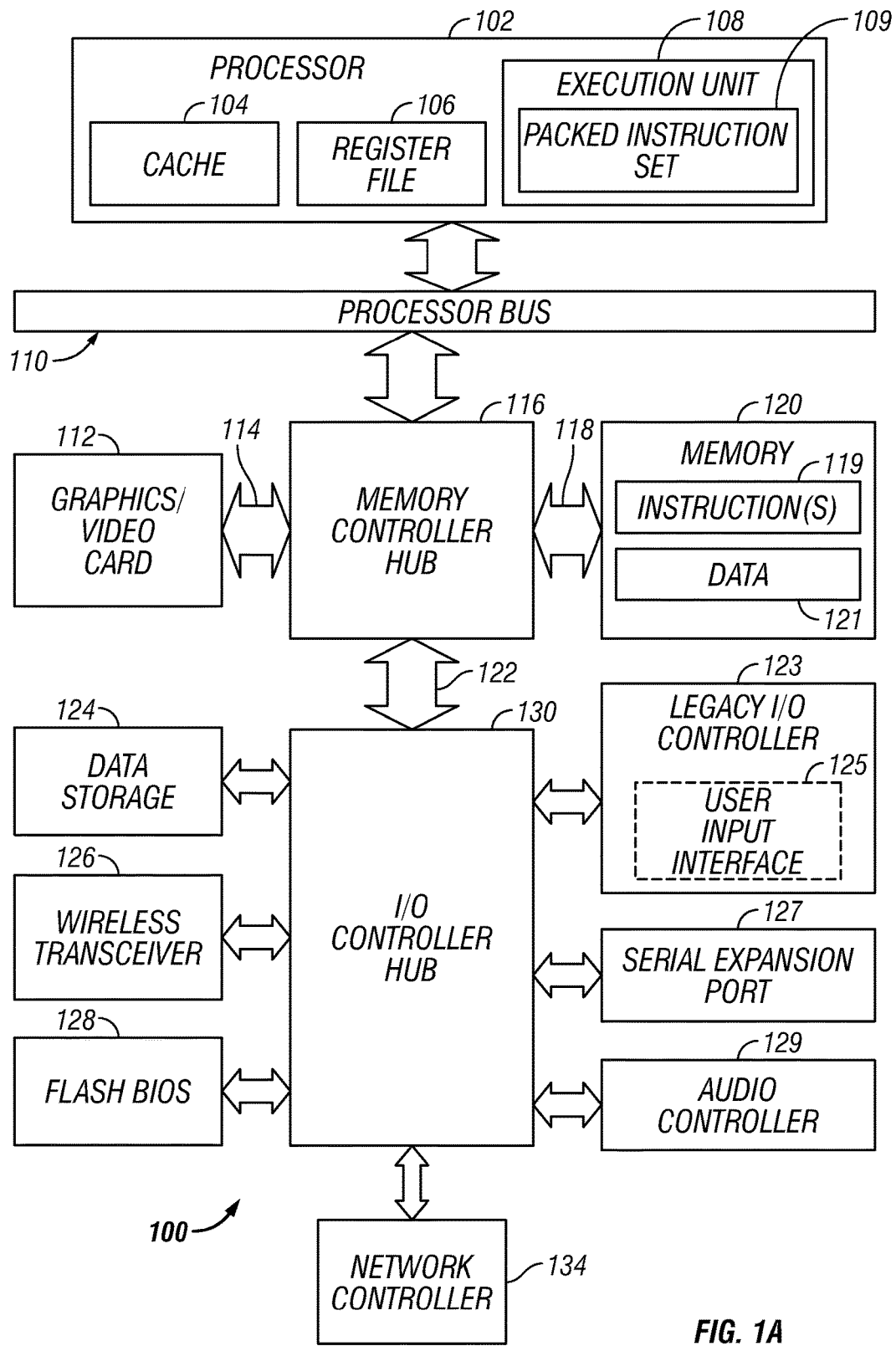
FIG. 1A is a block diagram of an exemplary computer system formed with a processor that may include execution units to execute an instruction, in accordance with embodiments of the present disclosure.

The following description describes an instruction and processing logic for dynamic store elimination (DSE). The instruction and processing logic may be implemented on an out-of-order processor. In the following description, numerous specific details such as processing logic, processor types, micro-architectural conditions, events, enablement mechanisms, and the like are set forth in order to provide a more thorough understanding of embodiments of the present disclosure. It will be appreciated, however, by one skilled in the art that the embodiments may be practiced without such specific details. Additionally, some well-known structures, circuits, and the like have not been shown in detail to avoid unnecessarily obscuring embodiments of the present disclosure.

Although the following embodiments are described with reference to a processor, other embodiments are applicable to other types of integrated circuits and logic devices. Similar techniques and teachings of embodiments of the present disclosure may be applied to other types of circuits or semiconductor devices that may benefit from DSE. The teachings of embodiments of the present disclosure are applicable to any processor or machine that stores data to memory. However, the embodiments are not limited to processors or machines that perform 512-bit, 256-bit, 128-bit, 64-bit, 32-bit, or 16-bit data operations and may be applied to any processor and machine in which manipulation or management of data may be performed. In addition, the following description provides examples, and the accompanying drawings show various examples for the purposes of illustration. However, these examples should not be construed in a limiting sense as they are merely intended to provide examples of embodiments of the present disclosure rather than to provide an exhaustive list of all possible implementations of embodiments of the present disclosure.

Although the below examples describe instruction handling and distribution in the context of execution units and logic circuits, other embodiments of the present disclosure may be accomplished by way of a data or instructions stored on a machine-readable, tangible medium, which when performed by a machine cause the machine to perform functions consistent with at least one embodiment of the disclosure. In one embodiment, functions associated with embodiments of the present disclosure are embodied in machine-executable instructions. The instructions may be used to cause a general-purpose or special-purpose processor that may be programmed with the instructions to perform the steps of the present disclosure. Embodiments of the present disclosure may be provided as a computer program product or software which may include a machine or computer-readable medium having stored thereon instructions which may be used to program a computer (or other electronic devices) to perform one or more operations according to embodiments of the present disclosure. Furthermore, steps of embodiments of the present disclosure might be performed by specific hardware components that contain fixed-function logic for performing the steps, or by any combination of programmed computer components and fixed-function hardware components. Throughout this disclosure, unless explicitly stated otherwise, a compound form of a reference numeral refers to the element generically or collectively. Thus, for example, widget 101A or 101-1 refers to an instance of a widget class, which may be referred to collectively as widgets 101 and any one of which may be refereed to generically as widget 101.

Instructions used to program circuitry to perform embodiments of the present disclosure may be stored within a memory in the system, such as DRAM, cache, flash memory, or other storage. Furthermore, the instructions may be distributed via a network or by way of other computer-readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium may include any type of tangible machine-readable medium suitable for storing or transmitting electronic instructions or information in a form readable by a machine (e.g., a computer).

A design may go through various stages, from creation to simulation to fabrication. Data representing a design may represent the design in a number of manners. First, as may be useful in simulations, the hardware may be represented using a hardware description language or another functional description language. Additionally, a circuit level model with logic and/or transistor gates may be produced at some stages of the design process. Furthermore, designs, at some stage, may reach a level of data representing the physical placement of various devices in the hardware model. In cases wherein some semiconductor fabrication techniques are used, the data representing the hardware model may be the data specifying the presence or absence of various features on different mask layers for masks used to produce the integrated circuit. In any representation of the design, the data may be stored in any form of a machine-readable medium. A memory or a magnetic or optical storage such as a disc may be the machine-readable medium to store information transmitted via optical or electrical wave modulated or otherwise generated to transmit such information. When an electrical carrier wave indicating or carrying the code or design is transmitted, to the extent that copying, buffering, or retransmission of the electrical signal is performed, a new copy may be made. Thus, a communication provider or a network provider may store on a tangible, machine-readable medium, at least temporarily, an article, such as information encoded into a carrier wave, embodying techniques of embodiments of the present disclosure.

In modern processors, a number of different execution units may be used to process and execute a variety of code and instructions. Some instructions may be quicker to complete while others may take a number of clock cycles to complete. The faster the throughput of instructions, the better the overall performance of the processor. Thus it would be advantageous to have as many instructions execute as fast as possible. However, there may be certain instructions that have greater complexity and require more in terms of execution time and processor resources, such as floating point instructions, load/store operations, data moves, etc.

As more computer systems are used in internet, text, and multimedia applications, additional processor support has been introduced over time. In one embodiment, an instruction set may be associated with one or more computer architectures, including data types, instructions, register architecture, addressing modes, memory architecture, interrupt and exception handling, and external input and output (I/O).

In one embodiment, the instruction set architecture (ISA) may be implemented by one or more micro-architectures, which may include processor logic and circuits used to implement one or more instruction sets. Accordingly, processors with different micro-architectures may share at least a portion of a common instruction set. For example, Intel® Pentium 4 processors, Intel® Core™ processors, and processors from Advanced Micro Devices, Inc. of Sunnyvale Calif. implement nearly identical versions of the x86 instruction set (with some extensions that have been added with newer versions), but have different internal designs. Similarly, processors designed by other processor development companies, such as ARM Holdings, Ltd., MIPS, or their licensees or adopters, may share at least a portion a common instruction set, but may include different processor designs. For example, the same register architecture of the ISA may be implemented in different ways in different micro-architectures using new or well-known techniques, including dedicated physical registers, one or more dynamically allocated physical registers using a register renaming mechanism (e.g., the use of a Register Alias Table (RAT), a Reorder Buffer (ROB) and a retirement register file. In one embodiment, registers may include one or more registers, register architectures, register files, or other register sets that may or may not be addressable by a software programmer.

An instruction may include one or more instruction formats. In one embodiment, an instruction format may indicate various fields (number of bits, location of bits, etc.) to specify, among other things, the operation to be performed and the operands on which that operation will be performed. In a further embodiment, some instruction formats may be further defined by instruction templates (or sub-formats). For example, the instruction templates of a given instruction format may be defined to have different subsets of the instruction format's fields and/or defined to have a given field interpreted differently. In one embodiment, an instruction may be expressed using an instruction format (and, if defined, in a given one of the instruction templates of that instruction format) and specifies or indicates the operation and the operands upon which the operation will operate.

Scientific, financial, auto-vectorized general purpose, RMS (recognition, mining, and synthesis), and visual and multimedia applications (e.g., 2D/3D graphics, image processing, video compression/decompression, voice recognition algorithms and audio manipulation) may require the same operation to be performed on a large number of data items. In one embodiment, Single Instruction Multiple Data (SIMD) refers to a type of instruction that causes a processor to perform an operation on multiple data elements. SIMD technology may be used in processors that may logically divide the bits in a register into a number of fixed-sized or variable-sized data elements, each of which represents a separate value. For example, in one embodiment, the bits in a 64-bit register may be organized as a source operand containing four separate 16-bit data elements, each of which represents a separate 16-bit value. This type of data may be referred to as 'packed' data type or 'vector' data type, and operands of this data type may be referred to as packed data operands or vector operands. In one embodiment, a packed data item or vector may be a sequence of packed data elements stored within a single register, and a packed data operand or a vector operand may a source or destination operand of a SIMD instruction (or 'packed data instruction' or a 'vector instruction'). In one embodiment, a SIMD instruction specifies a single vector operation to be performed on two source vector operands to generate a destination vector operand (also referred to as a result vector operand) of the same or different size, with the same or different number of data elements, and in the same or different data element order.

SIMD technology, such as that employed by the Intel® Core™ processors having an instruction set including x86, MMX™, Streaming SIMD Extensions (SSE), SSE2, SSE3, SSE4.1, and SSE4.2 instructions, ARM processors, such as the ARM Cortex® family of processors having an instruction set including the Vector Floating Point (VFP) and/or NEON instructions, and MIPS processors, such as the Loongson family of processors developed by the Institute of Computing Technology (ICT) of the Chinese Academy of Sciences, has enabled a significant improvement in application performance (Core™ and MMX™ are registered trademarks or trademarks of Intel Corporation of Santa Clara, Calif.).

In one embodiment, destination and source registers/data may be generic terms to represent the source and destination of the corresponding data or operation. In some embodiments, they may be implemented by registers, memory, or other storage areas having other names or functions than those depicted. For example, in one embodiment, "DEST1" may be a temporary storage register or other storage area, whereas "SRC1" and "SRC2" may be a first and second source storage register or other storage area, and so forth. In other embodiments, two or more of the SRC and DEST storage areas may correspond to different data storage elements within the same storage area (e.g., a SIMD register). In one embodiment, one of the source registers may also act as a destination register by, for example, writing back the result of an operation performed on the first and second source data to one of the two source registers serving as a destination registers.

FIG. 1A is a block diagram of an exemplary computer system formed with a processor that may include execution units to execute an instruction, in accordance with embodiments of the present disclosure. System 100 may include a component, such as a processor 102 to employ execution units including circuits with logic to perform algorithms for process data, in accordance with the present disclosure, such as in the embodiment described herein. System 100 may be representative of processing systems based on the PENTIUM® III, PENTIUM® 4, Xeon™, Itanium®, XScale™ and/or StrongARM™ microprocessors available from Intel Corporation of Santa Clara, Calif., although other systems (including PCs having other microprocessors, engineering workstations, set-top boxes and the like) may also be used. In one embodiment, sample system 100 may execute a version of the WINDOWS™ operating system available from Microsoft Corporation of Redmond, Wash., although other operating systems (UNIX and Linux for example), embedded software, and/or graphical user interfaces, may also be used. Thus, embodiments of the present disclosure are not limited to any specific combination of hardware circuitry, programmable circuitry, and software.

Embodiments are not limited to computer systems. Embodiments of the present disclosure may be used in other devices such as handheld devices and embedded applications. Some examples of handheld devices include cellular phones, Internet Protocol devices, digital cameras, personal digital assistants (PDAs), and handheld PCs. Embedded applications may include a micro controller, a digital signal processor (DSP), system on a chip, network computers (NetPC), set-top boxes, network hubs, wide area network (WAN) switches, or any other system that may perform one or more instructions in accordance with at least one embodiment.

Computer system 100 may include a processor 102 that may include one or more execution units 108 to perform an algorithm to perform at least one instruction in accordance with one embodiment of the present disclosure. One embodiment may be described in the context of a single processor desktop or server system, but other embodiments may be included in a multiprocessor system. System 100 may be an example of a 'hub' system architecture. System 100 may include a processor 102 for processing data signals. Processor 102 may include a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. In one embodiment, processor 102 may be coupled to a processor bus 110 that may transmit data signals between processor 102 and other components in system 100. The elements of system 100 may perform conventional functions that are well known to those familiar with the art.

In one embodiment, processor 102 may include a Level 1 (L1) internal cache memory 104. Depending on the architecture, the processor 102 may have a single internal cache or multiple levels of internal cache. In another embodiment, the cache memory may reside external to processor 102. Other embodiments may also include a combination of both internal and external caches depending on the particular implementation and needs. Register file 106 may store different types of data in various registers including integer registers, floating point registers, status registers, and instruction pointer register.

Execution unit 108, including circuits with logic to perform integer and floating point operations, also resides in processor 102. Processor 102 may also include a microcode (ucode) ROM that stores microcode for certain macroinstructions. In one embodiment, execution unit 108 may include circuits with logic to handle a packed instruction set 109. By including the packed instruction set 109 in the instruction set of a general-purpose processor 102, along with associated circuitry to execute the instructions, the operations used by many multimedia applications may be performed using packed data in a general-purpose processor 102. Thus, many multimedia applications may be accelerated and executed more efficiently by using the full width of a processor's data bus for performing operations on packed data. This may eliminate the need to transfer smaller units of data across the processor's data bus to perform one or more operations one data element at a time.

Embodiments of an execution unit 108 may also be used in micro controllers, embedded processors, graphics devices, DSPs, and other types of logic circuits. System 100 may include a memory 120. Memory 120 may be implemented as a dynamic random access memory (DRAM) device, a static random access memory (SRAM) device, flash memory device, or other memory device. Memory 120 may store instructions and/or data represented by data signals that may be executed by processor 102.

A system logic chip 116 may be coupled to processor bus 110 and memory 120. System logic chip 116 may include a memory controller hub (MCH). Processor 102 may communicate with MCH 116 via a processor bus 110. MCH 116 may provide a high bandwidth memory path 118 to memory 120 for instruction and data storage and for storage of graphics commands, data and textures. MCH 116 may direct data signals between processor 102, memory 120, and other components in system 100 and to bridge the data signals between processor bus 110, memory 120, and system I/O 122. In some embodiments, the system logic chip 116 may provide a graphics port for coupling to a graphics controller 112. MCH 116 may be coupled to memory 120 through a memory interface 118. Graphics card 112 may be coupled to MCH 116 through an Accelerated Graphics Port (AGP) interconnect 114.

System 100 may use a proprietary hub interface bus 122 to couple MCH 116 to I/O controller hub (ICH) 130. In one embodiment, ICH 130 may provide direct connections to some I/O devices via a local I/O bus. The local I/O bus may include a high-speed I/O bus for connecting peripherals to memory 120, chipset, and processor 102. Examples may include the audio controller, firmware hub (flash BIOS) 128, wireless transceiver 126, data storage 124, legacy I/O controller containing user input and keyboard interfaces, a serial expansion port such as Universal Serial Bus (USB), and a network controller 134. Data storage device 124 may comprise a hard disk drive, a floppy disk drive, a CD-ROM device, a flash memory device, or other mass storage device.

For another embodiment of a system, an instruction in accordance with one embodiment may be used with a system on a chip. One embodiment of a system on a chip comprises of a processor and a memory. The memory for one such system may include a flash memory. The flash memory may be located on the same die as the processor and other system components. Additionally, other logic blocks such as a memory controller or graphics controller may also be located on a system on a chip.

Figure 1B:
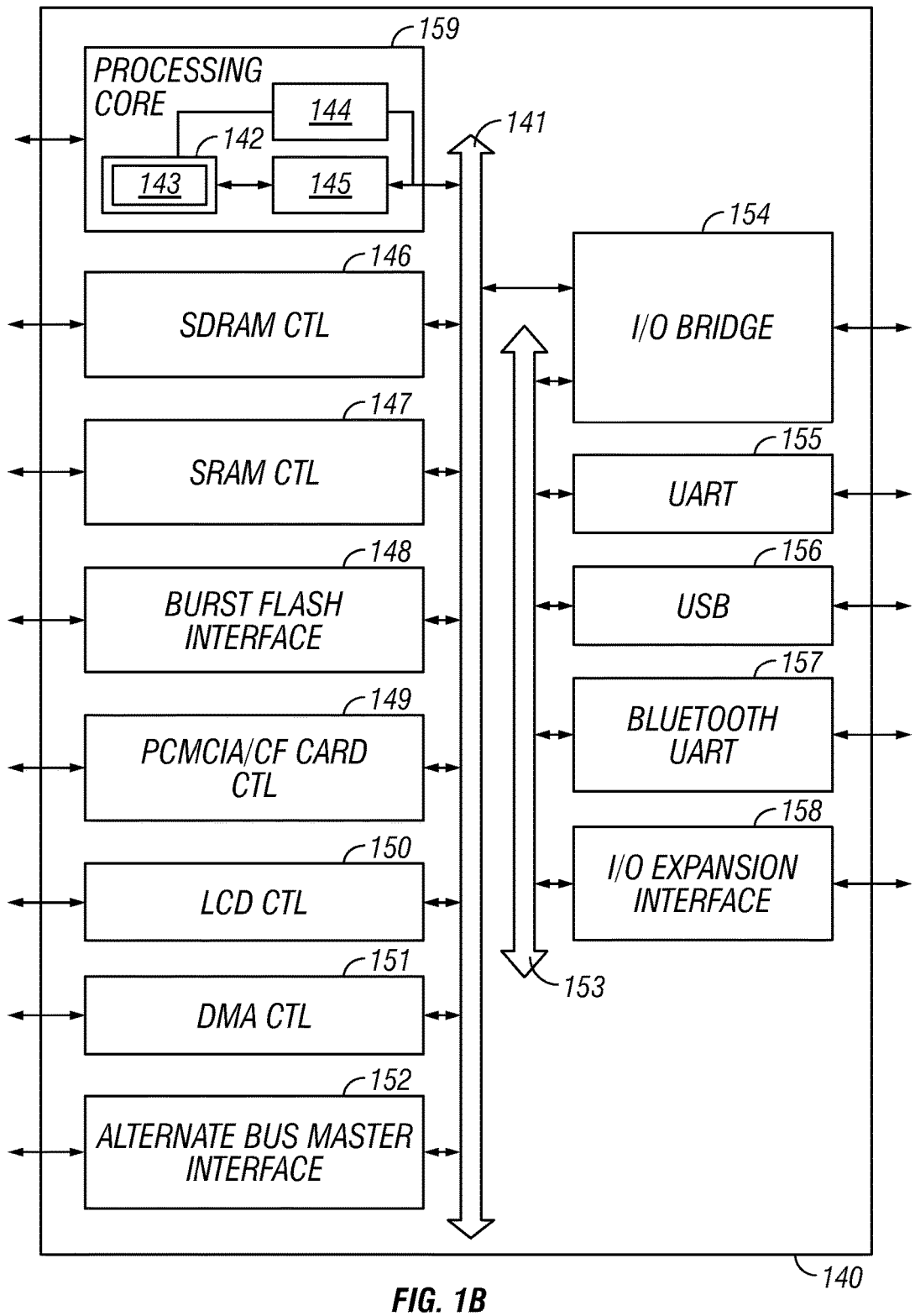
FIG. 1B illustrates a data processing system, in accordance with embodiments of the present disclosure.

FIG. 1B illustrates a data processing system 140 which implements the principles of embodiments of the present disclosure. It will be readily appreciated by one of skill in the art that the embodiments described herein may operate with alternative processing systems without departure from the scope of embodiments of the disclosure.

Computer system 140 comprises a processing core 159 for performing at least one instruction in accordance with one embodiment. In one embodiment, processing core 159 represents a processing unit of any type of architecture, including but not limited to a CISC, a RISC or a VLIW type architecture. Processing core 159 may also be suitable for manufacture in one or more process technologies and by being represented on a machine-readable media in sufficient detail, may be suitable to facilitate said manufacture.

Processing core 159 comprises an execution unit 142, a set of register files 145, and a decoder 144. Processing core 159 may also include additional circuitry (not shown) which may be unnecessary to the understanding of embodiments of the present disclosure. Execution unit 142 may execute instructions received by processing core 159. In addition to performing typical processor instructions, execution unit 142 may perform instructions in packed instruction set 143 for performing operations on packed data formats. Packed instruction set 143 may include instructions for performing embodiments of the disclosure and other packed instructions. Execution unit 142 may be coupled to register file 145 by an internal bus. Register file 145 may represent a storage area on processing core 159 for storing information, including data. As previously mentioned, it is understood that the storage area may store the packed data might not be critical. Execution unit 142 may be coupled to decoder 144. Decoder 144 may decode instructions received by processing core 159 into control signals and/or microcode entry points. In response to these control signals and/or microcode entry points, execution unit 142 performs the appropriate operations. In one embodiment, the decoder may interpret the opcode of the instruction, which will indicate what operation should be performed on the corresponding data indicated within the instruction.

Processing core 159 may be coupled with bus 141 for communicating with various other system devices, which may include but are not limited to, for example, synchronous dynamic random access memory (SDRAM) control 146, static random access memory (SRAM) control 147, burst flash memory interface 148, personal computer memory card international association (PCMCIA)/compact flash (CF) card control 149, liquid crystal display (LCD) control 150, direct memory access (DMA) controller 151, and alternative bus master interface 152. In one embodiment, data processing system 140 may also comprise an I/O bridge 154 for communicating with various I/O devices via an I/O bus 153. Such I/O devices may include but are not limited to, for example, universal asynchronous receiver/transmitter (UART) 155, universal serial bus (USB) 156, Bluetooth wireless UART 157 and I/O expansion interface 158.

One embodiment of data processing system 140 provides for mobile, network and/or wireless communications and a processing core 159 that may perform SIMD operations including a text string comparison operation. Processing core 159 may be programmed with various audio, video, imaging and communications algorithms including discrete transformations such as a Walsh-Hadamard transform, a fast Fourier transform (FFT), a discrete cosine transform (DCT), and their respective inverse transforms; compression/decompression techniques such as color space transformation, video encode motion estimation or video decode motion compensation; and modulation/demodulation (MODEM) functions such as pulse coded modulation (PCM).

Figure 1C:
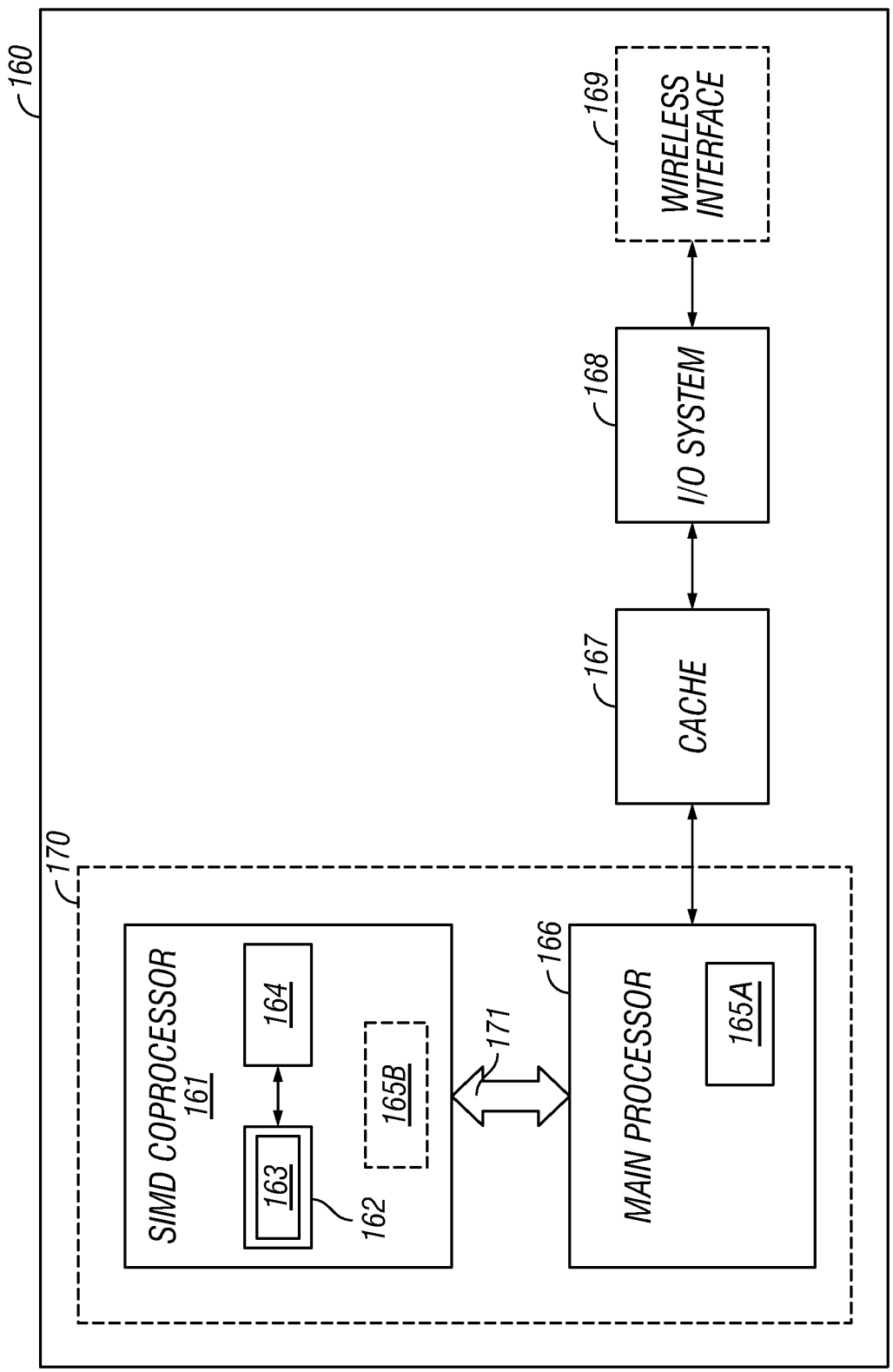
FIG. 1C illustrates other embodiments of a data processing system for performing text string comparison operations.

FIG. 1C illustrates other embodiments of a data processing system that performs SIMD text string comparison operations. In one embodiment, data processing system 160 may include a main processor 166, a SIMD coprocessor 161, a cache memory 167, and an input/output system 168. Input/output system 168 may optionally be coupled to a wireless interface 169. SIMD coprocessor 161 may perform operations including instructions in accordance with one embodiment. In one embodiment, processing core 170 may be suitable for manufacture in one or more process technologies and by being represented on a machine-readable media in sufficient detail, may be suitable to facilitate the manufacture of all or part of data processing system 160 including processing core 170.

In one embodiment, SIMD coprocessor 161 comprises an execution unit 162 and a set of register files 164. One embodiment of main processor 166 comprises a decoder 165A to recognize instructions of instruction set 163 including instructions in accordance with one embodiment for execution by execution unit 162. In other embodiments, SIMD coprocessor 161 also comprises decoder 165B, which may be at least part of decoder 165A, to decode instructions of instruction set 163. Processing core 170 may also include additional circuitry (not shown) which may be unnecessary to the understanding of embodiments of the present disclosure.

In operation, main processor 166 executes a stream of data processing instructions that control data processing operations of a general type including interactions with cache memory 167, and input/output system 168. Embedded within the stream of data processing instructions may be SIMD coprocessor instructions. Decoder 165A of main processor 166 recognizes these SIMD coprocessor instructions as being of a type that should be executed by an attached SIMD coprocessor 161. Accordingly, main processor 166 issues these SIMD coprocessor instructions (or control signals representing SIMD coprocessor instructions) on the coprocessor bus 171. From coprocessor bus 171, these instructions may be received by any attached SIMD coprocessors. In this case, SIMD coprocessor 161 may accept and execute any received SIMD coprocessor instructions intended for it.

Data may be received via wireless interface 169 for processing by the SIMD coprocessor instructions. For one example, voice communication may be received in the form of a digital signal, which may be processed by the SIMD coprocessor instructions to regenerate digital audio samples representative of the voice communications. For another example, compressed audio and/or video may be received in the form of a digital bit stream, which may be processed by the SIMD coprocessor instructions to regenerate digital audio samples and/or motion video frames. In one embodiment of processing core 170, main processor 166, and a SIMD coprocessor 161 may be integrated into a single processing core 170 comprising an execution unit 162, a set of register files 164, and a decoder 165 to recognize instructions of instruction set 163 including instructions in accordance with one embodiment.

Figure 2:
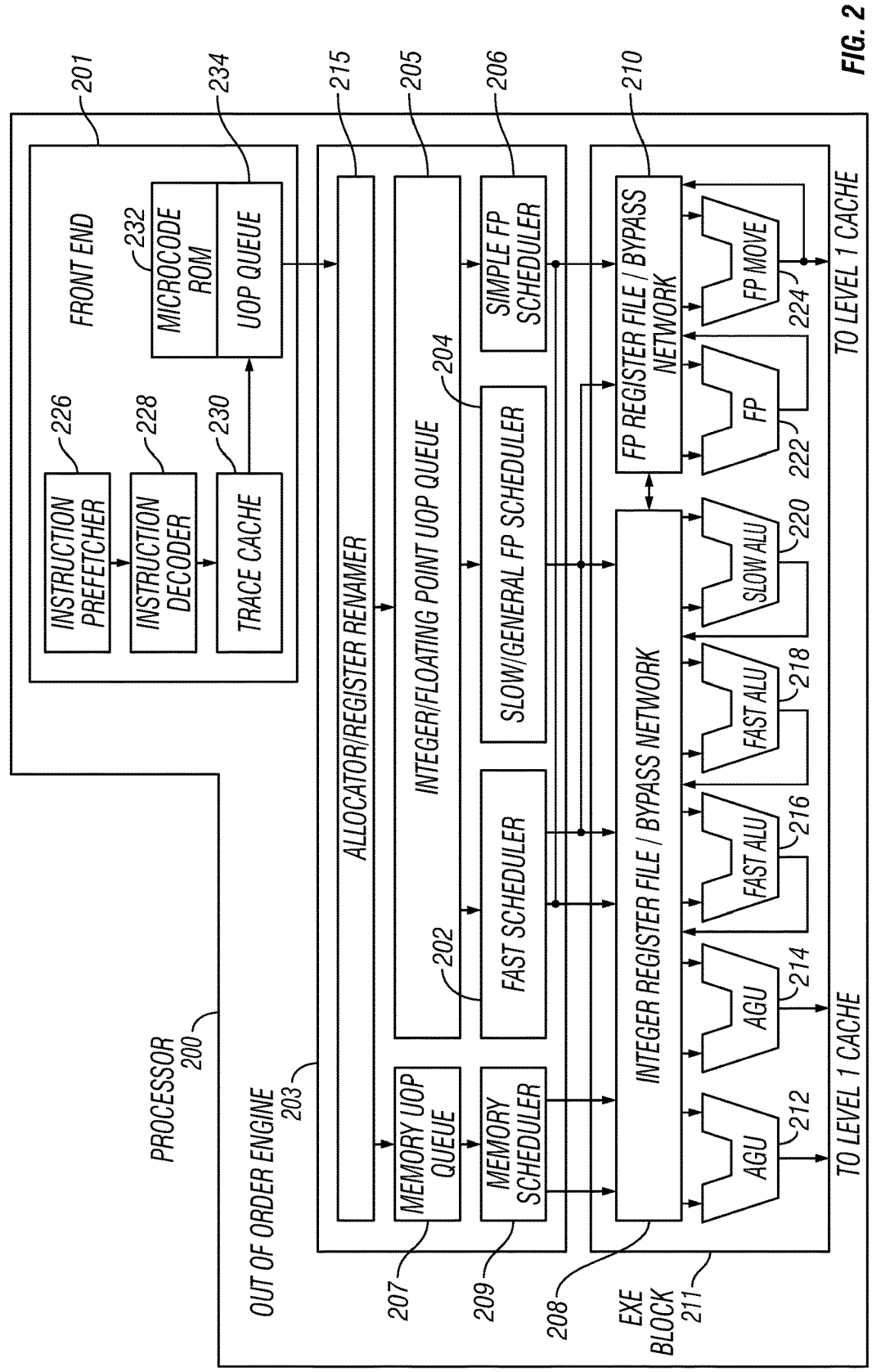
FIG. 2 is a block diagram of the micro-architecture for a processor that may include logic circuits to perform instructions, in accordance with embodiments of the present disclosure.

FIG. 2 is a block diagram of the micro-architecture for a processor 200 that may include logic circuits to perform instructions, in accordance with embodiments of the present disclosure. In some embodiments, an instruction in accordance with one embodiment may be implemented to operate on data elements having sizes of byte, word, doubleword, quadword, etc., as well as datatypes, such as single and double precision integer and floating point datatypes. In one embodiment, in-order front end 201 may implement a part of processor 200 that may fetch instructions to be executed and prepares the instructions to be used later in the processor pipeline. Front end 201 may include several units. In one embodiment, instruction prefetcher 226 fetches instructions from memory and feeds the instructions to an instruction decoder 228 which in turn decodes or interprets the instructions. For example, in one embodiment, the decoder decodes a received instruction into one or more operations called "micro-instructions" or "micro-operations" (also called micro op or uops) that the machine may execute. In other embodiments, the decoder parses the instruction into an opcode and corresponding data and control fields that may be used by the micro-architecture to perform operations in accordance with one embodiment. In one embodiment, trace cache 230 may assemble decoded uops into program ordered sequences or traces in uop queue 234 for execution. When trace cache 230 encounters a complex instruction, microcode ROM 232 provides the uops needed to complete the operation.

Some instructions may be converted into a single micro-op, whereas others need several micro-ops to complete the full operation. In one embodiment, if more than four micro-ops are needed to complete an instruction, decoder 228 may access microcode ROM 232 to perform the instruction. In one embodiment, an instruction may be decoded into a small number of micro ops for processing at instruction decoder 228. In another embodiment, an instruction may be stored within microcode ROM 232 should a number of micro-ops be needed to accomplish the operation. Trace cache 230 refers to an entry point programmable logic array (PLA) to determine a correct micro-instruction pointer for reading the micro-code sequences to complete one or more instructions in accordance with one embodiment from micro-code ROM 232. After microcode ROM 232 finishes sequencing micro-ops for an instruction, front end 201 of the machine may resume fetching micro-ops from trace cache 230.

Out-of-order execution engine 203 may prepare instructions for execution. The out-of-order execution logic has a number of buffers to smooth out and re-order the flow of instructions to optimize performance as they go down the pipeline and get scheduled for execution. The allocator logic 215 allocates the machine buffers and resources that each uop needs in order to execute. The register renaming logic 215 renames logic registers onto entries in a register file. The allocator 215 also allocates an entry for each uop in one of the two uop queues, one for memory operations 207 and one for non-memory operations 205, in front of the instruction schedulers: memory scheduler 209, fast scheduler 202, slow/general floating point scheduler 204, and simple floating point scheduler 206. Uop schedulers 202, 204, 206, determine when a uop is ready to execute based on the readiness of their dependent input register operand sources and the availability of the execution resources the uops need to complete their operation. Fast scheduler 202 of one embodiment may schedule on each half of the main clock cycle while the other schedulers may only schedule once per main processor clock cycle. The schedulers arbitrate for the dispatch ports to schedule uops for execution.

Register files 208, 210 may be arranged between schedulers 202, 204, 206, and execution units 212, 214, 216, 218, 220, 222, 224 in execution block 211. Each of register files 208, 210 perform integer and floating point operations, respectively. Each register file 208, 210, may include a bypass network that may bypass or forward just completed results that have not yet been written into the register file to new dependent uops. Integer register file 208 and floating point register file 210 may communicate data with the other. In one embodiment, integer register file 208 may be split into two separate register files, one register file for low-order thirty-two bits of data and a second register file for high order thirty-two bits of data. Floating point register file 210 may include 128-bit wide entries because floating point instructions typically have operands from 64 to 128 bits in width.

Execution block 211 may contain execution units 212, 214, 216, 218, 220, 222, 224. Execution units 212, 214, 216, 218, 220, 222, 224 may execute the instructions. Execution block 211 may include register files 208, 210 that store the integer and floating point data operand values that the micro-instructions need to execute. In one embodiment, processor 200 may comprise a number of execution units: address generation unit (AGU) 212, AGU 214, fast ALU 216, fast ALU 218, slow ALU 220, floating point ALU 222, floating point move unit 224. In another embodiment, floating point execution blocks 222, 224, may execute floating point, MMX, SIMD, and SSE, or other operations. In yet another embodiment, floating point ALU 222 may include a 64-bit by 64-bit floating point divider to execute divide, square root, and remainder micro-ops. In various embodiments, instructions involving a floating point value may be handled with the floating point hardware. In one embodiment, ALU operations may be passed to high-speed ALU execution units 216, 218. High-speed ALUs 216, 218 may execute fast operations with an effective latency of half a clock cycle. In one embodiment, most complex integer operations go to slow ALU 220 as slow ALU 220 may include integer execution hardware for long-latency type of operations, such as a multiplier, shifts, flag logic, and branch processing. Memory load/store operations may be executed by AGUs 212, 214. In one embodiment, integer ALUs 216, 218, 220 may perform integer operations on 64-bit data operands. In other embodiments, ALUs 216, 218, 220 may be implemented to support a variety of data bit sizes including sixteen, thirty-two, 128, 256, etc. Similarly, floating point units 222, 224 may be implemented to support a range of operands having bits of various widths. In one embodiment, floating point units 222, 224, may operate on 128-bit wide packed data operands in conjunction with SIMD and multimedia instructions.

In one embodiment, uops schedulers 202, 204, 206, dispatch dependent operations before the parent load has finished executing. As uops may be speculatively scheduled and executed in processor 200, processor 200 may also include circuits with logic to handle memory misses. If a data load misses in the data cache, there may be dependent operations in flight in the pipeline that have left the scheduler with temporarily incorrect data. A replay mechanism tracks and re-executes instructions that use incorrect data. Only the dependent operations might need to be replayed and the independent ones may be allowed to complete. The schedulers and replay mechanism of one embodiment of a processor may also be designed to catch instruction sequences for text string comparison operations.

The term "registers" may refer to the on-board processor storage locations that may be used as part of instructions to identify operands. In other words, registers may be those that may be usable from the outside of the processor (from a programmer's perspective). However, in some embodiments registers might not be limited to a particular type of circuit. Rather, a register may store data, provide data, and perform the functions described herein. The registers described herein may be implemented by circuitry within a processor using any number of different techniques, such as dedicated physical registers, dynamically allocated physical registers using register renaming, combinations of dedicated and dynamically allocated physical registers, etc. In one embodiment, integer registers store 32-bit integer data. A register file of one embodiment also contains eight multimedia SIMD registers for packed data. For the discussions below, the registers may be understood to be data registers designed to hold packed data, such as 64-bit wide MMX™ registers (also referred to as 'mm' registers in some instances) in microprocessors enabled with MMX technology from Intel Corporation of Santa Clara, Calif. These MMX registers, available in both integer and floating point forms, may operate with packed data elements that accompany SIMD and SSE instructions. Similarly, 128-bit wide XMM registers relating to SSE2, SSE3, SSE4, or beyond (referred to generically as "SSEx") technology may hold such packed data operands. In one embodiment, in storing packed data and integer data, the registers do not need to differentiate between the two data types. In one embodiment, integer and floating point may be contained in the same register file or different register files. Furthermore, in one embodiment, floating point and integer data may be stored in different registers or the same registers.

In the examples of the following figures, a number of data operands may be described. FIG. 3A illustrates various packed data type representations in multimedia registers, in accordance with embodiments of the present disclosure. FIG. 3A illustrates data types for a packed byte 310, a packed word 320, and a packed doubleword (dword) 330 for 128-bit wide operands. Packed byte format 310 of this example may be 128 bits long and contains sixteen packed byte data elements. A byte may be defined, for example, as eight bits of data. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement increases the storage efficiency of the processor. As well, with sixteen data elements accessed, one operation may now be performed on sixteen data elements in parallel.

Generally, a data element may include an individual piece of data that is stored in a single register or memory location with other data elements of the same length. In packed data sequences relating to SSEx technology, the number of data elements stored in a XMM register may be 128 bits divided by the length in bits of an individual data element. Similarly, in packed data sequences relating to MMX and SSE technology, the number of data elements stored in an MMX register may be 64 bits divided by the length in bits of an individual data element. Although the data types illustrated in FIG. 3A may be 128 bits long, embodiments of the present disclosure may also operate with 64-bit wide or other sized operands. Packed word format 320 of this example may be 128 bits long and contains eight packed word data elements. Each packed word contains sixteen bits of information. Packed doubleword format 330 of FIG. 3A may be 128 bits long and contains four packed doubleword data elements. Each packed doubleword data element contains thirty-two bits of information. A packed quadword may be 128 bits long and contain two packed quad-word data elements.

Figure 3B:
FIG. 3B illustrates possible in-register data storage formats, in accordance with embodiments of the present disclosure.
Figure 3B:
Figure 3B:
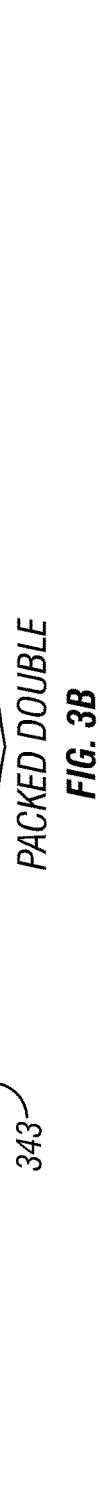

FIG. 3B illustrates possible in-register data storage formats, in accordance with embodiments of the present disclosure. Each packed data may include more than one independent data element. Three packed data formats are illustrated; packed half 341, packed single 342, and packed double 343. One embodiment of packed half 341, packed single 342, and packed double 343 contain fixed-point data elements. For another embodiment one or more of packed half 341, packed single 342, and packed double 343 may contain floating-point data elements. One embodiment of packed half 341 may be 128 bits long containing eight 16-bit data elements. One embodiment of packed single 342 may be 128 bits long and contains four 32-bit data elements. One embodiment of packed double 343 may be 128 bits long and contains two 64-bit data elements. It will be appreciated that such packed data formats may be further extended to other register lengths, for example, to 96-bits, 160-bits, 192-bits, 224-bits, 256-bits, 512-bits or more.

FIG. 3C illustrates various signed and unsigned packed data type representations in multimedia registers, in accordance with embodiments of the present disclosure. Unsigned packed byte representation 344 illustrates the storage of an unsigned packed byte in a SIMD register. Information for each byte data element may be stored in bit 7 through bit 0 for byte 0, bit 15 through bit 8 for byte 1, bit 23 through bit 16 for byte 2, and finally bit 120 through bit 127 for byte 15. Thus, all available bits may be used in the register. This storage arrangement may increase the storage efficiency of the processor. As well, with sixteen data elements accessed, one operation may now be performed on sixteen data elements in a parallel fashion. Signed packed byte representation 345 illustrates the storage of a signed packed byte. Note that the eighth bit of every byte data element may be the sign indicator. Unsigned packed word representation 346 illustrates how word seven through word zero may be stored in a SIMD register. Signed packed word representation 347 may be similar to the unsigned packed word in-register representation 346. Note that the sixteenth bit of each word data element may be the sign indicator. Unsigned packed doubleword representation 348 shows how doubleword data elements are stored. Signed packed doubleword representation 349 may be similar to unsigned packed doubleword in-register representation 348. Note that the necessary sign bit may be the thirty-second bit of each doubleword data element.

FIG. 3D illustrates an embodiment of an operation encoding (opcode). Furthermore, format 360 may include register/memory operand addressing modes corresponding with a type of opcode format described in the "IA-32 Intel Architecture Software Developer's Manual Volume 2: Instruction Set Reference," which is available from Intel Corporation, Santa Clara, Calif. on the world-wide-web (www) at intel.com/design/litcentr. In one embodiment, an instruction may be encoded by one or more of fields 361 and 362. Up to two operand locations per instruction may be identified, including up to two source operand identifiers 364 and 365. In one embodiment, destination operand identifier 366 may be the same as source operand identifier 364, whereas in other embodiments they may be different. In another embodiment, destination operand identifier 366 may be the same as source operand identifier 365, whereas in other embodiments they may be different. In one embodiment, one of the source operands identified by source operand identifiers 364 and 365 may be overwritten by the results of the text string comparison operations, whereas in other embodiments identifier 364 corresponds to a source register element and identifier 365 corresponds to a destination register element. In one embodiment, operand identifiers 364 and 365 may identify 32-bit or 64-bit source and destination operands.

FIG. 3E illustrates another possible operation encoding (opcode) format 370, having forty or more bits, in accordance with embodiments of the present disclosure. Opcode format 370 corresponds with opcode format 360 and comprises an optional prefix byte 378. An instruction according to one embodiment may be encoded by one or more of fields 378, 371, and 372. Up to two operand locations per instruction may be identified by source operand identifiers 374 and 375 and by prefix byte 378. In one embodiment, prefix byte 378 may be used to identify 32-bit or 64-bit source and destination operands. In one embodiment, destination operand identifier 376 may be the same as source operand identifier 374, whereas in other embodiments they may be different. For another embodiment, destination operand identifier 376 may be the same as source operand identifier 375, whereas in other embodiments they may be different. In one embodiment, an instruction operates on one or more of the operands identified by operand identifiers 374 and 375 and one or more operands identified by operand identifiers 374 and 375 may be overwritten by the results of the instruction, whereas in other embodiments, operands identified by identifiers 374 and 375 may be written to another data element in another register. Opcode formats 360 and 370 allow register to register, memory to register, register by memory, register by register, register by immediate, register to memory addressing specified in part by MOD fields 363 and 373 and by optional scale-index-base and displacement bytes.

FIG. 3F illustrates yet another possible operation encoding (opcode) format, in accordance with embodiments of the present disclosure. 64-bit single instruction multiple data (SIMD) arithmetic operations may be performed through a coprocessor data processing (CDP) instruction. Operation encoding (opcode) format 380 depicts one such CDP instruction having CDP opcode fields 382 and 389. The type of CDP instruction, for another embodiment, operations may be encoded by one or more of fields 383, 384, 387, and 388. Up to three operand locations per instruction may be identified, including up to two source operand identifiers 385 and 390 and one destination operand identifier 386. One embodiment of the coprocessor may operate on eight, sixteen, thirty-two, and 64-bit values. In one embodiment, an instruction may be performed on integer data elements. In some embodiments, an instruction may be executed conditionally, using condition field 381. For some embodiments, source data sizes may be encoded by field 383. In some embodiments, Zero (Z), negative (N), carry (C), and overflow (V) detection may be done on SIMD fields. For some instructions, the type of saturation may be encoded by field 384.

Figure 4A:
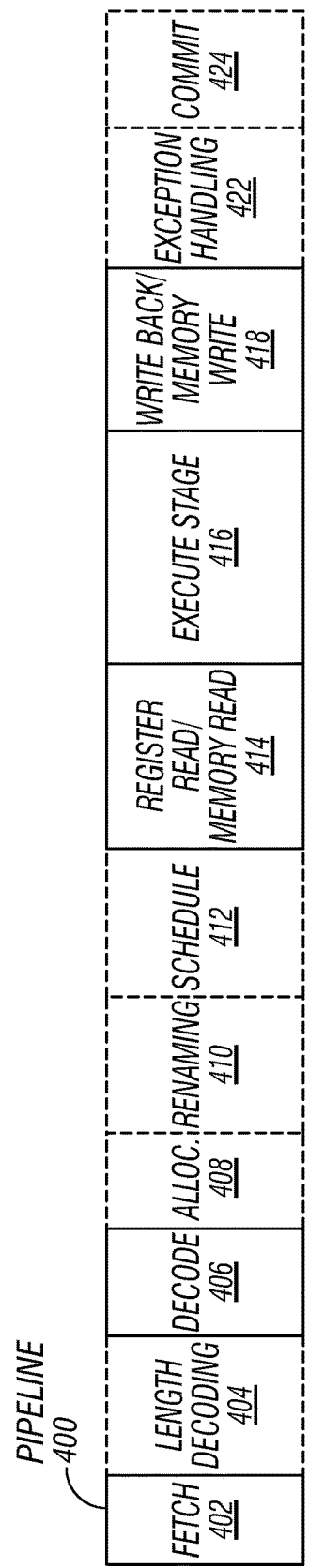
FIG. 4A is a block diagram illustrating an in-order pipeline and a register renaming stage, out-of-order issue/execution pipeline, in accordance with embodiments of the present disclosure.
Figure 4B:
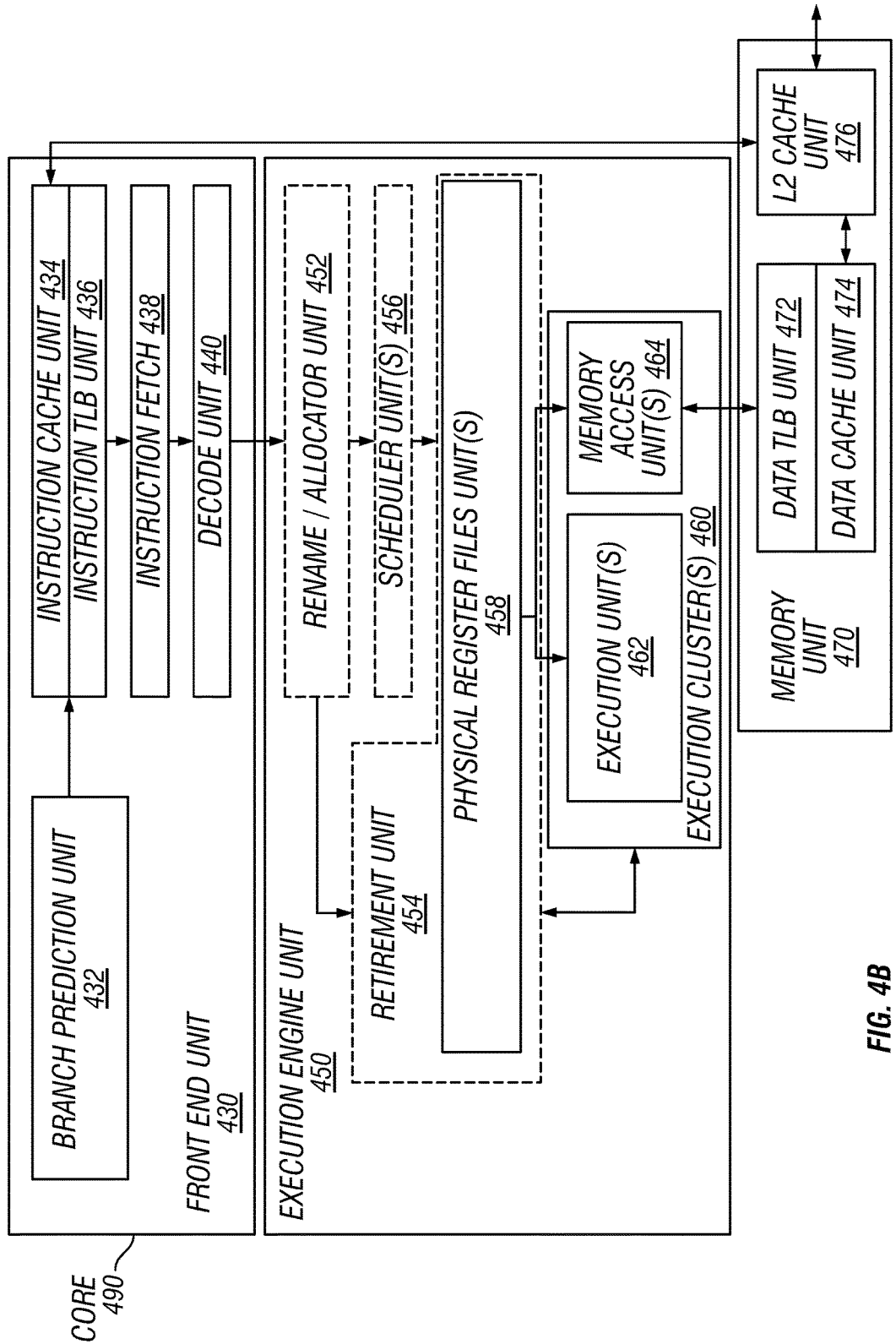
FIG. 4B is a block diagram illustrating an in-order architecture core and a register renaming logic, out-of-order issue/execution logic to be included in a processor, in accordance with embodiments of the present disclosure.

FIG. 4A is a block diagram illustrating an in-order pipeline and a register renaming stage, out-of-order issue/execution pipeline, in accordance with embodiments of the present disclosure. FIG. 4B is a block diagram illustrating an in-order architecture core and circuitry for register renaming, circuitry for out-of-order issue/execution to be included in a processor, in accordance with embodiments of the present disclosure. The solid lined boxes in FIG. 4A illustrate the in-order pipeline, while the dashed lined boxes illustrates the register renaming, out-of-order issue/execution pipeline. Similarly, the solid lined boxes in FIG. 4B illustrate the in-order architecture logic, while the dashed lined boxes illustrates the register renaming logic and out-of-order issue/execution logic.

In FIG. 4A, a processor pipeline 400 may include a fetch stage 402, a length decode stage 404, a decode stage 406, an allocation stage 408, a renaming stage 410, a scheduling (also known as a dispatch or issue) stage 412, a register read/memory read stage 414, an execute stage 416, a writeback/memory-write stage 418, an exception handling stage 422, and a commit stage 424.

In FIG. 4B, arrows denote a coupling between two or more units and the direction of the arrow indicates a direction of data flow between those units. FIG. 4B shows processor core 490 including a front end unit 430 coupled to an execution engine unit 450, and both may be coupled to a memory unit 470.

Core 490 may be a reduced instruction set computing (RISC) core, a complex instruction set computing (CISC) core, a very long instruction word (VLIW) core, or a hybrid or alternative core type. In one embodiment, core 490 may be a special-purpose core, such as, for example, a network or communication core, compression engine, graphics core, or the like.

Front end unit 430 may include a branch prediction unit 432 coupled to an instruction cache unit 434. Instruction cache unit 434 may be coupled to an instruction translation lookaside buffer (TLB) 436. TLB 436 may be coupled to an instruction fetch unit 438, which is coupled to a decode unit 440. Decode unit 440 may decode instructions, and generate as an output one or more micro-operations, micro-code entry points, microinstructions, other instructions, or other control signals, which may be decoded from, or which otherwise reflect, or may be derived from, the original instructions. The decoder may be implemented using various different mechanisms. Examples of suitable mechanisms include, but are not limited to, look-up tables, hardware implementations, programmable logic arrays (PLAs), microcode read-only memories (ROMs), etc. In one embodiment, instruction cache unit 434 may be further coupled to a level 2 (L2) cache unit 476 in memory unit 470. Decode unit 440 may be coupled to a rename/allocator unit 452 in execution engine unit 450.

Execution engine unit 450 may include rename/allocator unit 452 coupled to a retirement unit 454 and a set of one or more scheduler units 456. Scheduler units 456 represent any number of different schedulers, including reservations stations, central instruction window, etc. Scheduler units 456 may be coupled to physical register file units 458. Each of physical register file units 458 represents one or more physical register files, different ones of which store one or more different data types, such as scalar integer, scalar floating point, packed integer, packed floating point, vector integer, vector floating point, etc., status (e.g., an instruction pointer that is the address of the next instruction to be executed), etc. Physical register file units 458 may be overlapped by retirement unit 154 to illustrate various ways in which register renaming and out-of-order execution may be implemented (e.g., using one or more reorder buffers and one or more retirement register files, using one or more future files, one or more history buffers, and one or more retirement register files; using register maps and a pool of registers; etc.). Generally, the architectural registers may be visible from the outside of the processor or from a programmer's perspective. The registers might not be limited to any known particular type of circuit. Various different types of registers may be suitable as long as they store and provide data as described herein. Examples of suitable registers include, but might not be limited to, dedicated physical registers, dynamically allocated physical registers using register renaming, combinations of dedicated and dynamically allocated physical registers, etc. Retirement unit 454 and physical register file units 458 may be coupled to execution clusters 460. Execution clusters 460 may include a set of one or more execution units 162 and a set of one or more memory access units 464. Execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. Scheduler units 456, physical register file units 458, and execution clusters 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file unit, and/or execution cluster—and in the case of a separate memory access pipeline, certain embodiments may be implemented in which only the execution cluster of this pipeline has memory access units 464). It should also be understood that where separate pipelines are used, one or more of these pipelines may be out-of-order issue/execution and the rest in-order.

The set of memory access units 464 may be coupled to memory unit 470, which may include a data TLB unit 472 coupled to a data cache unit 474 coupled to a level 2 (L2) cache unit 476. In one exemplary embodiment, memory access units 464 may include a load unit, a store address unit, and a store data unit, each of which may be coupled to data TLB unit 472 in memory unit 470. L2 cache unit 476 may be coupled to one or more other levels of cache and eventually to a main memory.

By way of example, the exemplary register renaming, out-of-order issue/execution core architecture may implement pipeline 400 as follows: 1) instruction fetch 438 may perform fetch and length decoding stages 402 and 404; 2) decode unit 440 may perform decode stage 406; 3) rename/allocator unit 452 may perform allocation stage 408 and renaming stage 410; 4) scheduler units 456 may perform schedule stage 412; 5) physical register file units 458 and memory unit 470 may perform register read/memory read stage 414; execution cluster 460 may perform execute stage 416; 6) memory unit 470 and physical register file units 458 may perform write-back/memory-write stage 418; 7) various units may be involved in the performance of exception handling stage 422; and 8) retirement unit 454 and physical register file units 458 may perform commit stage 424.

Core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.).

It should be understood that the core may support multithreading (executing two or more parallel sets of operations or threads) in a variety of manners. Multithreading support may be performed by, for example, including time sliced multithreading, simultaneous multithreading (where a single physical core provides a logical core for each of the threads that physical core is simultaneously multithreading), or a combination thereof. Such a combination may include, for example, time sliced fetching and decoding and simultaneous multithreading thereafter such as in the Intel® Hyperthreading technology.

While register renaming may be described in the context of out-of-order execution, it should be understood that register renaming may be used in an in-order architecture. While the illustrated embodiment of the processor may also include a separate instruction and data cache units 434/474 and a shared L2 cache unit 476, other embodiments may have a single internal cache for both instructions and data, such as, for example, a Level 1 (L1) internal cache, or multiple levels of internal cache. In some embodiments, the system may include a combination of an internal cache and an external cache that may be external to the core and/or the processor. In other embodiments, all of the cache may be external to the core and/or the processor.

Figure 5A:
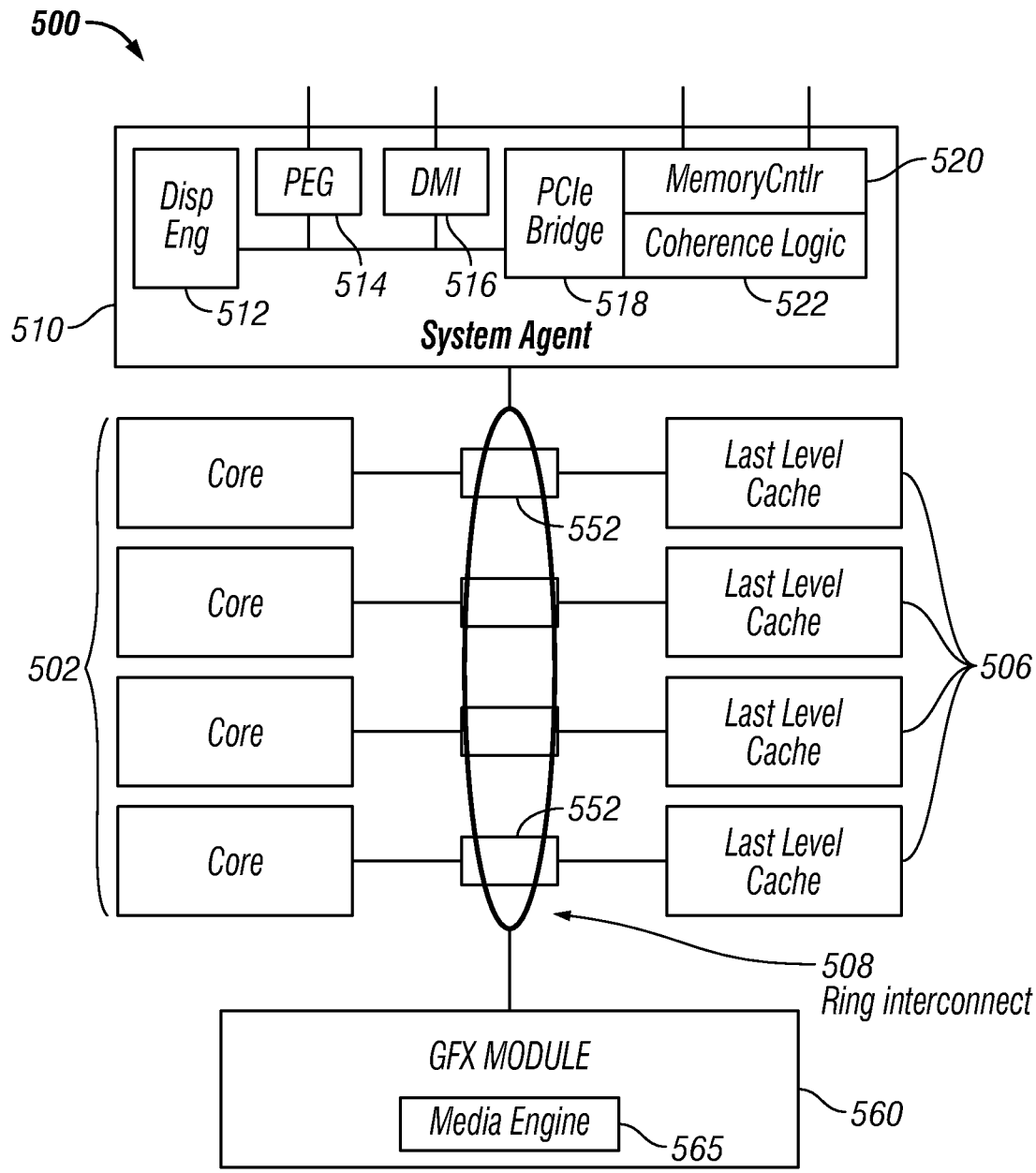
FIG. 5A is a block diagram of a processor, in accordance with embodiments of the present disclosure.

FIG. 5A is a block diagram of a processor 500, in accordance with embodiments of the present disclosure. In one embodiment, processor 500 may include a multicore processor. Processor 500 may include a system agent 510 communicatively coupled to one or more cores 502. Furthermore, cores 502 and system agent 510 may be communicatively coupled to one or more caches 506. Cores 502, system agent 510, and caches 506 may be communicatively coupled via one or more memory control units 552. Furthermore, cores 502, system agent 510, and caches 506 may be communicatively coupled to a graphics module 560 via memory control units 552.

Processor 500 may include any suitable mechanism for interconnecting cores 502, system agent 510, and caches 506, and graphics module 560. In one embodiment, processor 500 may include a ring-based interconnect unit 508 to interconnect cores 502, system agent 510, and caches 506, and graphics module 560. In other embodiments, processor 500 may include any number of well-known techniques for interconnecting such units. Ring-based interconnect unit 508 may utilize memory control units 552 to facilitate interconnections.

Processor 500 may include a memory hierarchy comprising one or more levels of caches within the cores, one or more shared cache units such as caches 506, or external memory (not shown) coupled to the set of integrated memory controller units 552. Caches 506 may include any suitable cache. In one embodiment, caches 506 may include one or more mid-level caches, such as level 2 (L2), level 3 (L3), level 4 (L4), or other levels of cache, a last level cache (LLC), and/or combinations thereof.

In various embodiments, one or more of cores 502 may perform multi-threading. System agent 510 may include components for coordinating and operating cores 502. System agent unit 510 may include for example a power control unit (PCU). The PCU may be or include logic and components needed for regulating the power state of cores 502. System agent 510 may include a display engine 512 for driving one or more externally connected displays or graphics module 560. System agent 510 may include an interface for communications busses for graphics. In one embodiment, the interface may be implemented by PCI Express (PCIe). In a further embodiment, the interface may be implemented by PCI Express Graphics (PEG) 514. System agent 510 may include a direct media interface (DMI) 516. DMI 516 may provide links between different bridges on a motherboard or other portion of a computer system. System agent 510 may include a PCIe bridge 518 for providing PCIe links to other elements of a computing system. PCIe bridge 518 may be implemented using a memory controller 520 and coherence logic 522.

Cores 502 may be implemented in any suitable manner. Cores 502 may be homogenous or heterogeneous in terms of architecture and/or instruction set. In one embodiment, some of cores 502 may be in-order while others may be out-of-order. In another embodiment, two or more of cores 502 may execute the same instruction set, while others may execute only a subset of that instruction set or a different instruction set.

Processor 500 may include a general-purpose processor, such as a Core™ i3, i5, i7, 2 Duo and Quad, Xeon™, Itanium™, XScale™ or StrongARM™ processor, which may be available from Intel Corporation, of Santa Clara, Calif. Processor 500 may be provided from another company, such as ARM Holdings, Ltd, MIPS, etc. Processor 500 may be a special-purpose processor, such as, for example, a network or communication processor, compression engine, graphics processor, co-processor, embedded processor, or the like. Processor 500 may be implemented on one or more chips. Processor 500 may be a part of and/or may be implemented on one or more substrates using any of a number of process technologies, such as, for example, BiCMOS, CMOS, or NMOS.

In one embodiment, a given one of caches 506 may be shared by multiple ones of cores 502. In another embodiment, a given one of caches 506 may be dedicated to one of cores 502. The assignment of caches 506 to cores 502 may be handled by a cache controller or other suitable mechanism. A given one of caches 506 may be shared by two or more cores 502 by implementing time-slices of a given cache 506.

Graphics module 560 may implement an integrated graphics processing subsystem. In one embodiment, graphics module 560 may include a graphics processor. Furthermore, graphics module 560 may include a media engine 565. Media engine 565 may provide media encoding and video decoding.

Figure 5B:
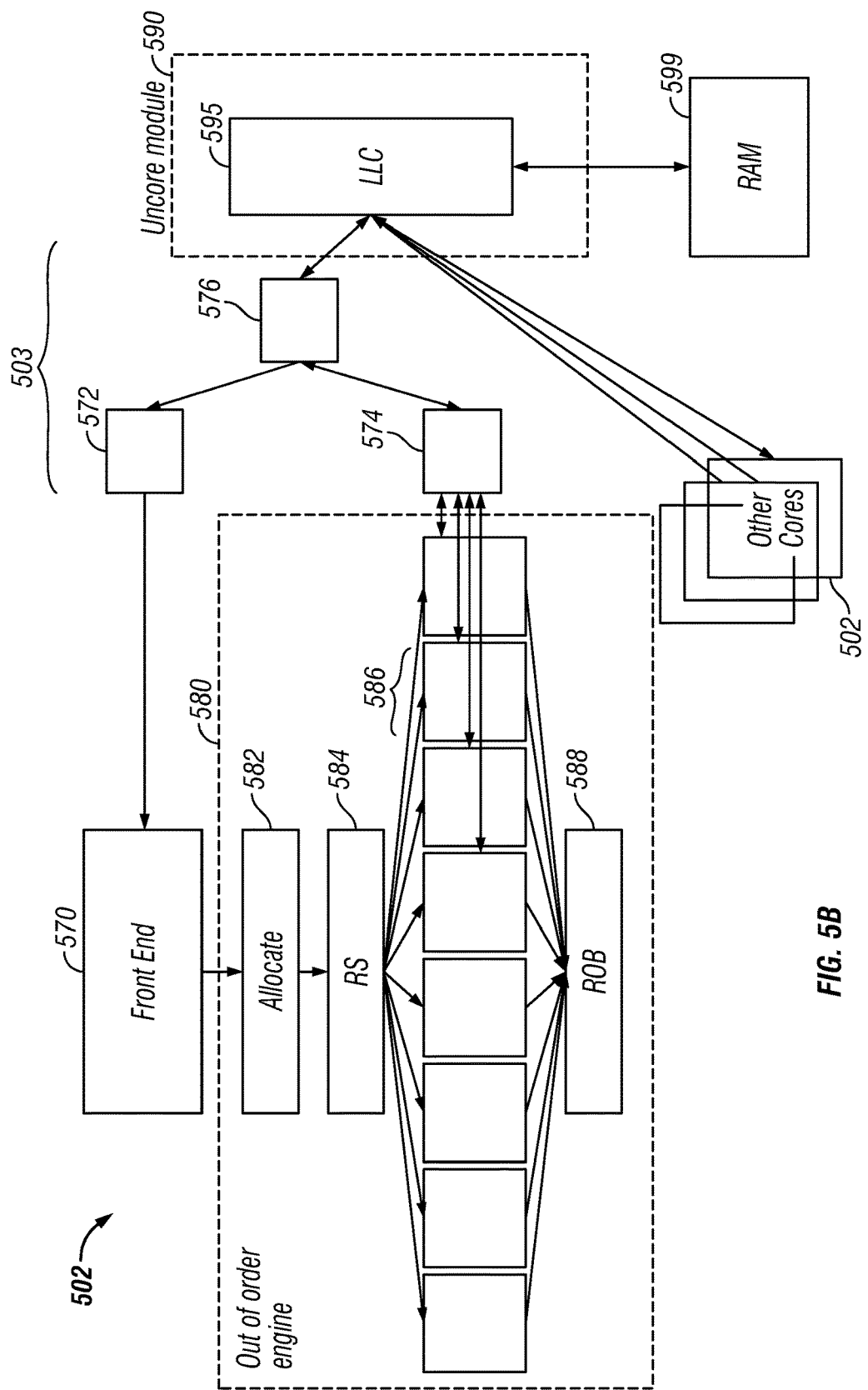
FIG. 5B is a block diagram of an example implementation of a core, in accordance with embodiments of the present disclosure.

FIG. 5B is a block diagram of an example implementation of a core 502, in accordance with embodiments of the present disclosure. Core 502 may include a front end 570 communicatively coupled to an out-of-order engine 580. Core 502 may be communicatively coupled to other portions of processor 500 through cache hierarchy 503.

Front end 570 may be implemented in any suitable manner, such as fully or in part by front end 201 as described above. In one embodiment, front end 570 may communicate with other portions of processor 500 through cache hierarchy 503. In a further embodiment, front end 570 may fetch instructions from portions of processor 500 and prepare the instructions to be used later in the processor pipeline as they are passed to out-of-order execution engine 580.

Out-of-order execution engine 580 may be implemented in any suitable manner, such as fully or in part by out-of-order execution engine 203 as described above. Out-of-order execution engine 580 may prepare instructions received from front end 570 for execution. Out-of-order execution engine 580 may include an allocate module 1282. In one embodiment, allocate module 1282 may allocate resources of processor 500 or other resources, such as registers or buffers, to execute a given instruction. Allocate module 1282 may make allocations in schedulers, such as a memory scheduler, fast scheduler, or floating point scheduler. Such schedulers may be represented in FIG. 5B by resource schedulers 584. Allocate module 1282 may be implemented fully or in part by the allocation logic described in conjunction with FIG. 2. Resource schedulers 584 may determine when an instruction is ready to execute based on the readiness of a given resource's sources and the availability of execution resources needed to execute an instruction. Resource schedulers 584 may be implemented by, for example, schedulers 202, 204, 206 as discussed above. Resource schedulers 584 may schedule the execution of instructions upon one or more resources. In one embodiment, such resources may be internal to core 502, and may be illustrated, for example, as resources 586. In another embodiment, such resources may be external to core 502 and may be accessible by, for example, cache hierarchy 503. Resources may include, for example, memory, caches, register files, or registers. Resources internal to core 502 may be represented by resources 586 in FIG. 5B. As necessary, values written to or read from resources 586 may be coordinated with other portions of processor 500 through, for example, cache hierarchy 503. As instructions are assigned resources, they may be placed into a reorder buffer 588. Reorder buffer 588 may track instructions as they are executed and may selectively reorder their execution based upon any suitable criteria of processor 500. In one embodiment, reorder buffer 588 may identify instructions or a series of instructions that may be executed independently. Such instructions or a series of instructions may be executed in parallel from other such instructions. Parallel execution in core 502 may be performed by any suitable number of separate execution blocks or virtual processors. In one embodiment, shared resources—such as memory, registers, and caches—may be accessible to multiple virtual processors within a given core 502. In other embodiments, shared resources may be accessible to multiple processing entities within processor 500.

Cache hierarchy 503 may be implemented in any suitable manner. For example, cache hierarchy 503 may include one or more lower or mid-level caches, such as caches 572, 574 through logic block 576. In one embodiment, cache hierarchy 503 may include an LLC 595 communicatively coupled to caches 572, 574. In another embodiment, LLC 595 may be implemented in a module 590 accessible to all processing entities of processor 500. In a further embodiment, module 590 may be implemented in an uncore module of processors from Intel, Inc. Module 590 may include portions or subsystems of processor 500 necessary for the execution of core 502 but might not be implemented within core 502. Besides LLC 595, Module 590 may include, for example, hardware interfaces, memory coherency coordinators, interprocessor interconnects, instruction pipelines, or memory controllers. Access to RAM 599 available to processor 500 may be made through module 590 and, more specifically, LLC 595. Furthermore, other instances of core 502 may similarly access module 590. Coordination of the instances of core 502 may be facilitated in part through module 590.

Figure 6:
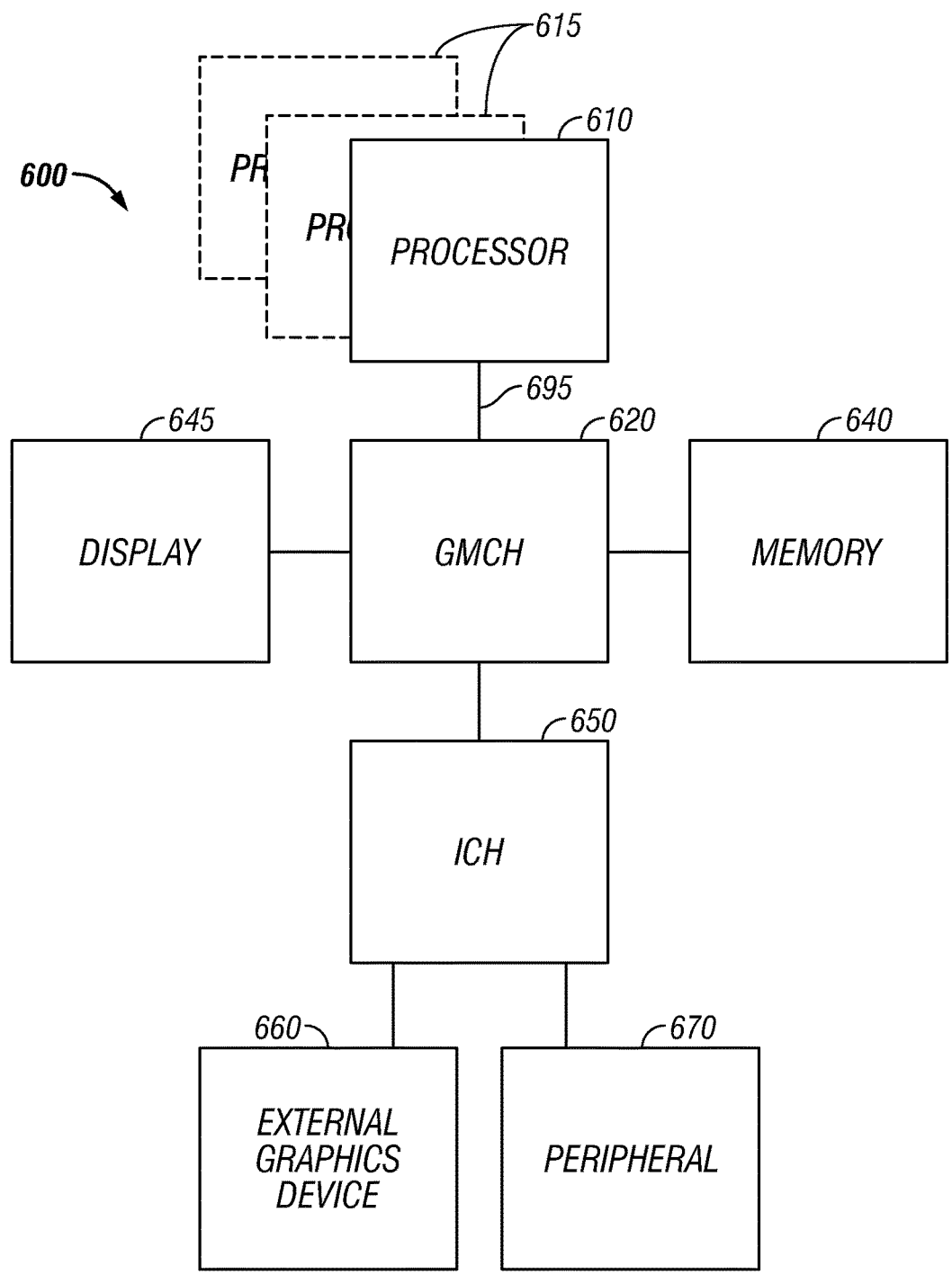
FIG. 6 is a block diagram of a system, in accordance with embodiments of the present disclosure.
Figure 7:
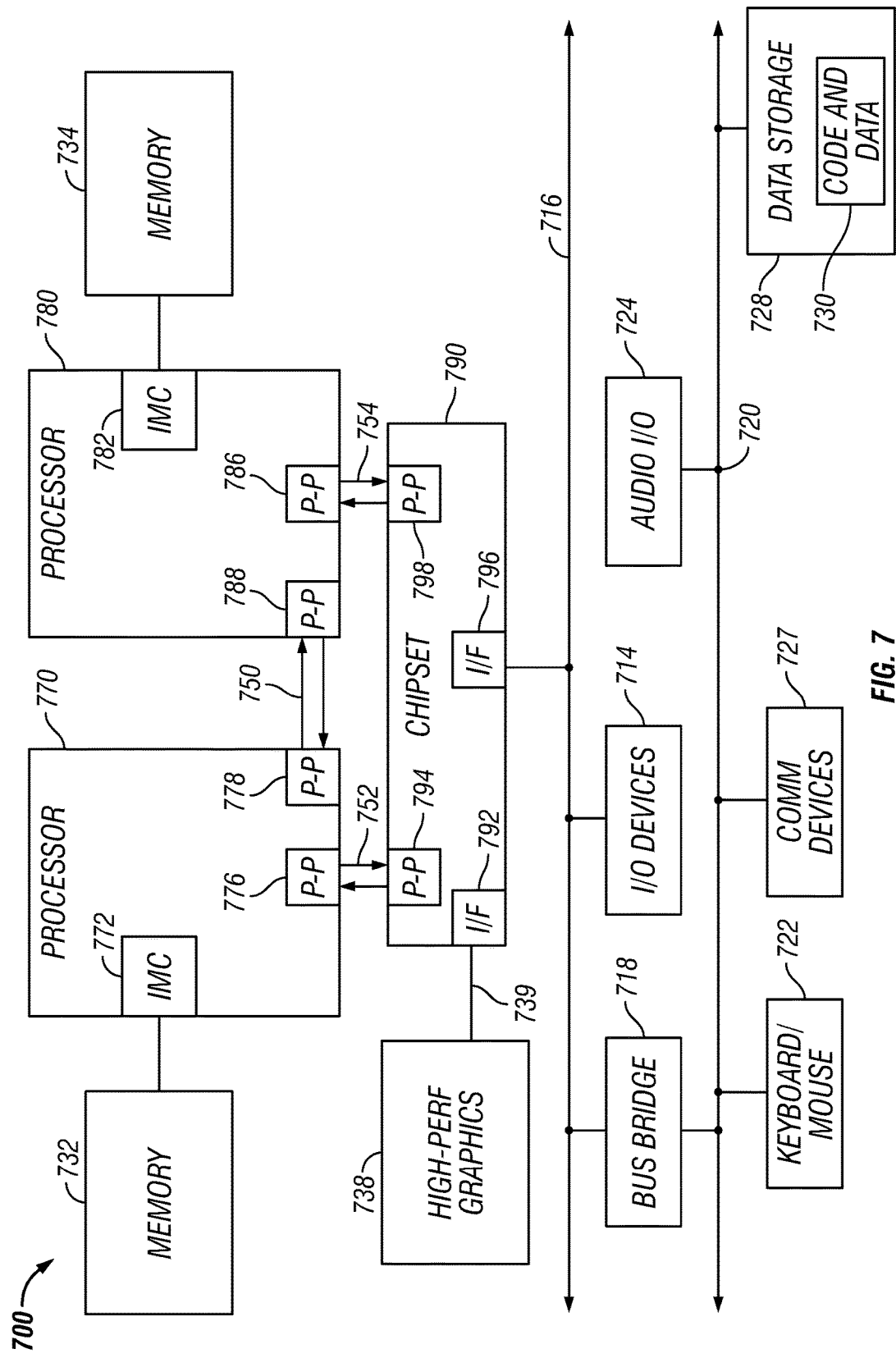
FIG. 7 is a block diagram of a second system, in accordance with embodiments of the present disclosure.
Figure 8:
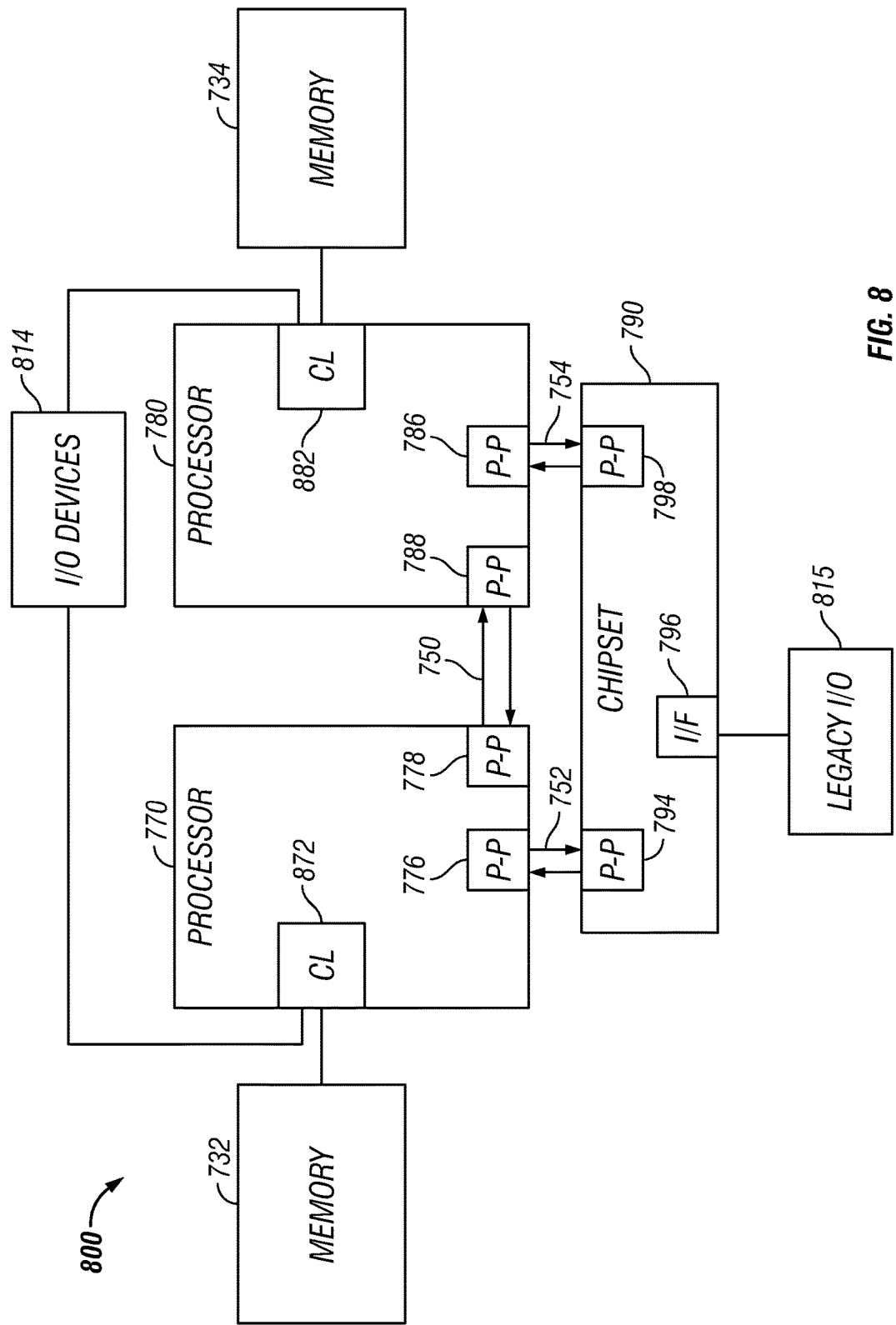
FIG. 8 is a block diagram of a third system in accordance with embodiments of the present disclosure.
Figure 9:
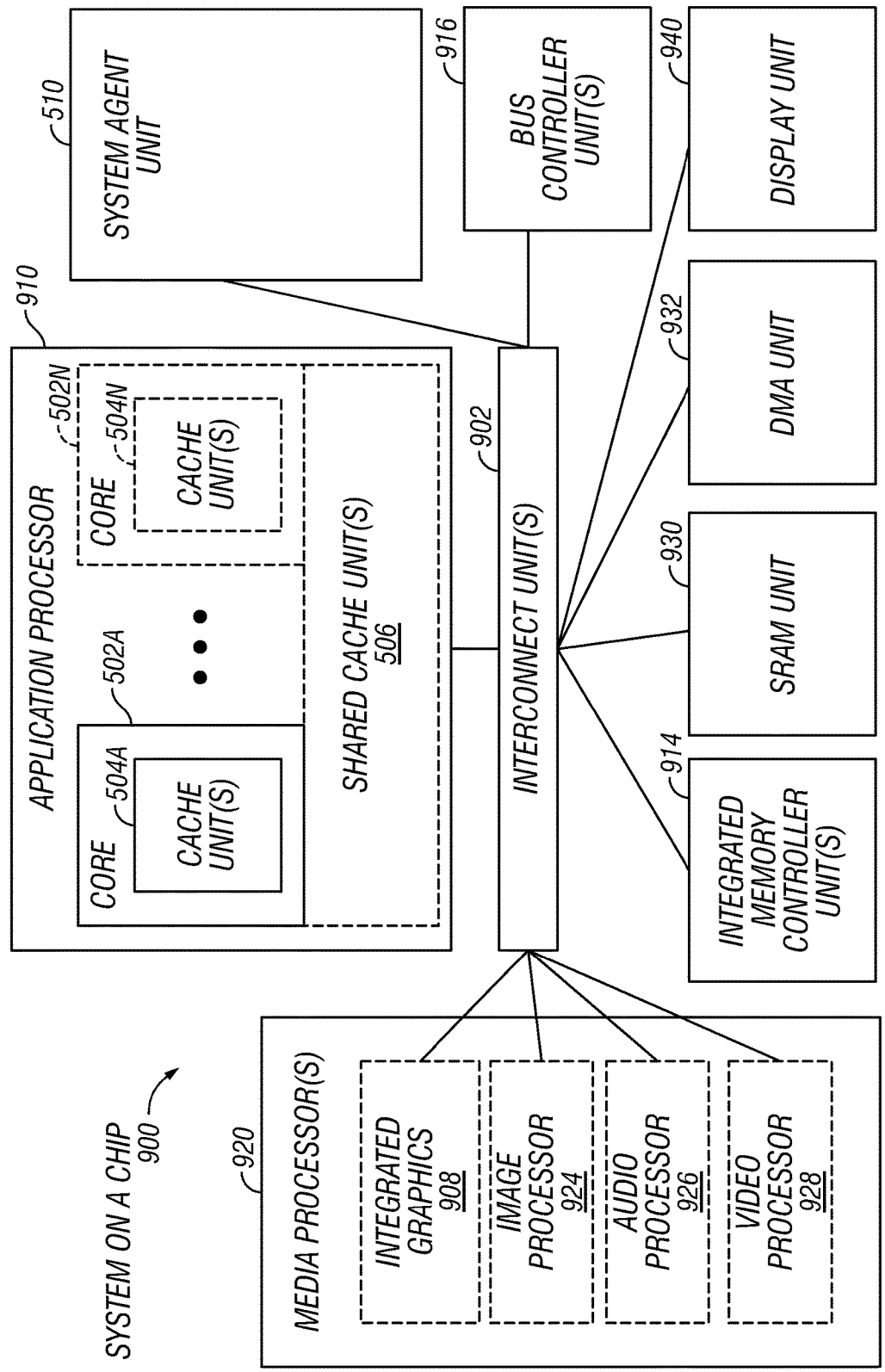
FIG. 9 is a block diagram of a system-on-a-chip, in accordance with embodiments of the present disclosure.

FIGS. 6-8 may illustrate exemplary systems suitable for including processor 500, while FIG. 9 may illustrate an exemplary system on a chip (SoC) that may include one or more of cores 502. Other system designs and implementations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, may also be suitable. In general, a huge variety of systems or electronic devices that incorporate a processor and/or other execution logic as disclosed herein may be generally suitable.

FIG. 6 illustrates a block diagram of a system 600, in accordance with embodiments of the present disclosure. System 600 may include one or more processors 610, 615, which may be coupled to graphics memory controller hub (GMCH) 620. The optional nature of additional processors 615 is denoted in FIG. 6 with broken lines.

Each processor 610,615 may be some version of processor 500. However, it should be noted that integrated graphics logic and integrated memory control units might not exist in processors 610,615. FIG. 6 illustrates that GMCH 620 may be coupled to a memory 640 that may be, for example, a dynamic random access memory (DRAM). The DRAM may, for at least one embodiment, be associated with a non-volatile cache.

GMCH 620 may be a chipset, or a portion of a chipset. GMCH 620 may communicate with processors 610, 615 and control interaction between processors 610, 615 and memory 640. GMCH 620 may also act as an accelerated bus interface between the processors 610, 615 and other elements of system 600. In one embodiment, GMCH 620 communicates with processors 610, 615 via a multi-drop bus, such as a frontside bus (FSB) 695.

Furthermore, GMCH 620 may be coupled to a display 645 (such as a flat panel display). In one embodiment, GMCH 620 may include an integrated graphics accelerator. GMCH 620 may be further coupled to an input/output (I/O) controller hub (ICH) 650, which may be used to couple various peripheral devices to system 600. External graphics device 660 may include be a discrete graphics device coupled to ICH 650 along with another peripheral device 670.

In other embodiments, additional or different processors may also be present in system 600. For example, additional processors 610, 615 may include additional processors that may be the same as processor 610, additional processors that may be heterogeneous or asymmetric to processor 610, accelerators (such as, e.g., graphics accelerators or digital signal processing (DSP) units), field programmable gate arrays, or any other processor. There may be a variety of differences between the physical resources 610, 615 in terms of a spectrum of metrics of merit including architectural, micro-architectural, thermal, power consumption characteristics, and the like. These differences may effectively manifest themselves as asymmetry and heterogeneity amongst processors 610, 615. For at least one embodiment, various processors 610, 615 may reside in the same die package.

FIG. 7 illustrates a block diagram of a second system 700, in accordance with embodiments of the present disclosure. As shown in FIG. 7, multiprocessor system 700 may include a point-to-point interconnect system, and may include a first processor 770 and a second processor 780 coupled via a point-to-point interconnect 750. Each of processors 770 and 780 may be some version of processor 500 as one or more of processors 610,615.

While FIG. 7 may illustrate two processors 770, 780, it is to be understood that the scope of the present disclosure is not so limited. In other embodiments, one or more additional processors may be present in a given processor.

Processors 770 and 780 are shown including integrated memory controller units 772 and 782, respectively. Processor 770 may also include as part of its bus controller units point-to-point (P-P) interfaces 776 and 778; similarly, second processor 780 may include P-P interfaces 786 and 788. Processors 770, 780 may exchange information via a point-to-point (P-P) interface 750 using P-P interface circuits 778, 788. As shown in FIG. 7, IMCs 772 and 782 may couple the processors to respective memories, namely a memory 732 and a memory 734, which in one embodiment may be portions of main memory locally attached to the respective processors.

Processors 770, 780 may each exchange information with a chipset 790 via individual P-P interfaces 752, 754 using point to point interface circuits 776, 794, 786, 798. In one embodiment, chipset 790 may also exchange information with a high-performance graphics circuit 738 via interface 792 over a high-performance graphics bus 739.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present disclosure is not so limited.

As shown in FIG. 7, various I/O devices 714 may be coupled to first bus 716, along with a bus bridge 718 which couples first bus 716 to a second bus 720. In one embodiment, second bus 720 may be a low pin count (LPC) bus. Various devices may be coupled to second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to second bus 720. Note that other architectures may be possible. For example, instead of the point-to-point architecture of FIG. 7, a system may implement a multi-drop bus or other such architecture.

FIG. 8 illustrates a block diagram of a third system 800 in accordance with embodiments of the present disclosure. Like elements in FIGS. 7 and 8 bear like reference numerals, and certain aspects of FIG. 7 have been omitted from FIG. 8 in order to avoid obscuring other aspects of FIG. 8.

FIG. 8 illustrates that processors 870, 880 may include integrated memory and I/O control logic ("CL") 872 and 882, respectively. For at least one embodiment, CL 872, 882 may include integrated memory controller units such as that described above in connection with FIGS. 5 and 7. In addition, CL 872, 882 may also include I/O control logic. FIG. 8 illustrates that not only memories 832, 834 may be coupled to CL 872, 882, but also that I/O devices 814 may also be coupled to control logic 872, 882. Legacy I/O devices 815 may be coupled to chipset 890.

FIG. 9 illustrates a block diagram of a SoC 900, in accordance with embodiments of the present disclosure. Similar elements in FIG. 5 bear like reference numerals. Also, dashed lined boxes may represent optional features on more advanced SoCs. An interconnect units 902 may be coupled to: an application processor 910 which may include a set of one or more cores 502A-N, including respective local caches 504A-N, and shared cache units 506; a system agent unit 510; a bus controller units 916; an integrated memory controller units 914; a set or one or more media processors 920 which may include integrated graphics logic 908, an image processor 924 for providing still and/or video camera functionality, an audio processor 926 for providing hardware audio acceleration, and a video processor 928 for providing video encode/decode acceleration; an static random access memory (SRAM) unit 930; a direct memory access (DMA) unit 932; and a display unit 940 for coupling to one or more external displays.

Figure 10:
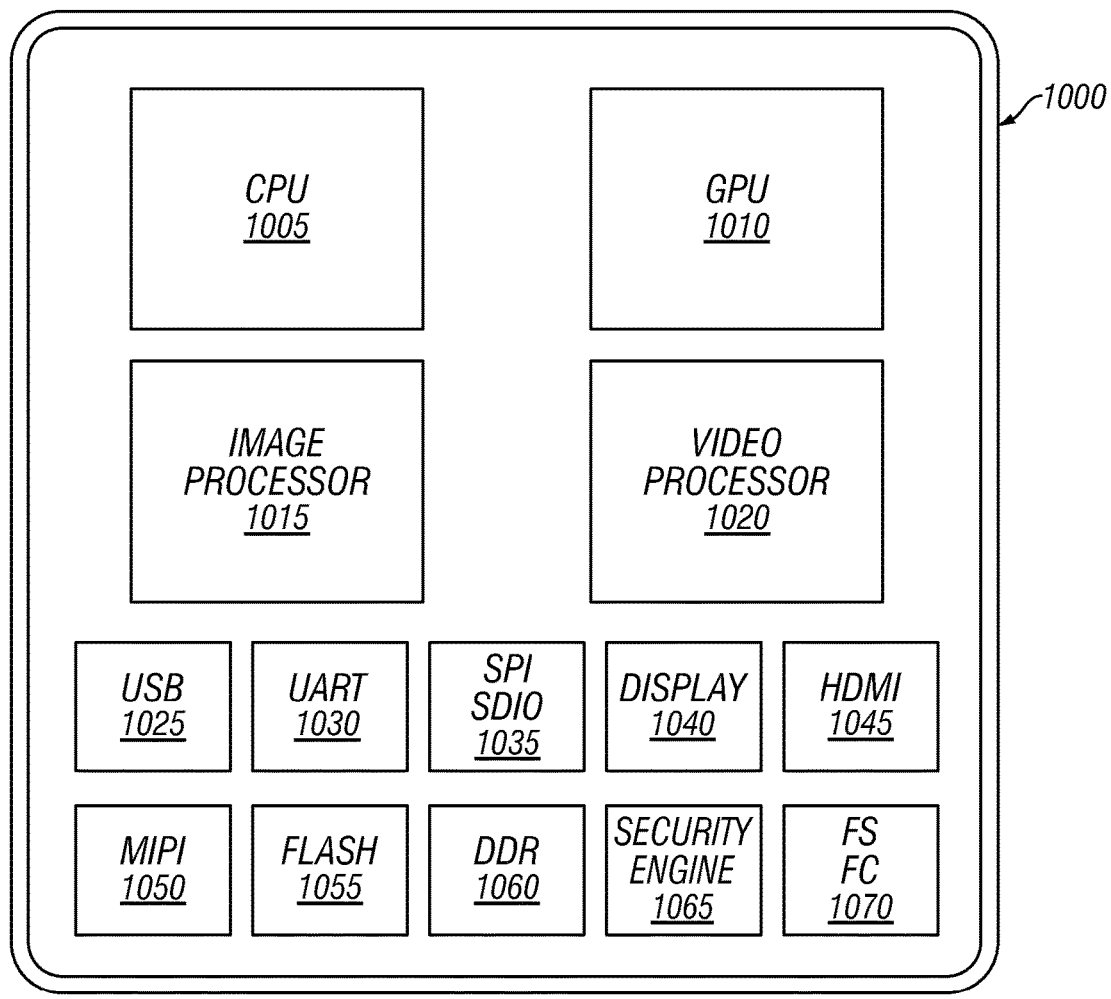
FIG. 10 illustrates a processor containing a central processing unit and a graphics processing unit which may perform at least one instruction, in accordance with embodiments of the present disclosure.

FIG. 10 illustrates a processor containing a central processing unit (CPU) and a graphics processing unit (GPU), which may perform at least one instruction, in accordance with embodiments of the present disclosure. In one embodiment, an instruction to perform operations according to at least one embodiment could be performed by the CPU. In another embodiment, the instruction could be performed by the GPU. In still another embodiment, the instruction may be performed through a combination of operations performed by the GPU and the CPU. For example, in one embodiment, an instruction in accordance with one embodiment may be received and decoded for execution on the GPU. However, one or more operations within the decoded instruction may be performed by a CPU and the result returned to the GPU for final retirement of the instruction. Conversely, in some embodiments, the CPU may act as the primary processor and the GPU as the co-processor.

In some embodiments, instructions that benefit from highly parallel, throughput processors may be performed by the GPU, while instructions that benefit from the performance of processors that benefit from deeply pipelined architectures may be performed by the CPU. For example, graphics, scientific applications, financial applications and other parallel workloads may benefit from the performance of the GPU and be executed accordingly, whereas more sequential applications, such as operating system kernel or application code may be better suited for the CPU.

In FIG. 10, processor 1000 includes a CPU 1005, GPU 1010, image processor 1015, video processor 1020, USB controller 1025, UART controller 1030, SPI/SDIO controller 1035, display device 1040, memory interface controller 1045, MIPI controller 1050, flash memory controller 1055, dual data rate (DDR) controller 1060, security engine 1065, and I²S/I²C controller 1070. Other logic and circuits may be included in the processor of FIG. 10, including more CPUs or GPUs and other peripheral interface controllers.

One or more aspects of at least one embodiment may be implemented by representative data stored on a machine-readable medium which represents various logic within the processor, which when read by a machine causes the machine to fabricate logic to perform the techniques described herein. Such representations, known as "IP cores" may be stored on a tangible, machine-readable medium ("tape") and supplied to various customers or manufacturing facilities to load into the fabrication machines that actually make the logic or processor. For example, IP cores, such as the Cortex™ family of processors developed by ARM Holdings, Ltd. and Loongson IP cores developed the Institute of Computing Technology (ICT) of the Chinese Academy of Sciences may be licensed or sold to various customers or licensees, such as Texas Instruments, Qualcomm, Apple, or Samsung and implemented in processors produced by these customers or licensees.

Figure 11:
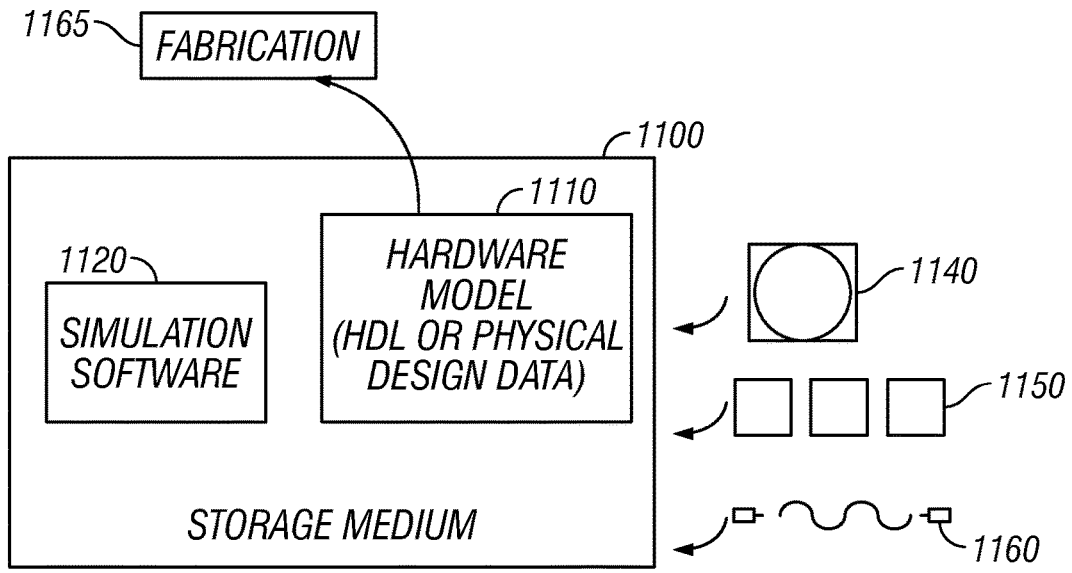
FIG. 11 is a block diagram illustrating the development of IP cores, in accordance with embodiments of the present disclosure.

FIG. 11 illustrates a block diagram illustrating the development of IP cores, in accordance with embodiments of the present disclosure. Storage 1130 may include simulation software 1120 and/or hardware or software model 1110. In one embodiment, the data representing the IP core design may be provided to storage 1130 via memory 1140 (e.g., hard disk), wired connection (e.g., internet) 1150 or wireless connection 1160. The IP core information generated by the simulation tool and model may then be transmitted to a fabrication facility where it may be fabricated by a 3$^{rd}$ party to perform at least one instruction in accordance with at least one embodiment.

In some embodiments, one or more instructions may correspond to a first type or architecture (e.g., x86) and be translated or emulated on a processor of a different type or architecture (e.g., ARM). An instruction, according to one embodiment, may therefore be performed on any processor or processor type, including ARM, x86, MIPS, a GPU, or other processor type or architecture.

Figure 12:
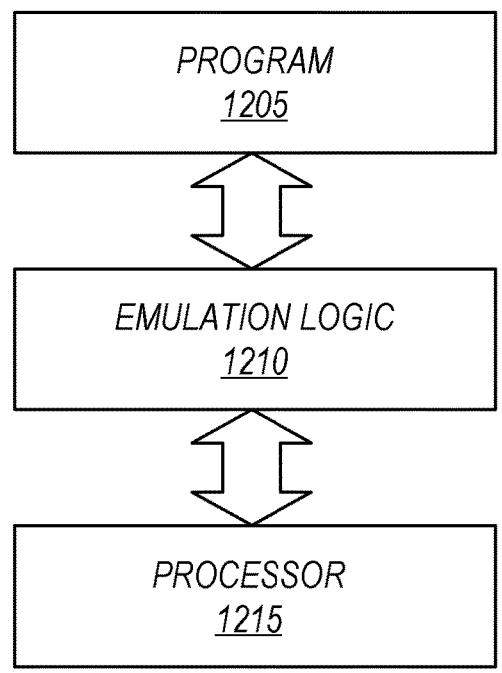
FIG. 12 illustrates how an instruction of a first type may be emulated by a processor of a different type, in accordance with embodiments of the present disclosure.

FIG. 12 illustrates how an instruction of a first type may be emulated by a processor of a different type, in accordance with embodiments of the present disclosure. In FIG. 12, program 1205 contains some instructions that may perform the same or substantially the same function as an instruction according to one embodiment. However the instructions of program 1205 may be of a type and/or format that is different from or incompatible with processor 1215, meaning the instructions of the type in program 1205 may not be able to execute natively by the processor 1215. However, with the help of emulation logic, 1210, the instructions of program 1205 may be translated into instructions that may be natively be executed by the processor 1215. In one embodiment, the emulation logic may be embodied in hardware. In another embodiment, the emulation logic may be embodied in a tangible, machine-readable medium containing software to translate instructions of the type in program 1205 into the type natively executable by processor 1215. In other embodiments, emulation logic may be a combination of fixed-function or programmable hardware and a program stored on a tangible, machine-readable medium. In one embodiment, the processor contains the emulation logic, whereas in other embodiments, the emulation logic exists outside of the processor and may be provided by a third party. In one embodiment, the processor may load the emulation logic embodied in a tangible, machine-readable medium containing software by executing microcode or firmware contained in or associated with the processor.

Figure 13:
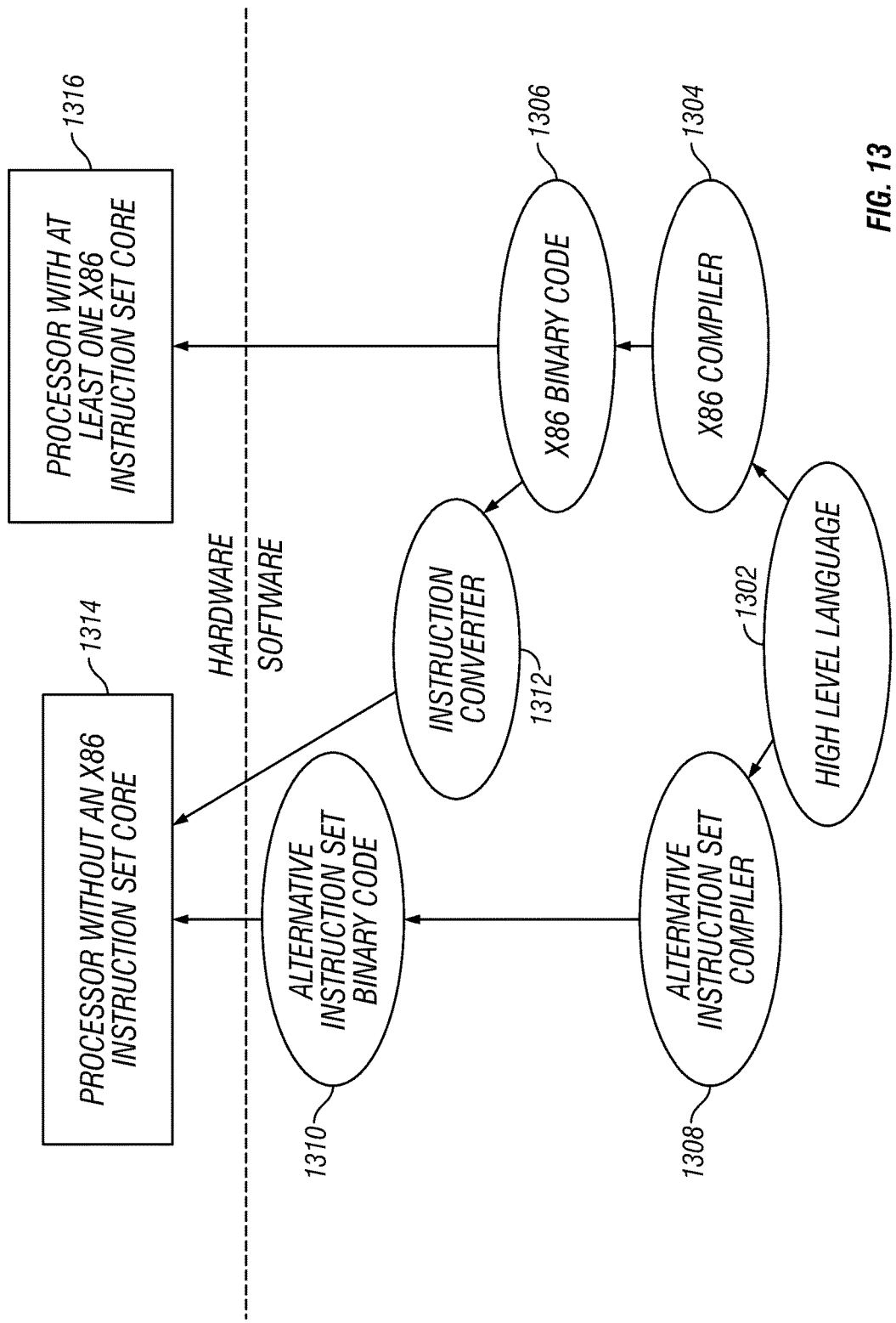
FIG. 13 illustrates a block diagram contrasting the use of a software instruction converter to convert binary instructions in a source instruction set to binary instructions in a target instruction set, in accordance with embodiments of the present disclosure.

FIG. 13 illustrates a block diagram contrasting the use of a software instruction converter to convert binary instructions in a source instruction set to binary instructions in a target instruction set, in accordance with embodiments of the present disclosure. In the illustrated embodiment, the instruction converter may be a software instruction converter, although the instruction converter may be implemented in software, firmware, hardware, or various combinations thereof. FIG. 13 shows a program in a high level language 1302 may be compiled using an x86 compiler 1304 to generate x86 binary code 1306 that may be natively executed by a processor with at least one x86 instruction set core 1316. The processor with at least one x86 instruction set core 1316 represents any processor that may perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. x86 compiler 1304 represents a compiler that may be operable to generate x86 binary code 1306 (e.g., object code) that may, with or without additional linkage processing, be executed on the processor with at least one x86 instruction set core 1316. Similarly, FIG. 13 shows the program in high level language 1302 may be compiled using an alternative instruction set compiler 1308 to generate alternative instruction set binary code 1310 that may be natively executed by a processor without at least one x86 instruction set core 1314 (e.g., a processor with cores that execute the MIPS instruction set of MIPS Technologies of Sunnyvale, Calif. and/or that execute the ARM instruction set of ARM Holdings of Sunnyvale, Calif.). Instruction converter 1312 may be used to convert x86 binary code 1306 into code that may be natively executed by the processor without an x86 instruction set core 1314. This converted code might not be the same as alternative instruction set binary code 1310; however, the converted code will accomplish the general operation and be made up of instructions from the alternative instruction set. Thus, instruction converter 1312 represents software, firmware, hardware, or a combination thereof that, through emulation, simulation or any other process, allows a processor or other electronic device that does not have an x86 instruction set processor or core to execute x86 binary code 1306. For example, instruction converter 1312 may include a binary translator, which may convert x86 binary code 1306 into code suitable for execution by the processor without an x86 instruction set core 1314. In one embodiment, the instruction converter 1312 may be represented on a machine-readable.

Figure 14:
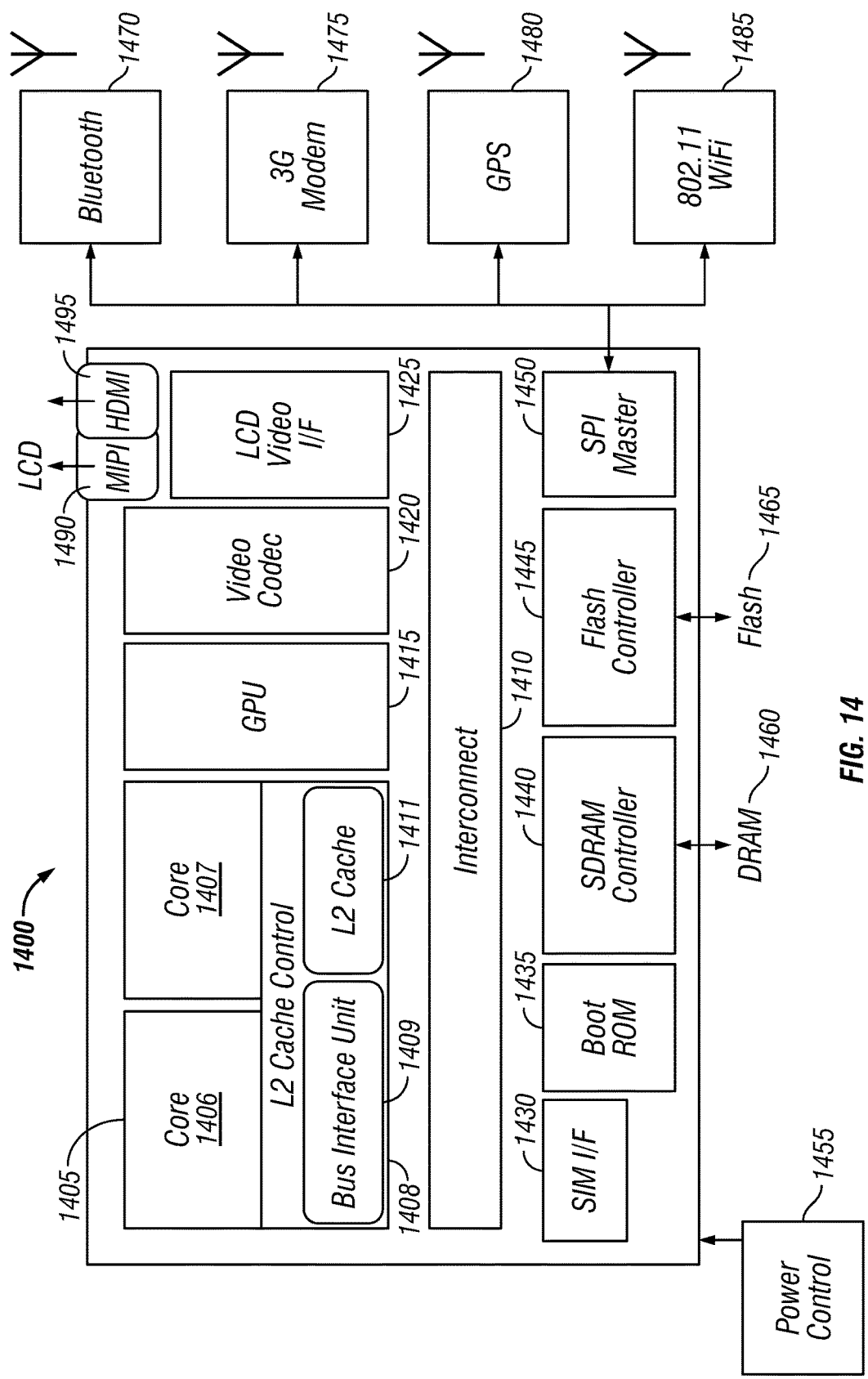
FIG. 14 is a block diagram of an instruction set architecture of a processor, in accordance with embodiments of the present disclosure.

FIG. 14 is a block diagram of an instruction set architecture 1400 of a processor, in accordance with embodiments of the present disclosure. Instruction set architecture 1400 may include any suitable number or kind of components.

For example, instruction set architecture 1400 may include processing entities such as one or more cores 1406, 1407 within a processor subsystem 1405 and a graphics processing unit 1415. Cores 1406, 1407 may be communicatively coupled to the rest of instruction set architecture 1400 through any suitable mechanism, such as through a bus or cache. In one embodiment, cores 1406, 1407 may be communicatively coupled through an L2 cache control 1408, which may include a bus interface unit 1409 and an L2 cache 1411. Cores 1406, 1407 and graphics processing unit 1415 may be communicatively coupled to each other and to the remainder of instruction set architecture 1400 through interconnect 1410. In one embodiment, graphics processing unit 1415 may use a video code 1420 defining the manner in which particular video signals will be encoded and decoded for output.

Instruction set architecture 1400 may also include any number or kind of interfaces, controllers, or other mechanisms for interfacing or communicating with other portions of an electronic device or system. Such mechanisms may facilitate interaction with, for example, peripherals, communications devices, other processors, or memory. In the example of FIG. 14, instruction set architecture 1400 may include a liquid crystal display (LCD) video interface 1425, a subscriber interface module (SIM) interface 1430, a boot ROM interface 1435, a synchronous dynamic random access memory (SDRAM) controller 1440, a flash controller 1445, and a serial peripheral interface (SPI) master unit 1450. LCD video interface 1425 may provide output of video signals from, for example, GPU 1415 and through, for example, a mobile industry processor interface (MIPI) 1490 or a high-definition multimedia interface (HDMI) 1495 to a display. Such a display may include, for example, an LCD. SIM interface 1430 may provide access to or from a SIM card or device. SDRAM controller 1440 may provide access to or from memory such as an SDRAM chip or module. Flash controller 1445 may provide access to or from memory such as flash memory or other instances of RAM. SPI master unit 1450 may provide access to or from communications modules, such as a Bluetooth module 1470, high-speed 3G modem 1475, global positioning system module 1480, or wireless module 1485 implementing a communications standard such as 802.11. Instruction set architecture 1400 may further include a power control unit 1455.

Figure 15:
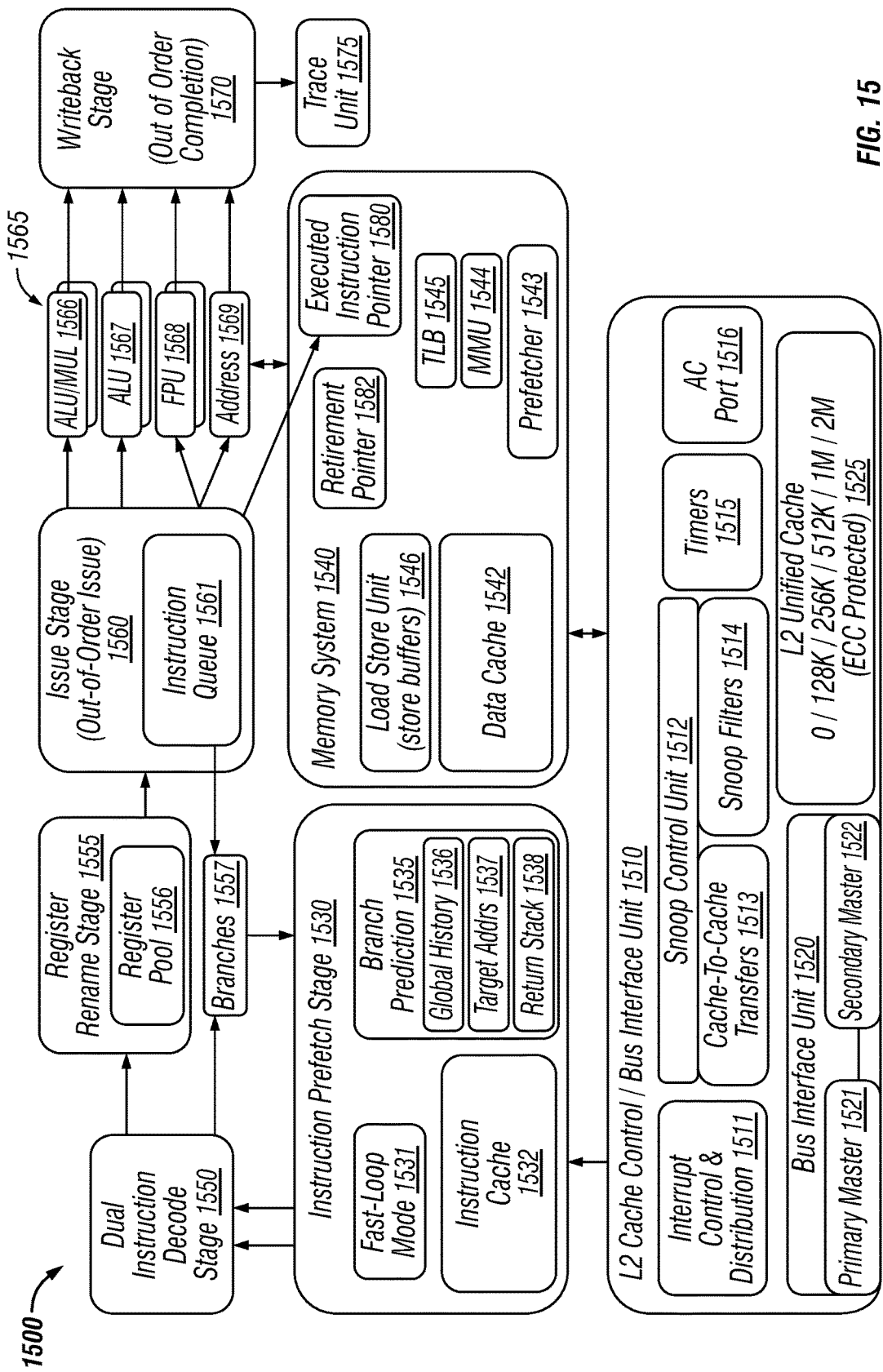
FIG. 15 is a more detailed block diagram of an instruction set architecture of a processor, in accordance with embodiments of the present disclosure.

FIG. 15 is a more detailed block diagram of an instruction set architecture 1500 of a processor, in accordance with embodiments of the present disclosure. Instruction architecture 1500 may implement one or more aspects of instruction set architecture 1400. Furthermore, instruction set architecture 1500 may illustrate modules and mechanisms for the execution of instructions within a processor.

Instruction architecture 1500 may include a memory system 1540 communicatively coupled to one or more execution entities 1565. Furthermore, instruction architecture 1500 may include a caching and bus interface unit such as unit 1510 communicatively coupled to execution entities 1565 and memory system 1540. In one embodiment, loading of instructions into execution entities 1564 may be performed by one or more stages of execution. Such stages may include, for example, instruction prefetch stage 1530, dual instruction decode stage 1550, register rename stage 155, issue stage 1560, and writeback stage 1570.

In one embodiment, memory system 1540 may include an executed instruction pointer 1580. Executed instruction pointer 1580 may store a value identifying the oldest, undispatched instruction within a batch of instructions. The oldest instruction may correspond to the lowest Program Order (PO) value. A PO may include a unique number of an instruction. Such an instruction may be a single instruction within a thread represented by multiple strands. A PO may be used in ordering instructions to ensure correct execution semantics of code. A PO may be reconstructed by mechanisms such as evaluating increments to PO encoded in the instruction rather than an absolute value. Such a reconstructed PO may be known as an "RPO." Although a PO may be referenced herein, such a PO may be used interchangeably with an RPO. A strand may include a sequence of instructions that are data dependent upon each other. The strand may be arranged by a binary translator at compilation time. Hardware executing a strand may execute the instructions of a given strand in order according to PO of the various instructions. A thread may include multiple strands such that instructions of different strands may depend upon each other. A PO of a given strand may be the PO of the oldest instruction in the strand which has not yet been dispatched to execution from an issue stage. Accordingly, given a thread of multiple strands, each strand including instructions ordered by PO, executed instruction pointer 1580 may store the oldest—illustrated by the lowest number—PO in the thread.

In another embodiment, memory system 1540 may include a retirement pointer 1582. Retirement pointer 1582 may store a value identifying the PO of the last retired instruction. Retirement pointer 1582 may be set by, for example, retirement unit 454. If no instructions have yet been retired, retirement pointer 1582 may include a null value.

Execution entities 1565 may include any suitable number and kind of mechanisms by which a processor may execute instructions. In the example of FIG. 15, execution entities 1565 may include ALU/multiplication units (MUL) 1566, ALUs 1567, and floating point units (FPU) 1568. In one embodiment, such entities may make use of information contained within a given address 1569. Execution entities 1565 in combination with stages 1530, 1550, 1555, 1560, 1570 may collectively form an execution unit.

Unit 1510 may be implemented in any suitable manner. In one embodiment, unit 1510 may perform cache control. In such an embodiment, unit 1510 may thus include a cache 1525. Cache 1525 may be implemented, in a further embodiment, as an L2 unified cache with any suitable size, such as zero, 128k, 256k, 512k, 1M, or 2M bytes of memory. In another, further embodiment, cache 1525 may be implemented in error-correcting code memory. In another embodiment, unit 1510 may perform bus interfacing to other portions of a processor or electronic device. In such an embodiment, unit 1510 may thus include a bus interface unit 1520 for communicating over an interconnect, intraprocessor bus, interprocessor bus, or other communication bus, port, or line. Bus interface unit 1520 may provide interfacing in order to perform, for example, generation of the memory and input/output addresses for the transfer of data between execution entities 1565 and the portions of a system external to instruction architecture 1500.

To further facilitate its functions, bus interface unit 1510 may include an interrupt control and distribution unit 1511 for generating interrupts and other communications to other portions of a processor or electronic device. In one embodiment, bus interface unit 1510 may include a snoop control unit 1512 that handles cache access and coherency for multiple processing cores. In a further embodiment, to provide such functionality, snoop control unit 1512 may include a cache-to-cache transfer unit 1513 that handles information exchanges between different caches. In another, further embodiment, snoop control unit 1512 may include one or more snoop filters 1514 that monitors the coherency of other caches (not shown) so that a cache controller, such as unit 1510, does not have to perform such monitoring directly. Unit 1510 may include any suitable number of timers 1515 for synchronizing the actions of instruction architecture 1500. Also, unit 1510 may include an AC port 1516.

Memory system 1540 may include any suitable number and kind of mechanisms for storing information for the processing needs of instruction architecture 1500. In one embodiment, memory system 1540 may include a load store unit 1546 for storing information such as buffers written to or read back from memory or registers and a data cache 1542. In another embodiment, memory system 1540 may include a translation lookaside buffer (TLB) 1545 that provides look-up of address values between physical and virtual addresses. In yet another embodiment, bus interface unit 1520 may include a memory management unit (MMU) 1544 for facilitating access to virtual memory. In still yet another embodiment, memory system 1540 may include a prefetcher 1543 for requesting instructions from memory before such instructions are actually needed to be executed, in order to reduce latency.

The operation of instruction architecture 1500 to execute an instruction may be performed through different stages. For example, using unit 1510 instruction prefetch stage 1530 may access an instruction through prefetcher 1543. Instructions retrieved may be stored in instruction cache 1532. Prefetch stage 1530 may enable an option 1531 for fast-loop mode, wherein a series of instructions forming a loop that is small enough to fit within a given cache are executed. In one embodiment, such an execution may be performed without needing to access additional instructions from, for example, instruction cache 1532. Determination of what instructions to prefetch may be made by, for example, branch prediction unit 1535, which may access indications of execution in global history 1536, indications of target addresses 1537, or contents of a return stack 1538 to determine which of branches 1557 of code will be executed next. Such branches may be possibly prefetched as a result. Branches 1557 may be produced through other stages of operation as described below. Instruction prefetch stage 1530 may provide instructions as well as any predictions about future instructions to dual instruction decode stage.

Dual instruction decode stage 1550 may translate a received instruction into microcode-based instructions that may be executed. Dual instruction decode stage 1550 may simultaneously decode two instructions per clock cycle. Furthermore, dual instruction decode stage 1550 may pass its results to register rename stage 1555. In addition, dual instruction decode stage 1550 may determine any resulting branches from its decoding and eventual execution of the microcode. Such results may be input into branches 1557.

Register rename stage 1555 may translate references to virtual registers or other resources into references to physical registers or resources. Register rename stage 1555 may include indications of such mapping in a register pool 1556. Register rename stage 1555 may alter the instructions as received and send the result to issue stage 1560.

Issue stage 1560 may issue or dispatch commands to execution entities 1565. Such issuance may be performed in an out-of-order fashion. In one embodiment, multiple instructions may be held at issue stage 1560 before being executed. Issue stage 1560 may include an instruction queue 1561 for holding such multiple commands. Instructions may be issued by issue stage 1560 to a particular processing entity 1565 based upon any acceptable criteria, such as availability or suitability of resources for execution of a given instruction. In one embodiment, issue stage 1560 may reorder the instructions within instruction queue 1561 such that the first instructions received might not be the first instructions executed. Based upon the ordering of instruction queue 1561, additional branching information may be provided to branches 1557. Issue stage 1560 may pass instructions to executing entities 1565 for execution.

Upon execution, writeback stage 1570 may write data into registers, queues, or other structures of instruction set architecture 1500 to communicate the completion of a given command. Depending upon the order of instructions arranged in issue stage 1560, the operation of writeback stage 1570 may enable additional instructions to be executed. Performance of instruction set architecture 1500 may be monitored or debugged by trace unit 1575.

Figure 16:
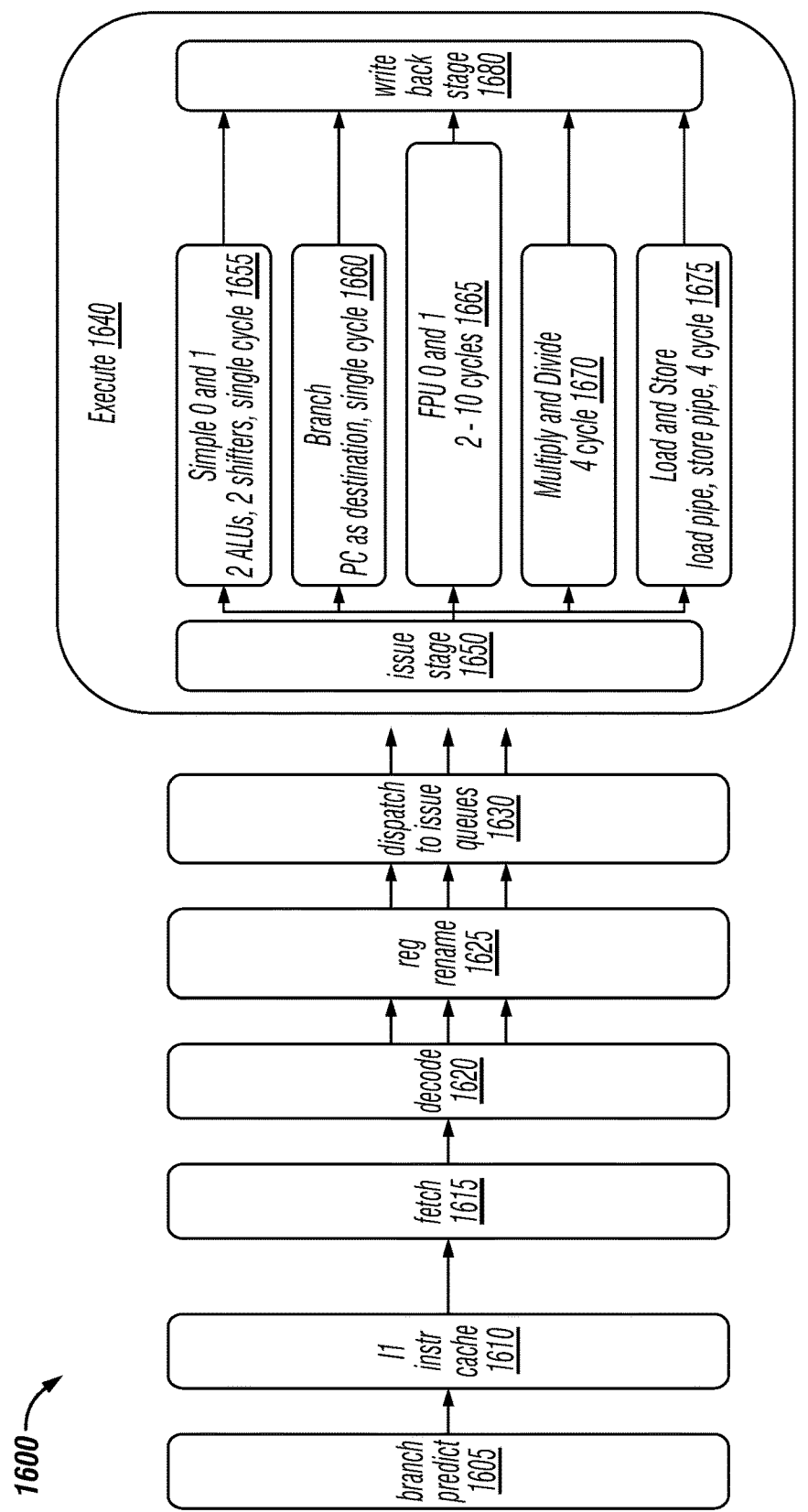
FIG. 16 is a block diagram of an execution pipeline for an instruction set architecture of a processor, in accordance with embodiments of the present disclosure.

FIG. 16 is a block diagram of an execution pipeline 1600 for an instruction set architecture of a processor, in accordance with embodiments of the present disclosure. Execution pipeline 1600 may illustrate operation of, for example, instruction architecture 1500 of FIG. 15.

Execution pipeline 1600 may include any suitable combination of steps or operations. In 1605, predictions of the branch that is to be executed next may be made. In one embodiment, such predictions may be based upon previous executions of instructions and the results thereof. In 1610, instructions corresponding to the predicted branch of execution may be loaded into an instruction cache. In 1615, one or more such instructions in the instruction cache may be fetched for execution. In 1620, the instructions that have been fetched may be decoded into microcode or more specific machine language. In one embodiment, multiple instructions may be simultaneously decoded. In 1625, references to registers or other resources within the decoded instructions may be reassigned. For example, references to virtual registers may be replaced with references to corresponding physical registers. In 1630, the instructions may be dispatched to queues for execution. In 1640, the instructions may be executed. Such execution may be performed in any suitable manner. In 1650, the instructions may be issued to a suitable execution entity. The manner in which the instruction is executed may depend upon the specific entity executing the instruction. For example, at 1655, an ALU may perform arithmetic functions. The ALU may utilize a single clock cycle for its operation, as well as two shifters. In one embodiment, two ALUs may be employed, and thus two instructions may be executed at 1655. At 1660, a determination of a resulting branch may be made. A program counter may be used to designate the destination to which the branch will be made. 1660 may be executed within a single clock cycle. At 1665, floating point arithmetic may be performed by one or more FPUs. The floating point operation may require multiple clock cycles to execute, such as two to ten cycles. At 1670, multiplication and division operations may be performed. Such operations may be performed in four clock cycles. At 1675, loading and storing operations to registers or other portions of pipeline 1600 may be performed. The operations may include loading and storing addresses. Such operations may be performed in four clock cycles. At 1680, write-back operations may be performed as required by the resulting operations of 1655-1675.

Figure 17:
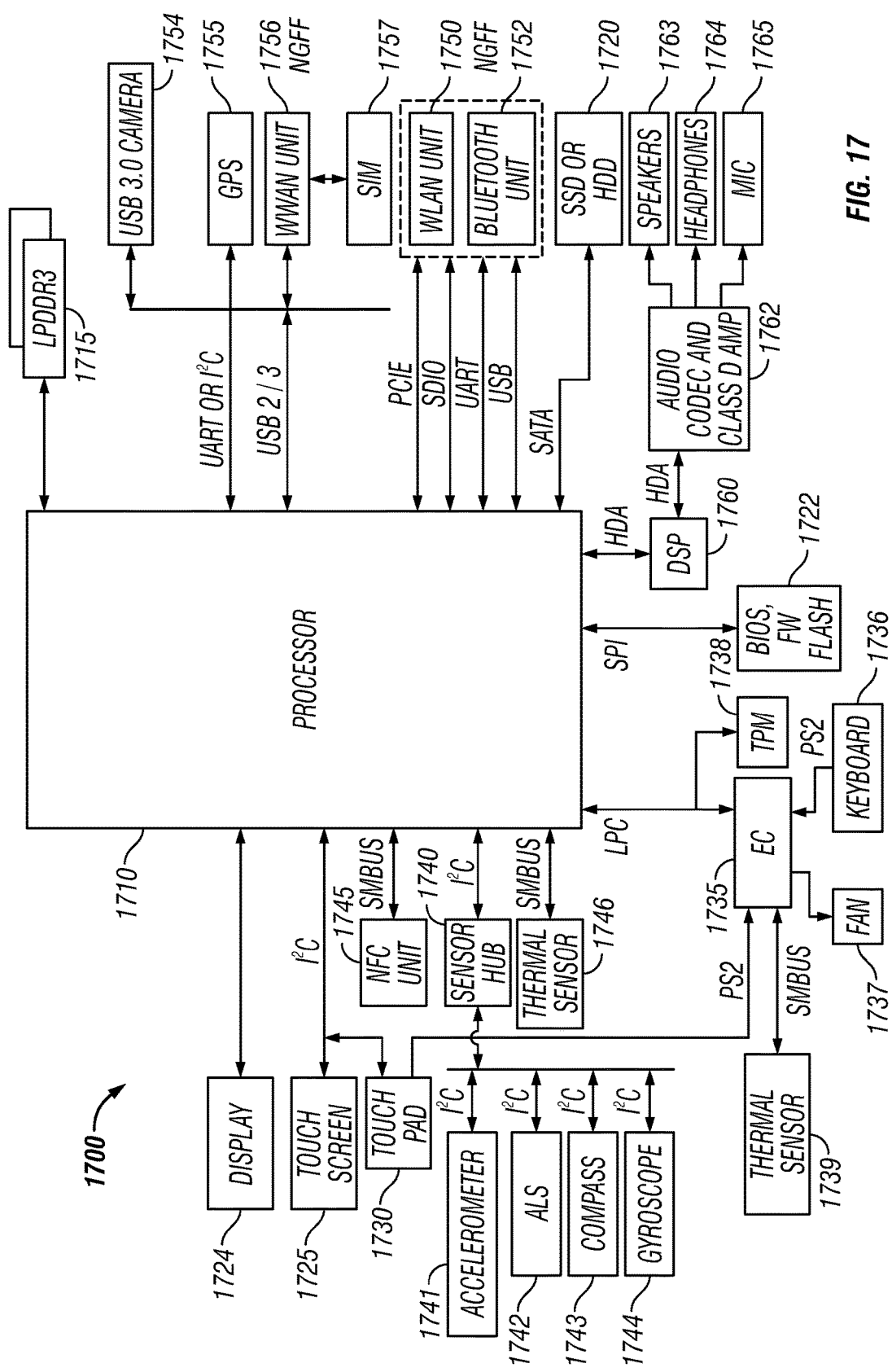
FIG. 17 is a block diagram of an electronic device for utilizing a processor, in accordance with embodiments of the present disclosure.

FIG. 17 is a block diagram of an electronic device 1700 for utilizing a processor 1710, in accordance with embodiments of the present disclosure. Electronic device 1700 may include, for example, a notebook, an ultrabook, a computer, a tower server, a rack server, a blade server, a laptop, a desktop, a tablet, a mobile device, a phone, an embedded computer, or any other suitable electronic device.

Electronic device 1700 may include processor 1710 communicatively coupled to any suitable number or kind of components, peripherals, modules, or devices. Such coupling may be accomplished by any suitable kind of bus or interface, such as I²C bus, system management bus (SMBus), low pin count (LPC) bus, SPI, high definition audio (HDA) bus, Serial Advance Technology Attachment (SATA) bus, USB bus (versions 1, 2, 3), or Universal Asynchronous Receiver/Transmitter (UART) bus.

Such components may include, for example, a display 1724, a touch screen 1725, a touch pad 1730, a near field communications (NFC) unit 1745, a sensor hub 1740, a thermal sensor 1746, an express chipset (EC) 1735, a trusted platform module (TPM) 1738, BIOS/firmware/flash memory 1722, a digital signal processor 1760, a drive 1720 such as a solid state disk (SSD) or a hard disk drive (HDD), a wireless local area network (WLAN) unit 1750, a Bluetooth unit 1752, a wireless wide area network (WWAN) unit 1756, a global positioning system (GPS) 1755, a camera 1754 such as a USB 3.0 camera, or a low power double data rate (LPDDR) memory unit 1715 implemented in, for example, the LPDDR3 standard. These components may each be implemented in any suitable manner.

Furthermore, in various embodiments other components may be communicatively coupled to processor 1710 through the components discussed above. For example, an accelerometer 1741, ambient light sensor (ALS) 1742, compass 1743, and gyroscope 1744 may be communicatively coupled to sensor hub 1740. A thermal sensor 1739, fan 1737, keyboard 1746, and touch pad 1730 may be communicatively coupled to EC 1735. Speaker 1763, headphones 1764, and a microphone 1765 may be communicatively coupled to an audio unit 1764, which may in turn be communicatively coupled to DSP 1760. Audio unit 1764 may include, for example, an audio codec and a class D amplifier. A SIM card 1757 may be communicatively coupled to WWAN unit 1756. Components such as WLAN unit 1750 and Bluetooth unit 1752, as well as WWAN unit 1756 may be implemented in a next generation form factor (NGFF).

Figure 18:
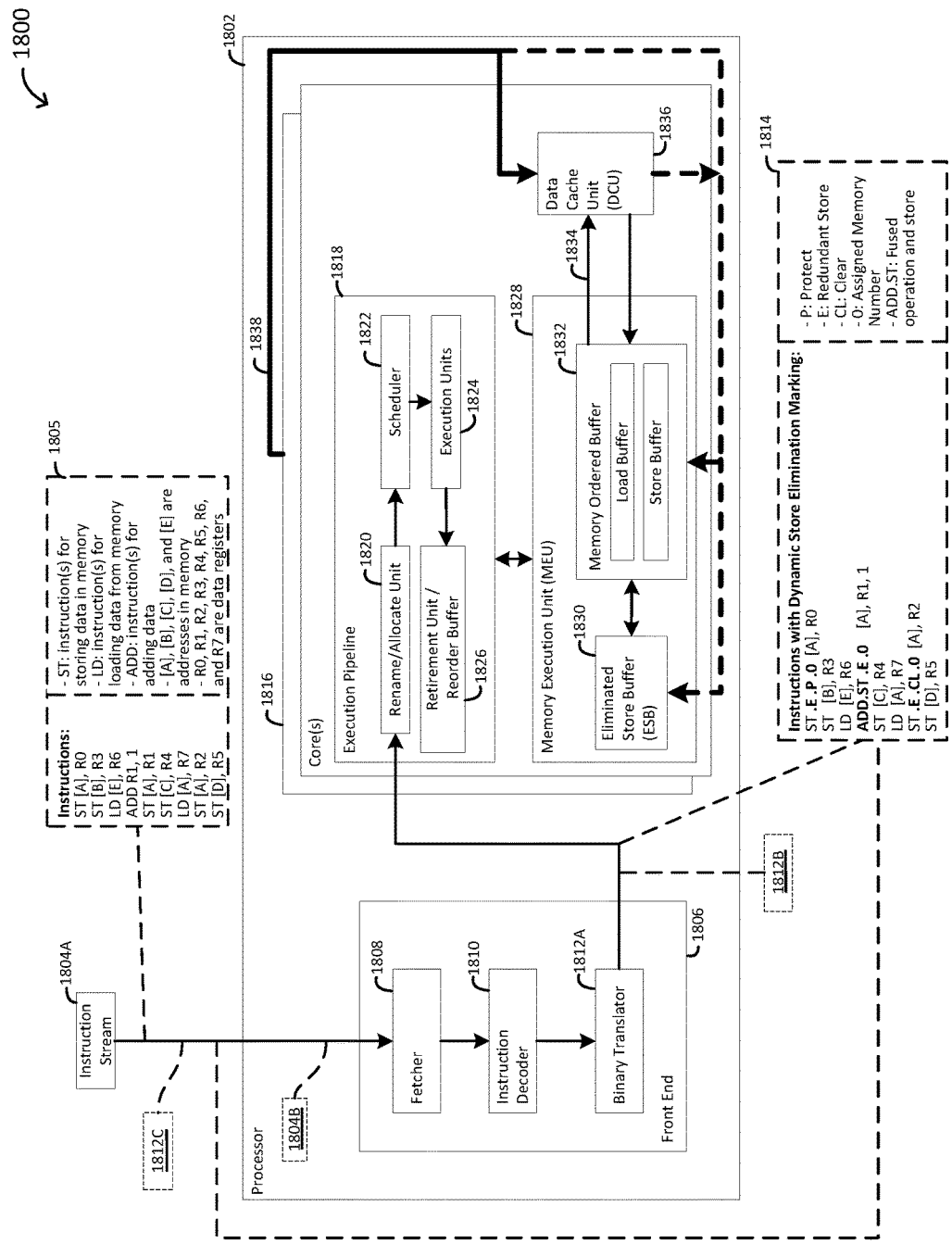
FIG. 18 is a block diagram of a system with a binary translator for dynamic store elimination, in accordance with embodiments of the present disclosure.

Embodiments of the present disclosure involve instructions and logic for dynamic store elimination (DSE). DSE may include using a binary translator to remove redundant stores from execution or to modify the execution of redundant stores. In one embodiment, such an instruction and logic may be for DSE in an out-of-order processor. In another embodiment, such an instruction and logic may be for DSE in a processor that supports or requires atomicity. The instruction may be a separate instruction or an existing instruction with designators, flags, or indicators for DSE. FIG. 18 is an illustration of a system 1800 with a binary translator for dynamic store elimination, in accordance with embodiments of the present disclosure.

System 1800 may include any suitable number and kind of elements to perform the operations described herein, including a processor, SoC, integrated circuit, and other mechanism suitable for dynamic store elimination. Furthermore, although specific elements of system 1800 may be described herein as performing a specific function, any suitable portion of 1800 may perform the functionality described herein. For example, system 1800 may include processor 1802. Although processor 1802 is shown and described as an example in FIG. 18, any suitable mechanism may be used. System 1800 may include any suitable mechanism for dynamic store elimination. In one embodiment, such mechanisms may be implemented in hardware. In another embodiment, such mechanisms may include a memory-mapped address for the configuration. In a further embodiment, such mechanisms may include an instruction for a programmer, compiler, or firmware to configure the processor 1802 to enable dynamic store elimination. In still yet another embodiment, such mechanisms may include distinct instruction flags, designators, or indicators for dynamic store elimination.

Processor 1802 may be implemented fully or in part by the elements described in FIGS. 1-17. Instructions may be received from instruction stream (e.g., 1804A, 1804B), which may reside within a memory subsystem of system 1800. The instruction stream may be included in any suitable portion of processor 1802 or system 1800. In one embodiment, instruction stream 1804A may be included in an SoC, system, or other mechanism. In another embodiment, instruction stream 1804B may be included in a processor, integrated circuit, or other mechanism. Processor 1802 may include a front end 1806 to receive or retrieve instructions from any suitable location, including a cache or memory. Instructions may include instruction stream (e.g., 1804A, 1804B). Front end 1806 may include a fetcher 1808 to fill the pipeline efficiently with possible instructions to execute. Front end 1806 may include an instruction decoder 1810 to decode an instruction into micro-operations for execution, which may determine the meaning, side effects, data required, data consumed, and data to be produced for the instruction. A binary translator (e.g., 1812A, 1812B, 1812C) may be used to optimize or improve the efficiency of code. The binary translator may be located in any suitable portion of processor 1802 or system 1800, and may be implemented using any suitable mechanism for dynamic store elimination. In one embodiment, binary translator 1812A may be included in the front end 1806 of processor 1802. In another embodiment, binary translator 1812B may be included in an SoC, system, or other mechanism. In a further embodiment, a binary translator may reside in programmable circuitry communicatively coupled to processor 1802 or system 1800. In yet another embodiment, binary translator 1812C may reside in memory in the form of instructions capable of execution by processor 1802.

Binary translator (e.g., 1812A, 1812B, 1812C) may increase the efficiency of execution of the instructions by avoiding redundant stores while maintaining total store order (TSO). As used herein, such instructions with reduced redundant stores may be referred to as optimized. However, any such instructions with reduced redundant stores may be considered optimized, even if the instructions are not completely optimal over any other possible set of instructions. TSO enables other threads or processors accessing data modified by a processor supporting TSO to expect a defined behavior. For example, TSO may guarantee that stores to memory will be committed and drained to the cache of the processor 1802 or system 1800 in the original program order. Instruction streams optimized or modified by a binary translator (e.g., 1812A, 1812B, 1812C) may reside in any suitable portion of system 1800. In one embodiment, the instructions that are optimized or modified may be stored back in the instruction stream (e.g., 1804A, 1804B). In another embodiment, the instructions that are optimized or modified may be stored in a data or instruction cache, including an L1, L2, L3, or L4 cache. In a further embodiment, the instructions that are optimized or modified may be stored in memory. In another embodiment, the instructions that are optimized or modified may be stored in a dedicated storage device, including a dedicated memory, data array, or system cache. Keeping the instructions that are optimized or modified separate from the original instructions the binary translator, in some embodiments, may enable the processor to abandon all speculative execution of the instructions that are optimized or modified and restart execution of the original instructions without any loss of data.

The decoded instructions may be passed to an out-of-order or in-order execution unit in an execution pipeline 1818. Execution pipeline 1818 may include a rename and allocate unit 1820 for renaming instructions for out-of-order execution, and a reorder buffer (ROB) coextensive with a retirement unit 1826 so that instructions may appear to be retired in the order that they were received. Rename and allocate unit 1820 may further rename or allocate resources for execution of instructions in parallel. Scheduler 1822 may schedule or allocate instructions to execute on execution units 1824 when inputs are available. Outputs of execution units 1824 may queue in the ROB 1826. Front end 1806 may attempt to anticipate any behaviors that will prevent instructions from executing in a sequential stream and may fetch streams of instructions that might be likely to execute. When there is, for example, a misprediction of a branch, the ROB may inform the front end and a different set of instructions may be executed instead. Front end 1806 may store data such as metadata used for branch prediction. The instructions may be retired as if they were executed in order. Various portions of such execution pipelining may be performed by one or more cores 1816. Each core 1816 may include one or more threads or logical cores for execution.

In one embodiment, core(s) 1816 may include a data cache unit (DCU). Even though a single DCU 1836 is shown in FIG. 18, core(s) 1816 may include any suitable number and kind of DCUs. DCU 1836 may perform data caching within a core 1816 of processor 1802. DCU 1836 may be communicatively coupled with any suitable number or kind of other cache hierarchies or memory on system 1800 or processor 1802. For example, DCU 1836 may be communicatively coupled to an LLC, an L2 cache, an L3 cache, or a memory controller (not shown). DCU 1836 may include any suitable number and kind of elements. For example, DCU 1836 may include a data cache for storing data in lines within the cache.

Commit actions for stores or loads may be achieved by performing the underlying memory operations on memory, registers, or caches, such as DCU 1836. Memory operations may be executed in a memory execution unit (MEU) 1828. MEU 1828 may include an eliminated store buffer (ESB) 1830 and a memory ordered buffer (MOB) 1832, which may include a load buffer and a store buffer. In one embodiment, ESB 1830 may be a logical or physical extension of the store buffer in MOB 1832. An execution pipeline 1818 may populate or transfer information to MEU 1828 and a ROB 1826. After transfer or dispatch, MEU 1828 and ROB 1826 may manage functions involving memory instructions. One such function may include retirement and commitment of instructions. For example, a stream of instructions may make multiple references to register "A." The stream of instructions may be divided into several independent atomic elements that may be executed in parallel by different processing entities. Execution pipeline 1818 may have assigned a different real resource to each atomic element for its use of the virtual resource register "A." Such resources may be reclaimed, or reassigned to other instructions, after the associated instructions are executed and committed by ROB 1826. Another function of MEU 1828 may be to process snoop requests along with DCU 1836.

In one embodiment, MEU 1828 may perform memory disambiguation. Such disambiguation may include determining whether received instructions include any memory operation conflicts. Such memory operation conflicts may include whether memory operations performed out-of-order are prone to data-dependency error conditions or faults. As the instructions may have been executed but not committed, a determined error or fault may cause processor 1802 to roll-back execution to a previously known point at which the instructions responsible for the error or fault may be executed in-order.

MEU 1828 may evaluate instructions after they are dispatched for execution by execution pipeline 1818. After execution, the instructions may be checked for memory disambiguation by MEU 1828, which may include determining whether any data dependency memory errors have occurred. If any such errors have occurred, MEU 1828 may cause a rollback to a previously known execution state predating the scheduling of operations causing such errors. If errors have not occurred, MEU 1828 may, for example, retire the memory operations or otherwise indicate that the memory operations are valid and are eligible for retirement. However, given instructions that may be reordered, even a retired operation may reference a resource that is subsequently associated with, for example, a snoop for data that has not yet been written or committed to DCU 1836. Accordingly, instruction results might not be written to cache, and resources might not reclaimed, until a commitment stage is determined by, for example, Retirement Unit/ROB 1826. Furthermore, in some systems commitment of an instruction in an atomic or speculative region, such as a DSE region, might not be performed until the entire atomic region is retired or committed.

MEU 1828 may be implemented in any suitable manner. In one embodiment to perform memory disambiguation, MEU 1828 may include an alias hardware unit (not shown). The alias hardware unit may accept indications of executed memory operations and associated aliases. MEU 1828 may reorder memory operations such that the memory operations are arranged in the order in which they were placed before any dynamic reordering was performed. Alias hardware unit may include any suitable number and kind of elements to perform memory disambiguation. In one embodiment, alias hardware unit may include MOB 1832. When operations within MOB 1832 have been retired, committed, and are ready to send to cache, memory, or other portions of system 1800, they may be removed from MOB 1832. In the example of FIG. 18, operations within MOB 1832 may be drained to DCU 1836. MOB 1832 may interface with the execution pipeline 1818, MEU 1828, or other portions of core(s) 1816 to provide buffering of data. MOB 1832 may be loaded from any suitable source, including DCU 1836, and may be drained to any suitable destination, including DCU 1836, as shown by 1834.

Depending upon the address of a load operation or a store operation and the state of the contents of DCU 1836, DCU 1836 may need to interface with other caches. For example, if the address associated with a load operation is not present in DCU 1836, DCU 1836 may need to interface with another cache of a given core, another cache of another core within processor 1802, or another cache of another system 1800.

System 1800 may support dynamic store elimination (DSE) by bypassing the drain of redundant stores to DCU 1836 without affecting the TSO behavior of the system. A region of instruction stream 1804 with redundant stores is shown as 1805. Move or store instructions (MOV/ST) may correspond to instructions for storing data in memory, which may be referred to more generally as a store. Load or other move instructions (MOV/LD) may correspond to instructions for loading data from memory. For example, instructions in region 1805 may include six stores, two loads, and one ALU instruction. ST [A], R0 may store the value in register R0 to a memory location of address A. While R0 is shown, processor 1802 may rename or reallocate registers as needed. ST [B], R3 may store the value in register R3 to a memory location of address B. LD [E] may load the value at address E into register R6. ADD R1, 1 may add the immediate value of 1 to the value stored in register R1, and then may store that result back in register R1. ST [A], R1 may store the value in register R1 to a memory location of address A. ST [C], R4 may store the value in register R4 to a memory location of address C. LD [A], R7 may load the value at a memory location A into register R7. ST [A], R2 may store the value in register R2 to a memory location of address A. ST [D], R5 may store the value in register R5 to a memory location of address D.

If addresses A, B, C, D, and E identify unique locations located at distinct physical addresses, binary translator (e.g., 1812A, 1812B, 1812C) may be able to apply DSE by marking redundant stores in the instruction stream. A redundant store may be identified as a store to a memory location that is overwritten by another store to the same memory location without the memory location being accessed after the first store. Access to a physical memory location may include loads from a memory location. Binary translator (e.g., 1812A, 1812B, 1812C) may recognize, for example, that instructions ST [A], R0 and ST [A], R1 are redundant store operations based on the determination that after instruction ST [A], R0 in the instruction stream no subsequent instruction accesses the same memory location before the data in the same memory location is updated by the execution of instruction ST [A] R1. The number of instructions between redundant stores to the same memory location may be any suitable value. In one embodiment, binary translator (e.g., 1812A, 1812B, 1812C) may define a small window of ten instructions or less. In another embodiment, binary translator may support larger windows in the range of 100 to 200 instructions, which may correspond to the size of the instruction window for processor 1802. In a further embodiment, binary translator may support even larger windows with hundreds or thousands of instructions. As the number of instructions in the window increases, however, the amount of processing for a binary translator may increase as well. Accordingly, each system design may tailor the size of the window for the binary translator to processor 1802.

After determining the memory locations of loads and stores in a region of the instruction stream and identifying any redundant stores, binary translator (e.g., 1812A, 1812B, 1812C) may mark the redundant stores and store the instruction stream that is optimized or modified. The instruction stream 1814 that is optimized or modified, which may be in encoded or decoded form, may include instruction flags, designators, or indicators to control eliminating redundant writes to the DCU 1836 or memory. The region bounded by the designators may be referred to the speculative region. Designators may be used by the core(s) 1816 to ensure total store order (TSO) is not violated. TSO may be maintained by ensuring that other threads view the stores in order. DCU 1836 and/or MEU 1828 may facilitate maintaining TSO by blocking or holding any snoops 1838 from other threads and/or cores during the speculative region in which redundant stores may be marked. For example, suppose that memory is full of zeroes and that two consecutive instructions store the value 1 to separate memory locations: locations 1 and 2, where the store to location 1 occurs before location 2. The values in locations 1 and 2 may be 1 for both locations, 0 for both locations, or 1 for location 1 and 0 for location 2. Thus, the value in memory locations 1 and 2 may not at any time be 0 for location 1 and 1 for location 2, which would imply a violation of TSO because the order of stores was reversed. By blocking or holding snoops, MEU 1828 and/or DCU 1836 may ensure that the order of stores is not reversed and that TSO is not violated.

MEU 1828 and/or DCU 1836 may hold or block some or all snoops. The holding or blocking of snoops may delay the response to a snoop until the data in the DCU is updated and the speculative region of instructions with redundant stores has completed. In one embodiment, all snoops may be held during a speculative region. In another embodiment, snoops with addresses matching an address within the speculative region may be held. MEU 1828 and/or DCU 1836 may track the addresses accessed in the speculative region. In some cases, the addresses may be known in advance because they are literal values or variables that may be resolved in advance. In other cases, the addresses may not be known in advance and knowledge of the address or addresses may be determined after the first execution of the instruction. In a further embodiment, snoops with addresses matching an address similar to, but not exactly the same as an address in the write set may be held. The similar address may be on the same or a similar cache line as one of the addresses tracked by MEU 1828 and/or DCU 1836.

To maintain TSO, MEU 1828 and/or DCU 1836 may look for DSE designators to ensure that they are aware of when a speculative region is encountered. A redundant store designator of .E may indicate to the core(s) 1816 that the instruction may include a redundant store. A protect designator of .P may indicate to the core(s) 1816 that a speculation region with redundant stores is beginning and that the speculation region may require protection. Instructions may also receive an assigned memory number (MNBR) designator that is unique for each memory address subject to DSE. The MNBR designator may be used to track the address through core(s) 1816. In one embodiment, binary translator (e.g., 1812A, 1812B, 1812C) may not be aware of the implementation of MEU 1828 and may use the MNBR designator to assist with tracking redundant stores to a particular address. In another embodiment, binary translator (e.g., 1812A, 1812B, 1812C) may have access to one or more buffers in MEU 1828, such as ESB 1830 or MOB 1832. In some embodiments, an MNBR designator may not be necessary due to the binary translator's ability to track the redundant stores itself. The MNBR may represent any suitable number, including an arbitrary number assigned by a binary translator, a number that may be the address of the redundant store, or a number representing the whole address or part of the address of the redundant store, such as a hash of the address. MEU 1828 and/or DCU 1836 may hold snoop requests, as soon as a .P designator is seen, in order to avoid violating TSO. A clear designator of .CL may indicate to the core(s) 1816 that a speculative region with reordered stores is ending. MEU 1828 and/or DCU 1836 may release its hold on snoop requests as soon as a .CL designator is processed to prevent deadlock of the originating source of the snoop. Processing of the .CL designator may include draining the store marked with the clear designator to DCU 1836.

Binary translator (e.g., 1812A, 1812B, 1812C) may also provide the MNBRs to support multiple addresses subject to redundant stores. If multiple redundant writes are identified within instructions 1805, the MNBR may assist system 1800 with supporting DSE. Overlapping write sets may be uniquely identified using respective MNBR designators. System 1800 may limit the number of MNBRs to minimize the complexity of support for DSE. Binary translator (e.g., 1812A, 1812B, 1812C) may tag instructions with the redundant store designator with a corresponding MNBR. For example, ST .E.0 [B], 1 may be tagged with the first MNBR, 0, and ST .E. [D], 1 may be tagged with the second MNBR, 1. DCU 1836 may have support for multiple MNBRs to support the holding and releasing of snoops specific to a given MNBR. In one embodiment, the maximum number of MNBRs may be set to 1, which may correspond to no overlapping MNBRs. In another embodiment, the maximum number of MNBRs may be equivalent to the number of associative sets or ways in DCU 1836. In a further embodiment, the maximum number of MNBRs may be controlled via a control field in a control register associated with the binary translator (not shown).

Instruction stream 1814 may also include fused operation-store (fused op-st) instructions, which may combine an operation with a store. For example, the ADD R1, 1 instruction may increment the value in register R1 by 1. Then, the ST [A], R1 instruction may store the value in R1 to memory location A. If there are no intervening uses of register R1, front end 1806 or binary translator (e.g., 1812A, 1812B, 1812C) may fuse together the ADD and ST instruction. The fused instruction may include any designators related to DSE. Accordingly, ADD R1, 1 and ST .E .0 [A], R1 may become ADD.ST .E .0 [A], R1, 1.

System 1800 may support atomic or speculative regions of instructions, as discussed above. Furthermore, system 1800 may support out-of-order operation, as discussed above. The use of out-of-order operation may lead to potential errors. For example, other threads and/or cores may be deadlocked waiting for snoops from each other. The snoops may not be processed due to a speculative region holding the snoops. Thus, a speculative region may be abandoned and speculative results may be undone at a later time if an error is detected. Abandonment may include no further execution of instructions in the speculation region and restoration of the processor or system to a previously stored architectural state.

System 1800 may avoid deadlocks by measuring the snoop response. The measurement may be a raw measurement or an average measurement to compensate for jitter in the response. The response may be represented by the number of snoops being held or the response time for a snoop to be handled by DCU 1836. The measurement may be performed using any suitable mechanism, including a performance counter for the snoop response count, the snoop response time, or the number of snoop requests being held in a snoop queue. The measurement may be compared to a response threshold to determine whether the measured response value exceeds the threshold. The threshold may be any suitable value and may be tuned to a particular system. System 1800 may raise an interrupt based on a determination that the measured response time is greater than the threshold. Front end 1806 or binary translator (e.g., 1812A, 1812B, 1812C) may process the interrupt and may restore the processor 1802 to an architectural state stored before the execution of the speculative region with DSE. Front end 1806 or binary translator (e.g., 1812A, 1812B, 1812C) may then direct processor to execute the original instruction stream without redundant stores marked. For example, the direction to execute the original instruction stream may be achieved by changing the instruction pointer to instruction stream 1805. Although various operations are described in this disclosure as performed by specific components of processor 1802, the functionality may be performed by any suitable portion of processor 1802.

Figure 19:
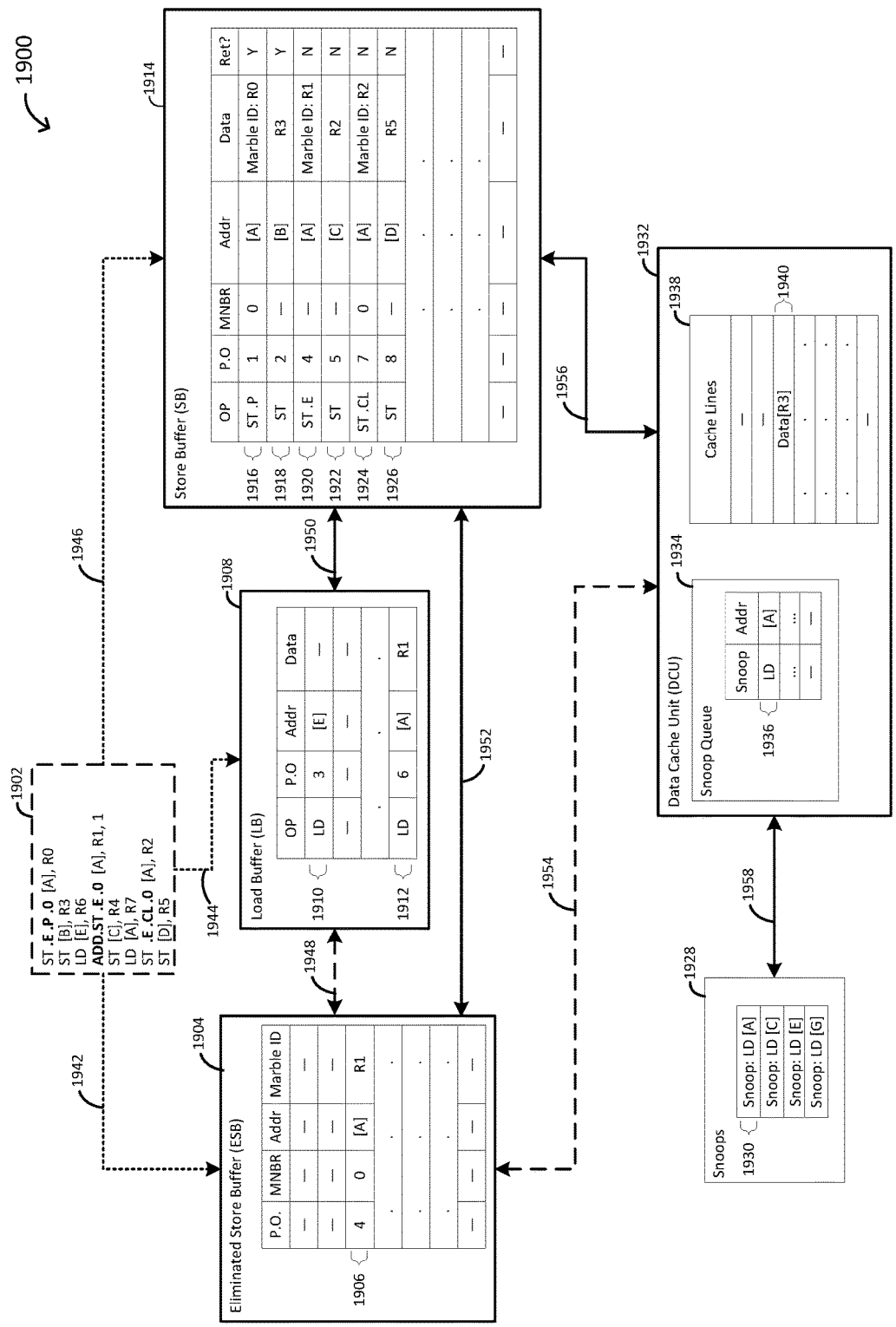
FIG. 19 is a logical representation of elements of a system with dynamic store elimination, in accordance with embodiments of the present disclosure.

FIG. 19 illustrates a logical representation of elements of system 1900 with dynamic store elimination (DSE), in accordance with embodiments of the present disclosure. System 1900 may execute and retire instructions 1902 into a store buffer 1914 without writing or committing the data to the DCU 1932. Instructions or instruction stream 1902 may be similar to instruction stream 1814 that is optimized or modified for DSE. However, instruction stream 1814 may include any instructions suitable for processing in system 1800 and instruction stream 1902 may include any instructions suitable for processing in system 1900. Instructions 1902 includes eight instructions that may be executed. One of those eight instructions may be a fused instruction combining an addition and store operation. Although eight instructions including a fused instruction are described and illustrated, any number of instructions, unfused or fused, may be executed using DSE. The eight instructions that may be executed may include stores to memory addresses A, B, C, and D (ST .E .P .0 [A], R0; ST [B], R3; ST [C], R4; ST .E .CL, .0 [A], R2; and ST [D], R5), loads from memory addresses A and E (LD [E], R6 and LD R7), and a fused add-store to memory address A (ADD.ST .E .0 [A], R1). Information from instructions 1902 may be transferred, directly or indirectly, to eliminated store buffer (ESB) 1904, load buffer (LB) 1908, and/or store buffer (SB) 1914. In one embodiment, ESB 1904, LB 1908, and SB 1914 may be combined into one physical structure including separate logical portions.

ESB 1904 may receive information from instructions 1902 via logical link 1942. ESB 1904 may contain one or more fields for each entry. For example, ESB 1904 may include a program order (P.O.) field, an assigned memory number (MNBR) field, an address (ADDR) field, and/or a marble identifier field. Entry 1906, for instance, may contain information related to a fused instruction (ADD.ST .E .0 [A], R1, 1). The fused instruction as shown is the fourth instruction in program order. The .E designator may indicate that the destination address is subject to store elimination. Accordingly, an entry in ESB 1904 may correspond to the destination address. The .0 designator may indicate that the assigned memory number is 0. This number may be stored in the MNBR field of each entry, such as entry 1906. The MNBR may serve as a short-hand for the destination address. Accordingly, if the destination address is known, the MNBR may be substituted or replaced by the destination address. The fused instruction may increment the value of register R1 by one and store the result in a destination location with address A. The register R1 may be stored in entry 1906 as a marble identifier. In one embodiment, the marble identifier may include the value of the register or storage location. In another embodiment, the marble identifier may include a link, reference, or pointer to the register or storage location at which the value is stored. ESB 1904 may interface via link 1952 to a store buffer (SB) 1914.

SB 1914 may receive information from instructions 1902 via logical link 1946. SB 1914 may contain one or more fields for each entry. For example, SB 1914 may include a op field, a program order (P.O.) field, an assigned memory number (MNBR) field, a destination address field, a data field, a retirement field, and/or a speculative region field (not shown). The op field may include at least a portion of the instruction associated with the entry. For example, the op field may contain the instruction (or an opcode for the instruction) and/or one or more designators for DSE. The MNBR field may correspond the MNBR field of an entry in the ESB. The data field may contain the literal data to be stored or a reference to the literal data to be stored. The retirement field may indicate whether the instruction has been retired, including whether the data may have been drained to DCU 1932, if needed. The speculative field may indicate whether the instruction is within a speculative region of an instruction stream. SB 1914, ESB 1904, and/or DCU 1932 may have additional circuitry to maintain TSO in a speculative region, such as to hold snoops to addresses with speculative data.

Entry 1916 in SB 1914 may correspond to instruction ST .E .P .0 [A], R0 in instructions 1902. The instruction may be in program order 1 with an MNBR of 0. The instruction's destination address may be [A] with its data stored in R0. As shown, the instruction may be retired. DSE may enable redundant store instructions to retire by bypassing a drain operation to DCU 1932. Entry 1918 in SB 1914 may correspond to instruction ST [B], R3 in instructions 1902. The instruction may be in program order 2 without an MNBR, which may indicate that the instruction is not associated with a redundant store. As shown, the instruction may be retired with the data from register R3 to DCU 1932 at cache line 1940 of cache 1938. Accordingly, DSE may enable non-redundant store instructions to retire with a drain operation from ESB 1904 via bus 1954 or from SB 1914 via bus 1956 to DCU 1932. Entry 1920 in SB 1914 may correspond to instruction ADD.ST .E .0 [A], R1, 1 in instructions 1902. The instruction may be in program order 4 without an MNBR. The instruction's destination address may be [A], and the instruction may increment the data in register R1 by 1 before storing the incremented value to the destination address. MNBR 0 may have an entry 1906 in ESB 1904. Entry 1906 may be updated to reflect the marble ID of the ADD. ST instruction. Entry 1922 in SB 1914 may correspond to instruction ST [C], R4 in instructions 1902. The instruction may be in program order 5 without an MNBR. Entry 1924 in 1914 may correspond to instruction ST .E. CL .0 [A], R2 in instructions 1902. The instruction may include a clear designator (.CL). The instruction may be in program order 7 with an MNBR of 0. The instruction destination address may be [A] with its data stored in R2. While the instruction is not shown as retired, on retirement the data from register R2 may be drained to DCU 1932. Thus, DSE may enable redundant store instructions with a clear designator to retire with a drain operation to DCU 1932. Entry 1926 in SB 1914 may correspond to instruction ST [D], R5 in instructions 1902. The instruction may be in program order 8 without an MNBR, which may indicate that the instruction is not associated with a redundant store.

Instructions 1902 may also transfer information to LB 1908 via logical link 1944. LB 1908 may contain an entry for each pending load. LB 1908 may include one or more columns for buffering loads, including an op field, a program order (P.O.) field, and address field, and a data field. Entry 1910 in LB 1908 may correspond to instruction LD [E], R6 in instructions 1902. This instruction may load data from a memory location at address [E] into register R6. Entry 1912 in LB 1908 may correspond to instruction LD R7 in instructions 1902. That instruction may load data from a memory location at address [A] into register R7. The memory location at address [A], however, may be the destination location of a redundant store. Accordingly, memory or DCU 1932 may not have the most recent value at that location. To obtain the most recent value, LB 1908 may interface via bus 1950 with SB 1914 to obtain the data from the most recent store to the memory location at address [A]. SB 1914 may determine the most recent store by searching for all entries with the memory location at address [A] and then sorting the matching results in program order. The entry with the highest program order may correspond to the store instruction that most recently executed before the load instruction. Accordingly, LB 1908 may receive a marble identifier for register R1 and the corresponding program order of 4. Register R1 may contain the most recent data stored before the load instruction for the memory location at address [A] and may correspond to instruction ADD.ST .E .0 [A], R1, 1. In some embodiments, LB 1908 may further obtain the most recent value stored by interfacing via bus 1948 with ESB 1904. ESB 1904 may determine the most recent store for an address or MNBR. Since ESB 1904 may contain only one entry for each address, ESB 1904 may return the matching entry. Accordingly, L B 1908 may receive a marble identifier for register R1 and the corresponding program order of 4. LB 1908 may compare the information received from ESB 1904 and SB 1914 to determine which value is the most recent. In this example, the ESB 1904 and SB 1914 may both contain the most recent data in 1906 and the data field for entry 1912 may be updated with the value in register R1. In another embodiment, SB 1914 may interface with ESB 1904 using bus 1952 to determine the most recent value stored to memory location at address A before the load instruction, and may return to LB 1908 the most recent value between SB 1914 and ESB 1904. Thus, the store information may be forwarded to a load instruction before the data is committed to memory.

DCU 1932 may include data drained from SB 1914 and may contain a snoop queue 1934 to handle snoops 1928. In some embodiments, DCU 1932 may interface with ESB 1904 via bus 1954 and/or with SB 1914 via bus 1956. In some other embodiments, snoop queue 1934 may be included in ESB 1904 or SB 1914 (not shown). ESB 1904, SB 1914, and/or DCU 1932 may hold snoops in any suitable manner.

In one embodiment, DCU 1932 may hold all snoops to any address while any speculative region containing DSE is being processed. DCU 1932 may hold any snoop received by placing or pushing the snoop onto the snoop queue 1934 while any entry remains in ESB 1904. In another embodiment, DCU 1932 may hold snoops that match an address corresponding to an address in ESB 1904 or an address in SB 1914 having an MNBR while processing other non-matching snoops. DCU 1932 may hold matched snoops in any suitable manner. In one embodiment, ESB 1904 or SB 1914 may combine all MNBRs into one common MNBR. In this case, DCU 1932 may hold snoops corresponding to any address in the common MNBR while any region containing DSE is being processed. In another embodiment, ESB 1904 or SB 1914 may distinguish between the addresses in DSE regions and may hold only those snoops corresponding to an address within an MNBR. In this case, DCU 1932 may respond to snoops more quickly than a DCU that interfaces with an ESB 1904 or SB 1914, which may implement a common MNBR or universal snoop blocking in speculative regions. DCU 1932 may determine the addresses having an MNBR in any suitable manner. In one embodiment, DCU 1932 may only cache memory locations or addresses that are resolved. Other structures, such as the SB 1914, ESB 1904, or a translation table, may resolve the memory locations or address. Alternatively, all memory locations or addresses may be fixed before run-time of the instructions or may be defined as literals. In this case, no memory location or address would require resolution.

In another embodiment, DCU 1932 may determine one or more addresses correspond to an MNBR in ESB 1904 or SB 1914 by tracking the memory locations that are resolved after one iteration of execution. Until all the memory locations or addresses are known, DCU 1932 may hold all snoops to avoid violating TSO. After the memory locations or addresses are known, DCU 1932 may respond to snoops more quickly in subsequent iterations of a loop of instructions than in the first iteration. Moreover, D C U 1932 may associate more than one cache line with each resolved memory location or address to hold snoops to adjacent addresses, which may hold snoops to memory locations or addresses that are more likely to be used in subsequent iterations of a loop of instructions. For example, instructions for processing streaming media may iterate across a data structure spanning several cache lines. In this case, associating more than one cache line with an address may permit DCU 1932 to hold a snoop to an address that may be used in a subsequent iteration, even though that address may be different than the address associated with the MNBR in ESB 1904 or SB 1914.

DCU 1932 may receive snoops 1928 via bus 1958 from other threads or cores in system 1900. For example, DCU 1932 may receive four snoops: LD [A], LD [C], LD [E], and LD [G]. Although four snoops are described, any number of snoops may be received and processed as is suitable for system 1900. After receiving a snoop, DCU 1932 may evaluate the snoop to determine the address of the snoop. DCU 1932 may then communicate with ESB 1904 via bus 1954 or with SB 1914 via bus 1956 to determine whether the address of the snoop matches an address associated with an MNBR. Matching may occur in any suitable manner within ESB 1904 or SB 1914. If the address of the snoop matches an address associated with an MNBR, DCU 1932 may hold the snoop until any suitable event occurs. In one embodiment, the event may be that ESB 1904 or SB 1914 determine the MNBR is no longer active or valid. In another embodiment, the event may be that data is drained to DCU 1932 where the data is drained to the address of the snoop that may have been held. Draining of data to DCU 1932 may represent that a DSE region corresponding to a particular MNBR has ended, or that all DSE regions corresponding to any MNBR has ended.

DCU 1932 may receive four snoops: LD [A], LD [C], LD [E], and LD[G]. DCU 1932 may communicate with ESB 1904 or SB 1914, which may determine that the address of the snoop matches an MNBR. For example, DCU 1932 may communicate with ESB 1904 or SB 1914, which may determine that address [A] corresponds to MNBR 0. DCU 1932 may locate the cache line associated with address [A] and then determine whether the cache line is associated with an MNBR by communicating one or more addresses to ESB 1904 or SB 1914. As illustrated, snoop queue 1934 may include one snoop entry 1936: LD corresponding to address [A]. Entry 1936 may correspond to snoop 1930 received via bus 1958. Snoop queue 1934 may determine whether to hold a given snoop based on whether the region with DSE remains in execution or whether the entry with the MNBR remains in ESB 1904. For example, snoop LD [A] may remain in the snoop queue until the region with DSE corresponding to MNBR 0 has ended. When the DSE region ends, the hold on the corresponding snoop may be removed and DCU 1932 may respond to the held snoop with the dirty or modified status of the data. Thus, holding snoops may ensure that system 1900 maintains total store order (TSO) where no instructions ever appear to have executed out-of-order.

Figure 20:
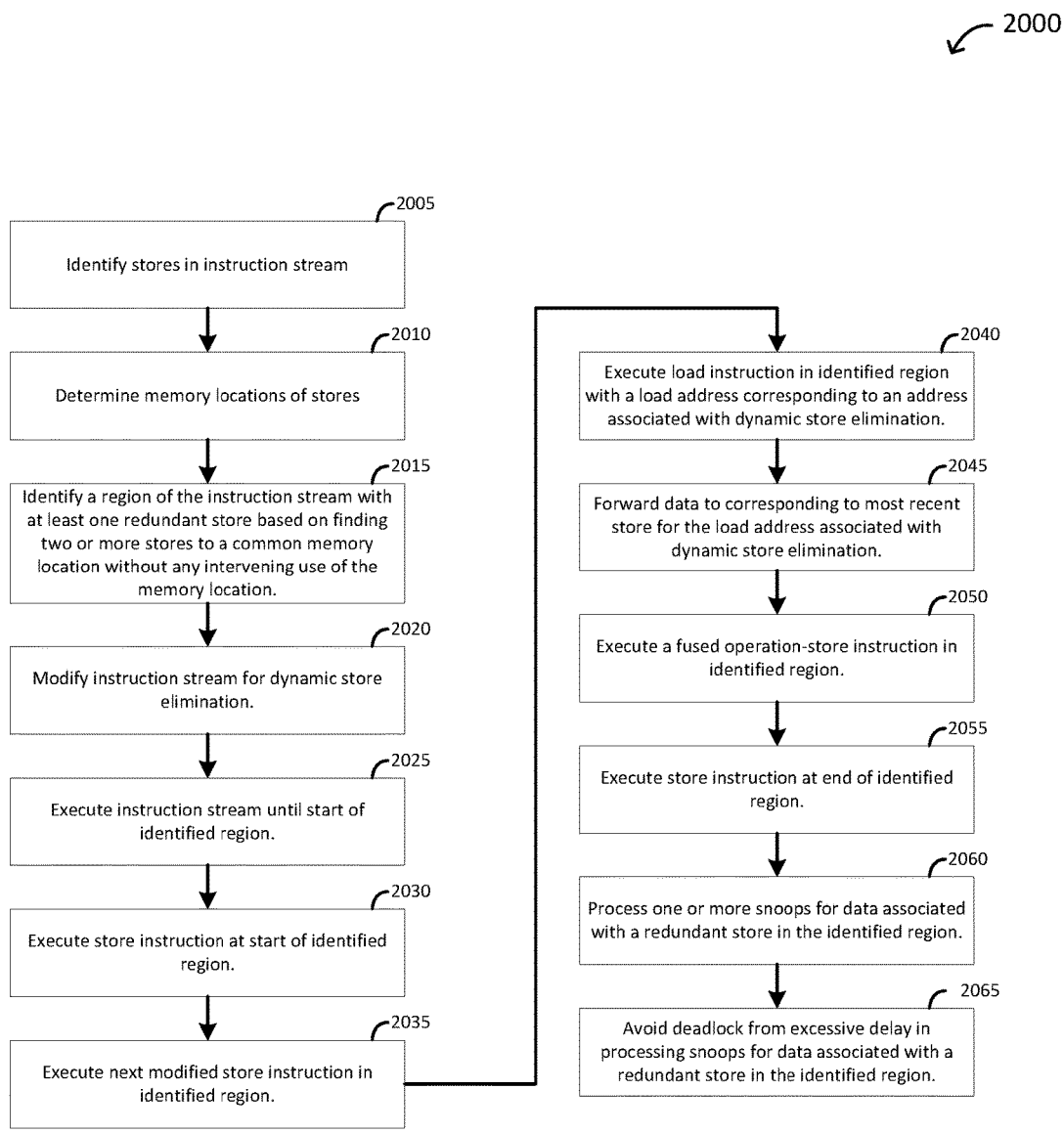
FIG. 20 is a diagram of operation of a method for dynamic store elimination, in accordance with embodiments of the present disclosure.

FIG. 20 is a diagram of operation of a method for dynamic store elimination, in accordance with embodiments of the present disclosure. Method 2000 may be implemented by any of the elements shown in FIGS. 1-19 and 21-28. Method 2000 may be initiated by any suitable criteria and may initiate operation at any suitable point. In one embodiment, method 2000 may initiate operation at 2005. Method 2000 may include greater or fewer operations than those illustrated. Moreover, method 2000 may execute its operations in an order different than those illustrated below. Method 2000 may terminate at any suitable operation. Furthermore, method 2000 may repeat operation at any suitable point. Method 2000 may perform any of its operations in parallel with other operations of method 2000, or in other methods. Method 2000 may perform any of its operations on any element of data in parallel with other elements of data, such that method 2000 operates in a vectorized way.

At 2005, in one embodiment the binary translator may identify the stores in an instruction stream or instruction window. An instruction window may be a subset of the instruction stream. Stores may include any suitable instruction, including an instruction for storing data to memory or for moving data to memory. The instruction window may be of any length suitable to implement DSE. In one embodiment, the instruction window may be relatively small, such as approximately 10 instructions. A small instruction window may reduce the likelihood of applying DSE with the benefit of reduced resources to support DSE. In another embodiment, the instruction window may be relatively large, such as approximately 128 instructions. The large instruction window may increase the likelihood of applying DSE, at a cost of increased resources to support DSE. These resources may include additional registers and storage for temporary data during the execution of a speculative region.

At 2010, in one embodiment the binary translator may determine the memory locations of the identified stores. The binary translator may interface with the front end 1806 of the processor 1802 to determine the addresses or memory locations. In one embodiment, the front end may provide the address information to the binary translator with partial decoding of the instruction. In another embodiment, the front end may provide the address information to the binary translator on the first iteration or loop of a set of instructions.

At 2015, in one embodiment the binary translator may identify one or more redundant stores by finding two or more stores to a common memory location without any intervening access. Intervening use or access may include loading data from the common memory location or accessing the data via a register. A common memory location may include any two memory locations with at least a portion of the address that is common. In one embodiment, the common memory location may be the same memory location. In another embodiment, the common memory location may be at least a portion of a cache line.

At 2020, in one embodiment the binary translator may modify the instruction stream or instruction window for DSE. As illustrated in more detail in FIG. 21 as described below, the one or more regions of the instruction stream having a redundant store may be modified. Two or more instructions in the stream may receive one or more designators to control other portions of system 1800 to enable DSE. Moreover, two or more instructions may be fused together to further control other portions of system 1800 to enable DSE. The designators may indicate to other components that a speculative region of instructions is being executed. The DCU or MEU, for example, may hold snoops during execution of instructions in a speculative region. The snoops held may correspond to memory locations associated with instructions in a speculative region, where the instructions have been retired from the reorder buffer (ROB) to the store buffer (SB) and drained from the SB to the DCU.

Speculative reordering with DSE may occur on a more fine grained level than atomic store ordering or Intel® Transactional Synchronization Extensions (TSX). Atomic store ordering may delay committing the entire speculative region until the stores have retired in order and TSX may require locking semantics and programmer intervention to identify the transactional code regions. DSE may operate on a small instruction window without the drawbacks of atomic store ordering or TSX by speculatively reordering redundant stores without delaying committed instructions or holding snoops for all addresses.

At 2025, in one embodiment method 2000 may include execution of the instruction stream until the start of a DSE enabled region. At 2030, in one embodiment method 2000 may include execution of a store instruction associated with the start of a DSE enabled region. Although a store instruction is described throughout method 2000, any instruction suitable for writing data to memory may be used including, but not limited to, a move instruction. As illustrated in more detail in FIG. 22 as described below, the store instruction may be decoded, executed, retired, and drained from a store buffer (SB). After the store instruction at the start of the DSE region, one or more instructions without a DSE designator may be executed (not shown). At 2035, in one embodiment method 2000 may include execution of the next store instruction within the DSE region. As illustrated in more detail in FIG. 23 as described below, the next store instruction may be decoded, executed, retired, and drained from a SB. After the next store instruction with the DSE region, one or more instructions without a DSE designator may be executed (not shown).

At 2040, in one embodiment method 2000 may include execution of a load instruction within the DSE region. The load instruction may have a load address which corresponds to an address associated with DSE. In one embodiment, the address associated with DSE may be the common address identified by the binary translator in 2015. In another embodiment, the address associated with DSE may have at least a common portion with the common address identified by the binary translator in 2015. The common portion, for instance, may include data residing on a same or similar cache line. A similar cache line may include adjacent cache lines or multiple adjacent cache lines. At 2045, in one embodiment the data corresponding to the most recent store for the load address associated with DSE may be forwarded to the load instruction or load operation. The data corresponding to the most recent store may reside in any suitable location including, but not limited to, a register, a buffer, a queue, and a cache. For example, such data may reside in a store buffer (SB). The SB may identify the most recent store by identifying the program order of multiple stores to the same address. The youngest or most recent store may be correspond to the store that is last in program order among the stores to the same address. The forwarded data may be from a dynamically eliminated store, which may not commit the data to memory, but rather may only exist in a suitable location for store to load forwarding, such as the SB. Thus, the load instruction may receive the data expected by TSO without accessing the memory location or the DCU. After the load instruction, one or more instructions without a DSE designator may be executed (not shown).

At 2050, in one embodiment method 2000 may include execution of a fused operation-store instruction within the DSE region. A fused operation-store (fused op-st) instruction combines an operation and a store of the operation's result into a unified instruction. For example, a fused add-store instruction performs addition and then stores the sum of the addition. Although addition and stores are described, any suitable operations for fused instructions within DSE enabled regions may be used. As illustrated in more detail in FIG. 25 as described below, a fused op-st instruction may include a redundant store designator for DSE. After the fused op-st instruction is executed, one or more instructions without a DSE designator may be executed (not shown). At 2055, in one embodiment method 2000 may include execution of a store instruction at or corresponding to the end of a DSE region. As illustrated in more detail in FIG. 26 as described below, the store instruction may include one or more designators for DSE. The store instruction at the end of the DSE region may be decoded, executed, retired, and drained to the DCU.

At 2060, in one embodiment method 2000 may process one or more snoops for data associated with a redundant store in the DSE region. As illustrated in more detail in FIG. 27 as described below, the snoop may be delayed during the execution of the speculative region, such as the DSE region. Processing of snoops may occur continuously as they are received. At 2065, in one embodiment method 2000 may avoid deadlock from excessive delay in processing snoops for data associated with a redundant store in a DSE region. Monitoring to avoid deadlock may occur continuously, or may occur simultaneous to the processing of a DSE region of instructions. Deadlock may occur when one processing unit is waiting on another processing unit for data, and the other processing unit is also waiting on the first processing unit for data. Accordingly, a deadlock may cause two or more processing units to stop operation. A processing unit may be suitable logic or circuitry including, but not limited to, a thread, core, processor, or execution unit. As illustrated in FIG. 28 as described below, a system supporting DSE may avoid deadlock by detecting excessive delay in processing snoops.

Method 2000 may optionally repeat or terminate.

Figure 21:
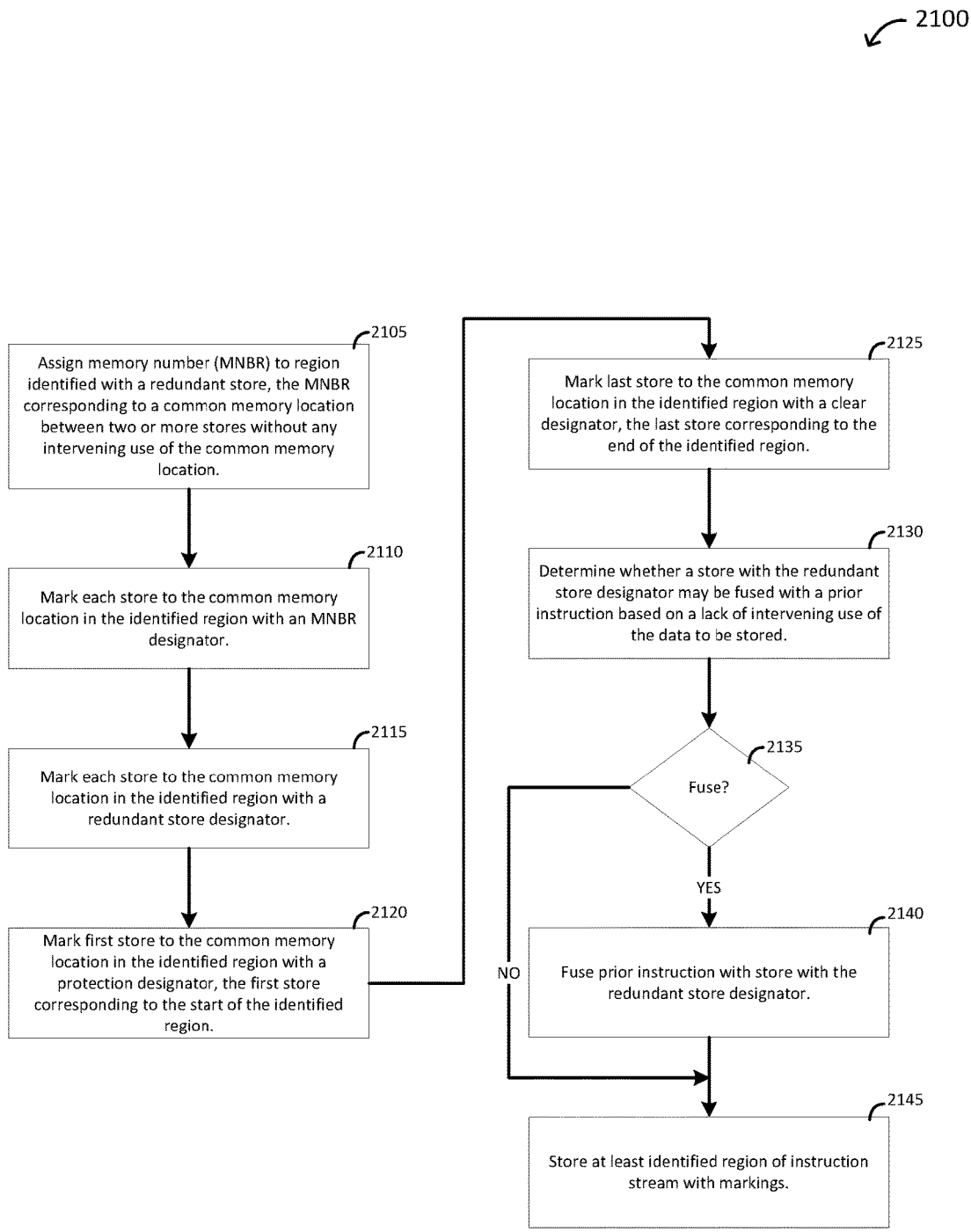
FIG. 21 is a diagram of operation of a method for modifying an instruction stream for dynamic store elimination, in accordance with embodiments of the present disclosure.

FIG. 21 is a diagram of operation of a method for modifying an instruction stream for dynamic store elimination, in accordance with embodiments of the present disclosure. Method 2100 may be implemented by any of the elements shown in FIGS. 1-20. Method 2100 may be initiated by any suitable criteria and may initiate operation at any suitable point. In one embodiment, method 2100 may initiate operation at 2105. Method 2100 may include greater or fewer operations than those illustrated. Moreover, method 2100 may execute its operations in an order different than those illustrated below. Method 2100 may terminate at any suitable operation. Furthermore, method 2100 may repeat operation at any suitable point. Method 2100 may perform any of its operations in parallel with other operations of method 2100, or in other methods. Method 2100 may perform any of its operations on any element of data in parallel with other elements of data, such that method 2100 operates in a vectorized way. Method 2100 may implement, in whole or part, operation 2020.

At 2105, in one embodiment a memory number (MNBR) may be assigned to a region identified having a redundant store. The region may be known as a DSE region. The MNBR may correspond to a memory location common between two or more stores without any intervening use of the common memory location. At 2110, in one embodiment each store to the common memory location within, or on the boundary of, the DSE region may be marked with an MNBR designator. The MNBR designator may be a number corresponding to the common memory location. The number may represent the common memory location, an assigned number, or a number based on the common memory location. At 2115, in one embodiment each store to the common memory location within, or on the boundary of, the DSE region may be marked with a redundant store designator. The redundant store designator may be any suitable symbol, such as a .E. At 2120, in one embodiment the first store to the common memory location on the boundary of the DSE region may be marked with a protection designator. The first store may correspond to the start of the DSE region. The protection designator may be any suitable symbol, such as a .P. The protection designator may be used to direct portions of system 1800 to retain data associated with the MNBR in order to avoid a TSO violation in a speculative region. For example, the store buffer (SB) may not drain data associated with the MNBR to the DCU until the protection designator is cleared using a store instruction having a clear designator. At 2125, in one embodiment the last store to the common memory location on the boundary of the DSE region may be marked with a clear designator. The last store may correspond to the end of the DSE region. The clear designator may be any suitable symbol, such as a .CL. The clear designator may be used to direct portions of 1800 to free resources previously held in order to retain data associated with the MNBR. For example, a eliminated store buffer (ESB) may clear its entry associated with the MNBR when processing a store instruction having the clear designator.

At 2130, in one embodiment it may be determined whether a store with the redundant store designator may be fused with a prior instruction. The determination may be based on a lack of intervening use of the data to be stored. For example, the prior instruction may be a subtraction operation and the difference of the subtraction may not be used until a subsequent store instruction. Although subtraction and store instructions are described, any combination of instruction suitable for DSE of fused instruction may be used. At 2135, method 2100 may proceed to 2140 if a redundant store may be fused. Otherwise, method 2100 may proceed to 2145. At 2140, the prior instruction may be fused with the store to create a fused operation-store instruction, or fused op-st. The fused op-st may include the redundant store designator and the MNBR designator associated with the store. The fusion may be based on the determination that the store may be fused with a prior instruction. In the event that the store cannot be fused with a prior instruction, the store and prior instruction may remain unmodified. At 2145, in one embodiment the method may store at least the DSE region, or the identified region of the optimized or modified instruction stream with markings in any suitable location, including back in the original instruction stream, in the L1 cache, in the L2 cache, in the L3 cache, in the L4 cache, in the LLC, in memory, or in dedicated storage. System 1800 may partition a portion of any suitable location for the instruction stream that is optimized or modified or may use dedicate the suitable location for the instruction stream that is optimized or modified.

Method 2020 may optionally repeat or terminate.

Figure 22:
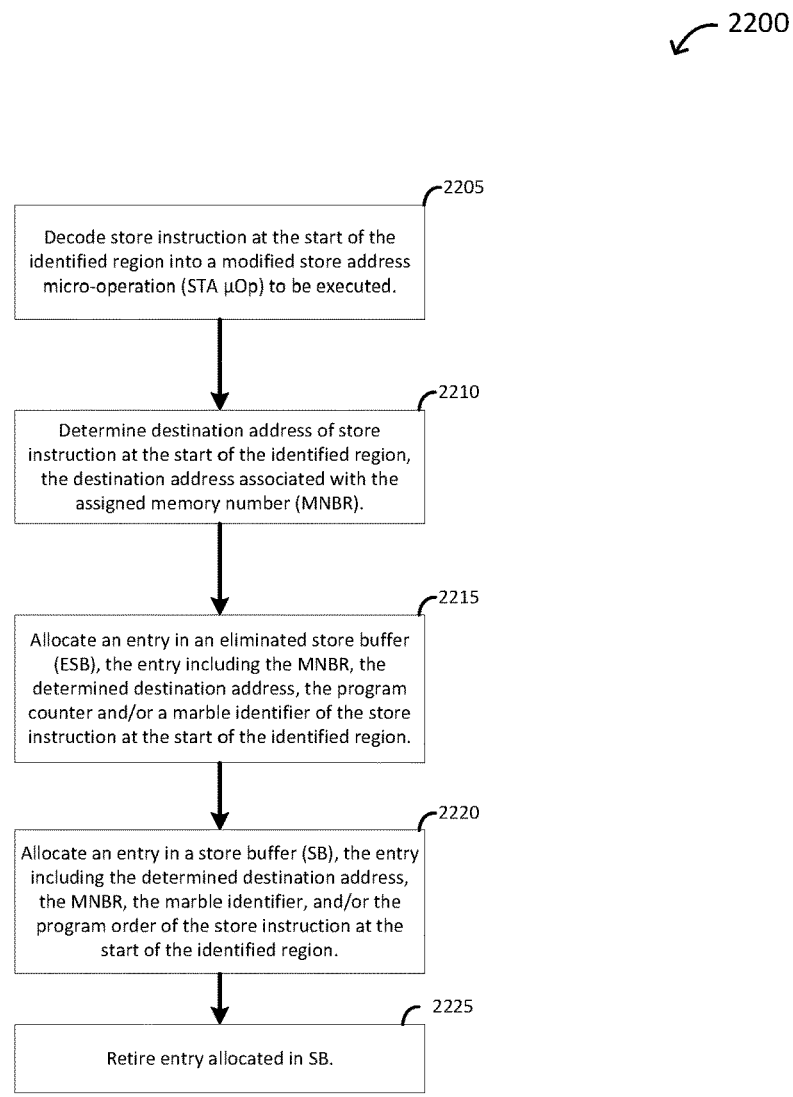
FIG. 22 is a diagram of operation of a method for processing stores at the start of a dynamic store elimination region, in accordance with embodiments of the present disclosure.

FIG. 22 is a diagram of operation of a method for processing stores at the start of a dynamic store elimination region, in accordance with embodiments of the present disclosure. Method 2200 may be implemented by any of the elements shown in FIGS. 1-20 and 24. Method 2200 may be initiated by any suitable criteria and may initiate operation at any suitable point. In one embodiment, method 2200 may initiate operation at 2205. Method 2200 may include greater or fewer operations than those illustrated. Moreover, method 2200 may execute its operations in an order different than those illustrated below. Method 2200 may terminate at any suitable operation. Furthermore, method 2200 may repeat operation at any suitable point. Method 2200 may perform any of its operations in parallel with other operations of method 2200, or in other methods. Method 2200 may perform any of its operations on any element of data in parallel with other elements of data, such that method 2200 operates in a vectorized way. Method 2200 may implement, in whole or part, operation 2030.

Figure 24:
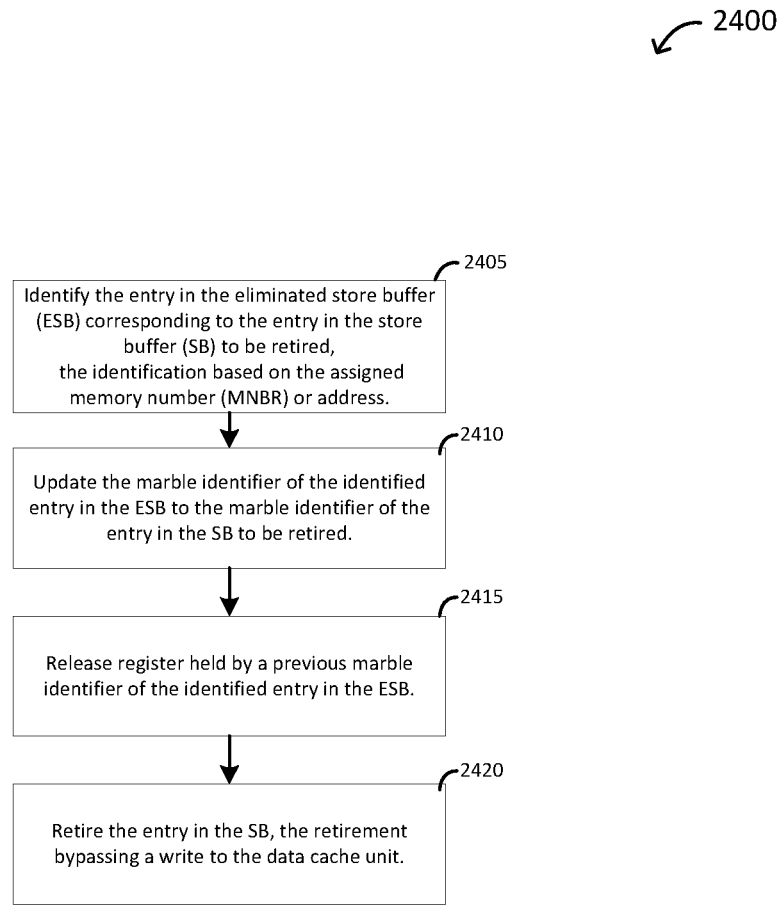
FIG. 24 is a diagram of operation of a method for retiring redundant stores, in accordance with embodiments of the present disclosure.

At 2205, in one embodiment the store instruction at the start of the identified region, or DSE region may be decoded into a modified store address micro-operation (STA μOp) for execution. The store instruction at the start of the DSE region may include a redundant store designator, a assigned memory number (MNBR) designator, and/or a protection designator. The modified STA μOp may not perform all of the operations of a standard STA μOp, but rather may change and/or limit operations suitable for DSE. Moreover, the decoding of the store instruction may bypass the creation of a store data micro-operation (STD μOp), which may be created for store instructions without a redundant store designator. At 2210, in one embodiment the destination address of the store instruction at the start of the DSE region may be determined. The destination address may be associated with the MNBR or the MNBR designator. This determination may be dependent on the execution of other instructions and the destination address may be variable. At 2215, in one embodiment an entry in an eliminated store buffer (ESB) may be allocated for the store instruction at the start of the DSE region. The entry may include the MNBR, the destination address, the program order, and/or a marble identifier of the store instruction at the start of the DSE region. In one embodiment, the marble identifier may correspond to a reference or pointer to a data register. In another embodiment, the marble identifier may correspond to the data residing in a data register or any other suitable location for storing data. At 2220, in one embodiment an entry in a store buffer (SB) may be allocated for the store instruction at the start of the DSE region. The entry may include the destination address, the MNBR, the marble identifier, and/or the program order of the store instruction at the start of the DSE region. The entry may also specify whether the instruction has been retired or resides in a speculative region of instructions. At 2225, in one embodiment the entry allocated in the SB may be retired. As illustrated in FIG. 24 in more detail, retirement of an instruction with a redundant store designator may not modify the data in the data cache unit (DCU).

Method 2030 may optionally repeat or terminate.

Figure 23:
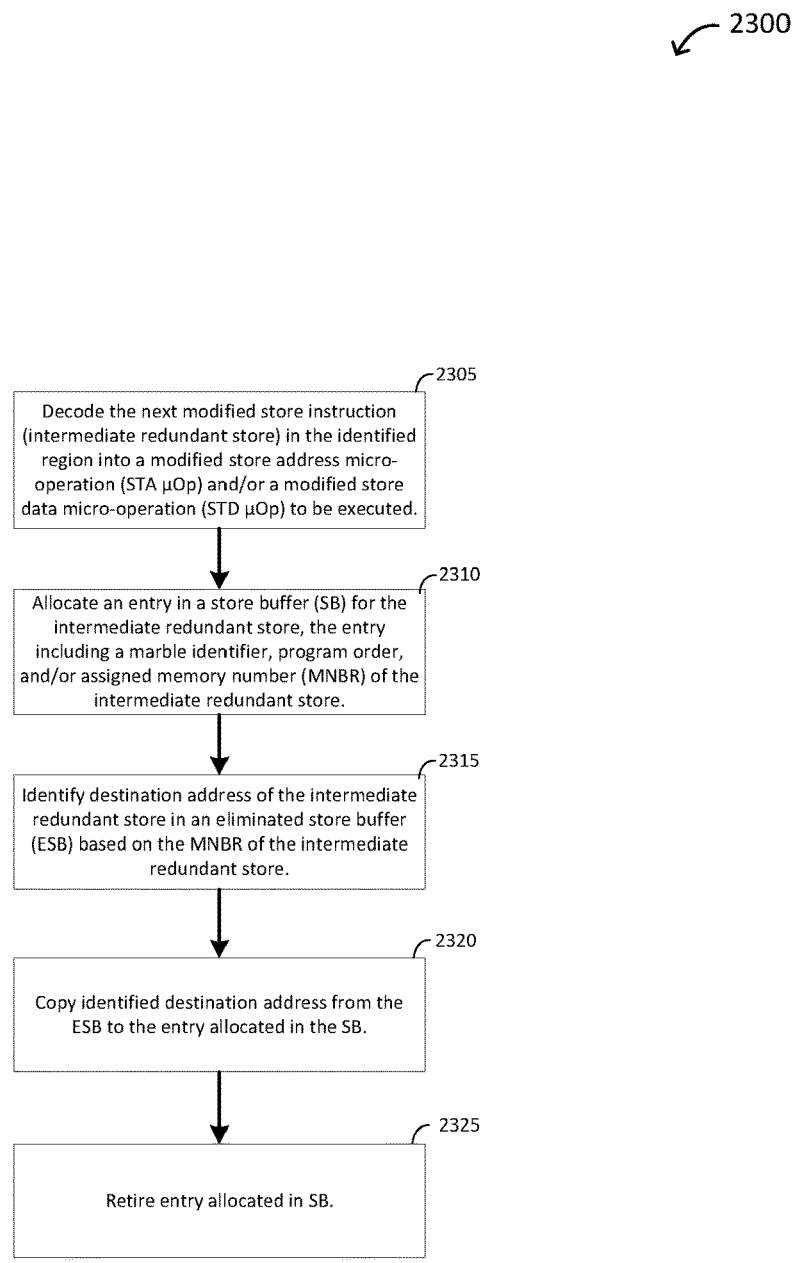
FIG. 23 is a diagram of operation of a method for processing stores within a dynamic store elimination region, in accordance with embodiments of the present disclosure.

FIG. 23 is a diagram of operation of a method for processing stores within a dynamic store elimination region, in accordance with embodiments of the present disclosure. Method 2300 may be implemented by any of the elements shown in FIGS. 1-20 and 24. Method 2300 may be initiated by any suitable criteria and may initiate operation at any suitable point. In one embodiment, method 2300 may initiate operation at 2305. Method 2300 may include greater or fewer operations than those illustrated. Moreover, method 2300 may execute its operations in an order different than those illustrated below. Method 2300 may terminate at any suitable operation. Furthermore, method 2300 may repeat operation at any suitable point. Method 2300 may perform any of its operations in parallel with other operations of method 2300, or in other methods. Method 2300 may perform any of its operations on any element of data in parallel with other elements of data, such that method 2300 operates in a vectorized way. Method 2300 may implement, in whole or part, operation 2035.

At 2305, in one embodiment the next modified store instruction in the DSE region, or an intermediate redundant store may be decoded into a modified store address micro-operation (STA μOp) and/or a modified store data micro-operation (STD μOp) to be executed. The modified STA μOp or STD μOp may not perform all of the operations of a standard STA μOp or STD μOp, but rather may change and/or limit operations suitable for DSE. At 2310, in one embodiment an entry in a store buffer (SB) may for allocated for the intermediate redundant store. The entry may include a marble identifier, a program order, and/or an assigned memory number (MNBR) from the intermediate redundant store. At 2315, in one embodiment the destination address of the intermediate redundant store may be identified in an eliminated store buffer (ESB) based on the MNBR of the intermediate redundant store. At 2320, in one embodiment, the identified destination address may be copied from the ESB to the entry allocated in the SB. Accordingly, the modified STA μOp may not need to calculate the destination address. At 2325, in one embodiment the entry allocated in the SB may be retired.

Method 2035 may optionally repeat or terminate.

FIG. 24 is a diagram of operation of a method for retiring redundant stores, in accordance with embodiments of the present disclosure. Method 2400 may be implemented by any of the elements shown in FIGS. 1-20. Method 2400 may be initiated by any suitable criteria and may initiate operation at any suitable point. In one embodiment, method 2400 may initiate operation at 2405. Method 2400 may include greater or fewer operations than those illustrated. Moreover, method 2400 may execute its operations in an order different than those illustrated below. Method 2400 may terminate at any suitable operation. Furthermore, method 2400 may repeat operation at any suitable point. Method 2400 may perform any of its operations in parallel with other operations of method 2400, or in other methods. Method 2400 may perform any of its operations on any element of data in parallel with other elements of data, such that method 2400 operates in a vectorized way. Method 2400 may implement, in whole or part, operation 2225 or operation 2325.

At 2405, in one embodiment an entry in the eliminated store buffer (ESB) may be identified. The identified entry may correspond to an entry in the store buffer (SB) to be retired. The identification may be based on the assigned memory number (MNBR) or address of the entries. For example, identification may include matching the MNBR for an entry in the SB to be retired to the MNBR of another entry in the ESB. At 2410, in one embodiment the marble identifier of the identified entry in the ESB may be updated to the marble identifier of the entry in the SB to be retired. At 2415, in one embodiment the register held by a previous marble identifier of the identified entry in the ESB may be released. The register may be held if the data in the register may still be needed by a subsequent instruction. Once a register is released, the front end may reallocate the register for another purpose, such as for a newly decoded instruction. At 2420, in one embodiment the entry in the SB may be retired. The retirement may clear or remove the entry from the SB while bypassing a write to the data cache unit (DCU), which may reduce power consumption and increase performance of a processor.

Method 2225 may optionally repeat or terminate.

Figure 25:
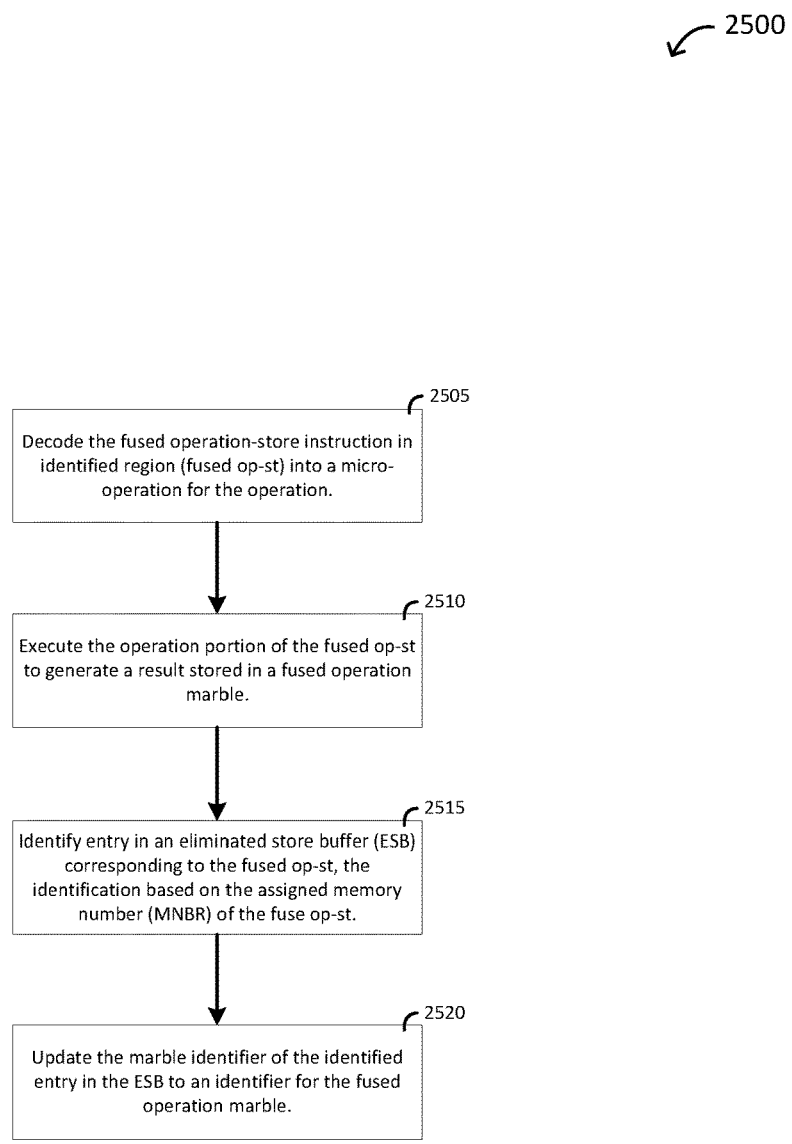
FIG. 25 is a diagram of operation of a method for processing fused stores within a dynamic store elimination region, in accordance with embodiments of the present disclosure.

FIG. 25 is a diagram of operation of a method for processing fused stores within a dynamic store elimination region, in accordance with embodiments of the present disclosure. Method 2500 may be implemented by any of the elements shown in FIGS. 1-20. Method 2500 may be initiated by any suitable criteria and may initiate operation at any suitable point. In one embodiment, method 2500 may initiate operation at 2505. Method 2500 may include greater or fewer operations than those illustrated. Moreover, method 2500 may execute its operations in an order different than those illustrated below. Method 2500 may terminate at any suitable operation. Furthermore, method 2500 may repeat operation at any suitable point. Method 2500 may perform any of its operations in parallel with other operations of method 2500, or in other methods. Method 2500 may perform any of its operations on any element of data in parallel with other elements of data, such that method 2500 operates in a vectorized way. Method 2500 may implement, in whole or part, operation 2050.

At 2505, in one embodiment the fused operation-store instruction (fused op-st) in a DSE region may be decoded into a modified micro-operation for the operation fused to the store. For example, an fused add-st instruction may be decoded into a modified ADD μOp. The modified ADD μOp may not perform all of the operations of a standard ADD μOp, but rather may change, limit, or supplement operations suitable for DSE. Although an add-st instruction is described, any suitable fused operation-store instruction suitable for DSE may be used. At 2510, in one embodiment the operation portion of the fused op-st may be executed to generate a result. For example, the ADD μOp may be executed to generate a sum. The result may be stored in a fused operation marble, such as a data register. At 2515, in one embodiment an entry in an eliminated store buffer (ESB) may be identified. The entry may correspond to the fused op-st. The identification may be based on the assigned memory number (MNBR) of the fused-op st. At 2520, in one embodiment the marble identifier of the identified entry in the ESB may be updated to an identifier for the fused operation marble. The fused operation marble may store the result of the operation portion of the fused op-st instruction. When the identified entry in the ESB is later drained, the DCU may receive the data corresponding to the updated marble identifier from the fused op-st instruction. Accordingly, a load instruction may not be able to receive an intermediate redundant store value until the completion of processing for the fused op-st instruction, at which time ESB may be searched using a matching MNBR to locate data to forward to the load instruction.

Method 2050 may optionally repeat or terminate.

Figure 26:
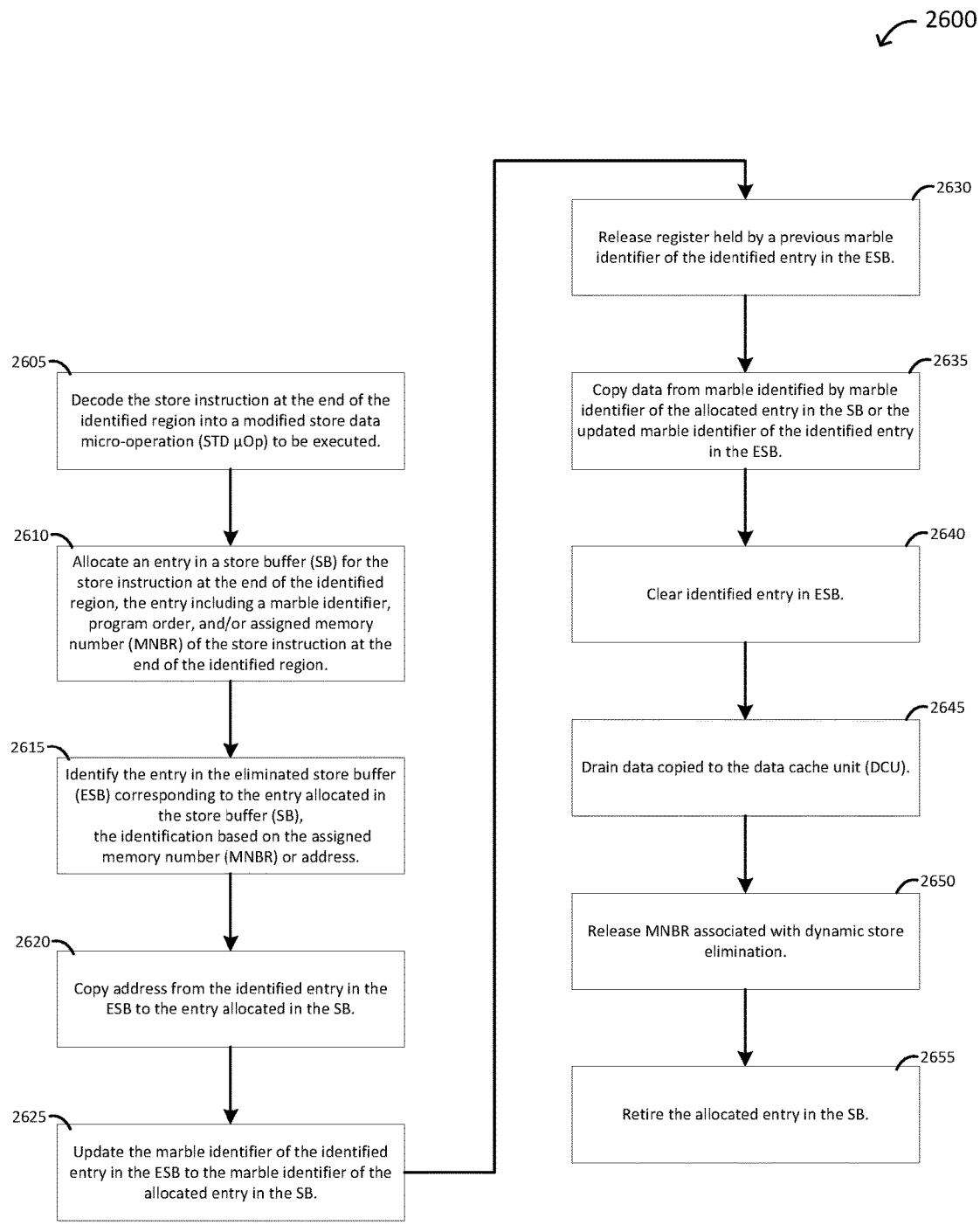
FIG. 26 is a diagram of operation of a method for processing stores at the end of a dynamic store elimination region, in accordance with embodiments of the present disclosure.

FIG. 26 is a diagram of operation of a method for processing stores at the end of a dynamic store elimination region, in accordance with embodiments of the present disclosure. Method 2600 may be implemented by any of the elements shown in FIGS. 1-20. Method 2600 may be initiated by any suitable criteria and may initiate operation at any suitable point. In one embodiment, method 2600 may initiate operation at 2605. Method 2600 may include greater or fewer operations than those illustrated. Moreover, method 2600 may execute its operations in an order different than those illustrated below. Method 2600 may terminate at any suitable operation. Furthermore, method 2600 may repeat operation at any suitable point. Method 2600 may perform any of its operations in parallel with other operations of method 2600, or in other methods. Method 2600 may perform any of its operations on any element of data in parallel with other elements of data, such that method 2600 operates in a vectorized way. Method 2600 may implement, in whole or part, operation 2055. Accordingly, method 2600 may not process stores at the start of a DSE region or in the middle of a DSE region.

At 2605, in one embodiment the store instruction at the end of the identified region (i.e., DSE region) may be decoded into a modified store data micro-operation (STD μOp) to be executed. At 2610, in one embodiment an entry in a store buffer (SB) may be allocated for the store instruction at the end of the DSE region. The entry may include a marble identifier, a program order, and/or an assigned memory number (MNBR) of the store instruction at the end of the DSE region. At 2615, in one embodiment an entry in the eliminated store buffer (ESB) may be identified. Identification may be based on the MNBR or address The entry in the ESB may correspond to the entry allocated in the SB. At 2620, in one embodiment the address from the identified entry in the ESB may be copied to the entry allocated in the SB. At 2625, in one embodiment the marble identifier of the identified entry in the ESB may be updated to the marble identifier of the allocated entry in the SB. At 2630, in one embodiment the register held by a previous marble identifier of the identified entry in the ESB may be released for reallocation or reuse. At 2635, in one embodiment data may be copied into the allocated entry in the SB. The data may be copied from the marble identified by the marble identifier of the allocated entry in the SB or from the updated marble identifier in the ESB. At 2640, in one embodiment, the identified entry in the ESB may be cleared. Clearing may include any suitable form including, but not limited to, invalidating, writing zeroes, or initializing the entry in the ESB. In one embodiment, the identified entry may be cleared due to an instruction with a clear designator. In another embodiment, the identified entry may be cleared due to a snoop to an address matching an address in the SB or ESB. At 2645, in one embodiment the data copied to the SB may be drained to the data cache unit (DCU). In one embodiment, the drain may occur due to an instruction with a clear designator. In another embodiment, the drain may occur due to a snoop to an address matching an address in the SB or ESB. At 2650, in one embodiment, the MNBR associated with the common address for DSE may be released for reallocation or reuse. The release may occur due to an instruction with a clear designator or due to a snoop. At 2655, in one embodiment the allocated entry in the SB may be retired.

Method 2055 may optionally repeat or terminate.

Figure 27:
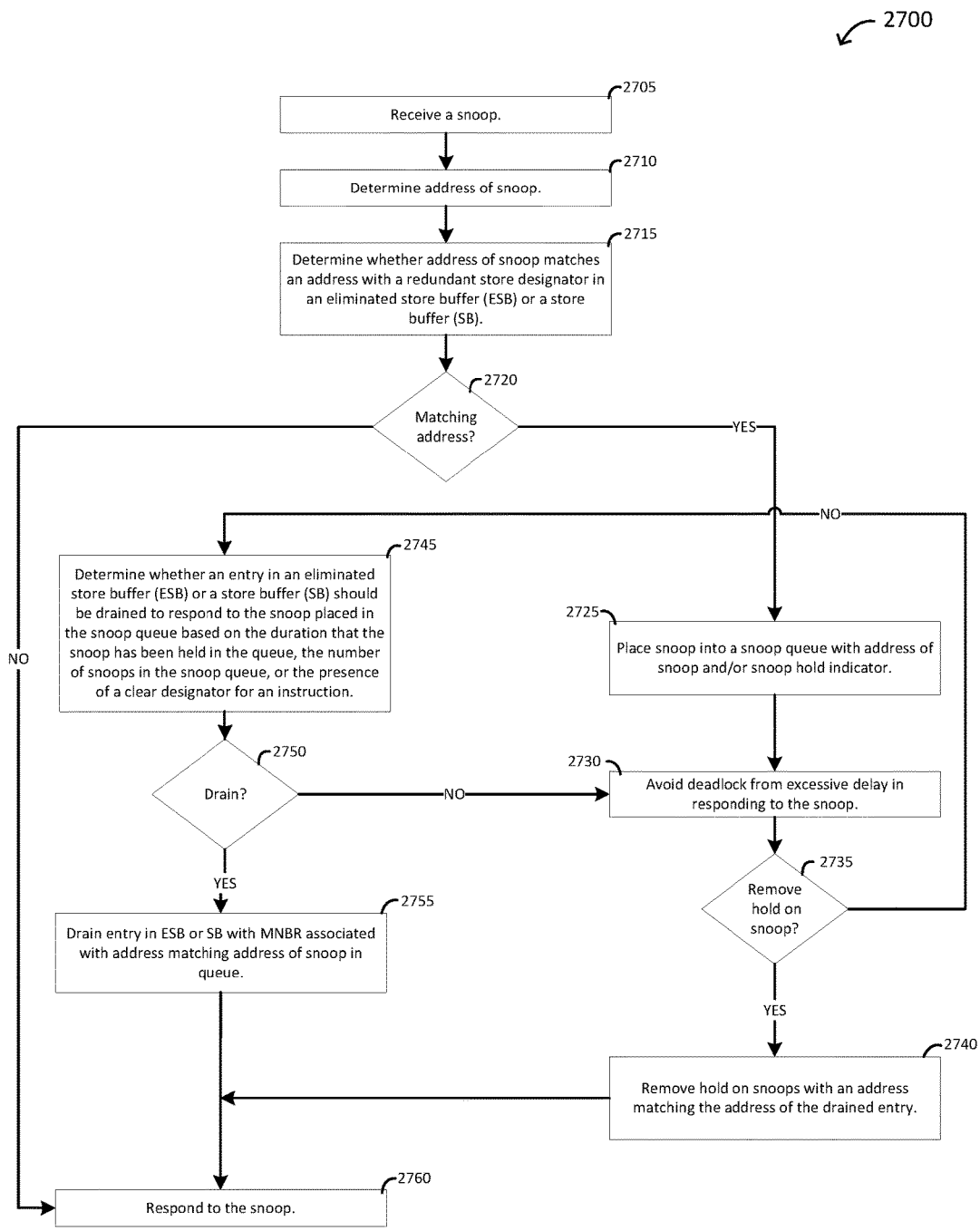
FIG. 27 is a diagram of operation of a method for processing snoops for data within a dynamic store elimination region, in accordance with embodiments of the present disclosure.
Figure 28:
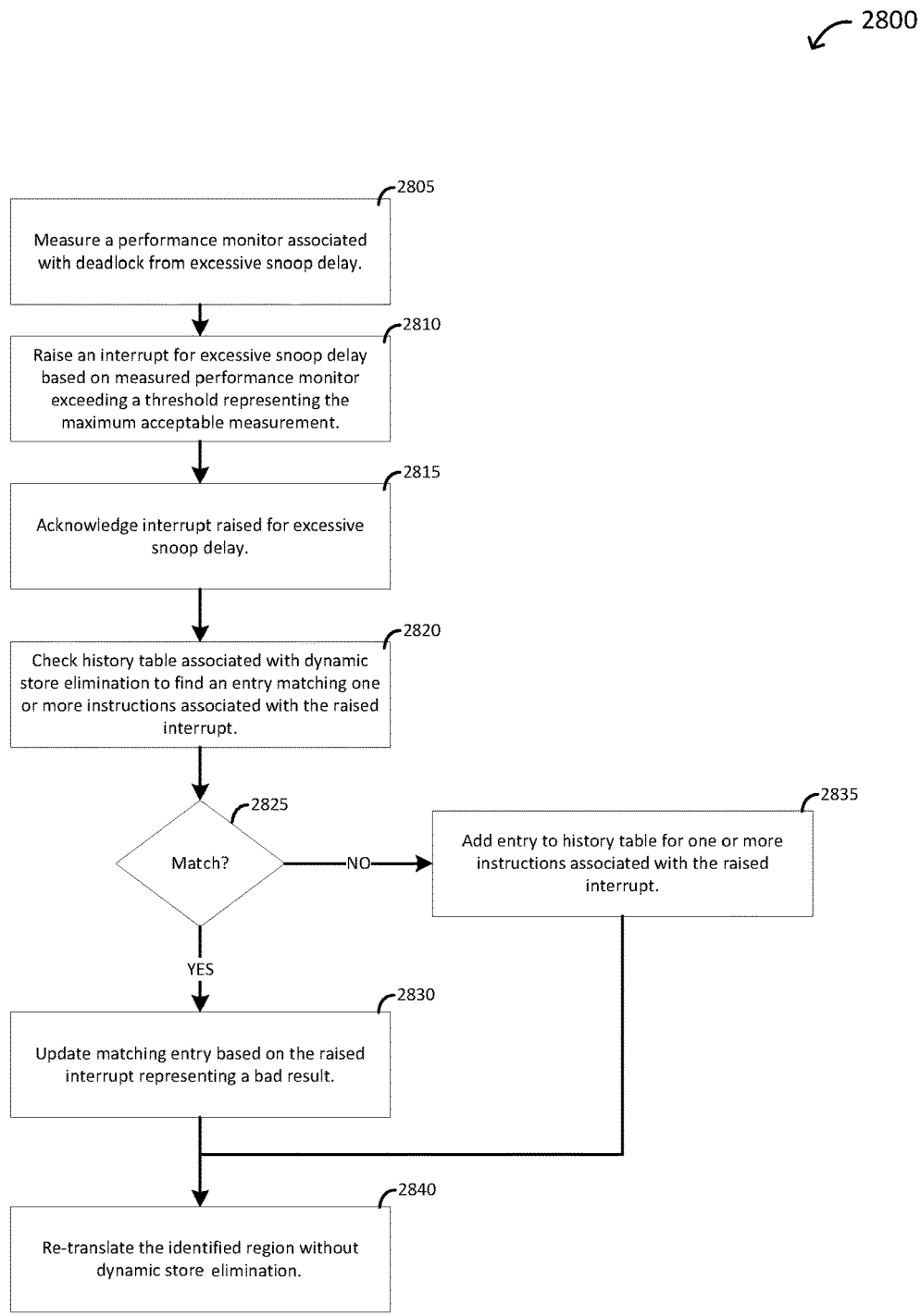
FIG. 28 is a diagram of operation of a method for avoiding deadlock from excessive snoop delay, in accordance with embodiments of the present disclosure.

FIG. 27 is a diagram of operation of a method for processing snoops for data within a dynamic store elimination region, in accordance with embodiments of the present disclosure. Method 2700 may be implemented by any of the elements shown in FIGS. 1-20. Method 2700 may be initiated by any suitable criteria and may initiate operation at any suitable point. In one embodiment, method 2700 may initiate operation at 2705. Method 2700 may include greater or fewer operations than those illustrated. Moreover, method 2700 may execute its operations in an order different than those illustrated below. Method 2700 may terminate at any suitable operation. Furthermore, method 2700 may repeat operation at any suitable point. Method 2700 may perform any of its operations in parallel with other operations of method 2700, or in other methods. Method 2700 may perform any of its operations on any element of data in parallel with other elements of data, such that method 2700 operates in a vectorized way. Method 2700 may implement, in whole or part, operation 2060.

At 2705, in one embodiment a snoop may be received by the DCU. Although a DCU is described for this illustration, any suitable portion of a processor may perform the functions of the DCU, such as an MEU. At 2710, in one embodiment the DCU may determine the address or cache line associated with a snoop. At 2715, in one embodiment the MEU may determine whether the address or cache line associated with snoop matches the address or cache line of an entry in an eliminated store buffer (ESB) or store buffer (SB) with a redundant store designator or an assigned memory number (MNBR). The entry in the ESB or SB may correspond to a redundant store in a DSE region of an instruction stream. The MEU may perform the match using any suitable mechanism, including a bloom filter, tag cache, or an array indexed by the memory address. At 2720, in one embodiment it may be determined whether there is a matching address. If there is a matching address, method 2700 may proceed to 2725. Otherwise, there is no matching address and method 2700 may proceed to 2760 to respond to the snoop.

At 2725, in one embodiment the DCU may place the snoop in the snoop queue. The entry in the snoop queue may contain the snoop itself, as well as the address of the snoop and/or a snoop hold indicator. At 2730, in one embodiment method 2060 may avoid deadlock from excessive delay in responding to the snoop. As illustrated in more detail in FIG. 28 as described below, avoiding deadlock may remember an excessive delay and may re-translate instructions without DSE optimizations. At 2735, in one embodiment it may be determined whether to remove the hold on the snoop in the snoop queue. The determination may be based on the draining of an address or cache line to the DCU. If the hold on the snoop may be removed, method 2700 may proceed to 2740. Otherwise, the hold on the snoop may not be removed and method 2700 may proceed to 2745.

At 2745, in one embodiment it may be determined whether an entry in the ESB or SB should be drained in order to respond to the snoop placed in the snoop queue. The determination may be based on the duration that the snoop has been held in the queue, the number of snoops in the snoop queue, or the presence of a clear designator for an instruction. At 2750, if it has been determined that the entry should be drained, method 2700 may proceed to 2755. Otherwise, the entry should not be drained and method 2700 may proceed to 2730. At 2755, in one embodiment the entry in the ESB or SB with an MNBR associated with an address matching the address of a snoop in the snoop queue may be drained to the DCU.

If method 2060 proceeds to 2730, method 2060 may avoid deadlock and then proceed to 2735 to determine whether to remove the hold on the snoop. If the hold on the snoop should be removed, method 2700 may proceed to 2740. At 2740, in one embodiment snoops in the snoop queue that have an address matching the address of the drained entry may be removed. In one embodiment, the match may indicate that the address in the snoop queue is the same address of the drained entry. In another embodiment, the match may indicate that the address in the snoop queue is on the same or similar cache line as the address of the drained entry. Removal may include setting a flag to indicate that the previously held snoop may be processed or removing the snoop from the snoop queue. At 2760, the DCU may respond to the snoop previously held with the updated data, which is marked with a dirty or modified status. The updated data may represent the data drained by the ESB or SB to the DCU.

Method 2060 may optionally repeat or terminate.

FIG. 28 is a diagram of operation of a method for avoiding deadlock from excessive snoop delay, in accordance with embodiments of the present disclosure. Method 2800 may be implemented by any of the elements shown in FIGS. 1-20. Method 2800 may be initiated by any suitable criteria and may initiate operation at any suitable point. In one embodiment, method 2800 may initiate operation at 2805. Method 2800 may include greater or fewer operations than those illustrated. Moreover, method 2800 may execute its operations in an order different than those illustrated below.

Method 2800 may terminate at any suitable operation. Furthermore, method 2800 may repeat operation at any suitable point. Method 2800 may perform any of its operations in parallel with other operations of method 2800, or in other methods. Method 2800 may perform any of its operations on any element of data in parallel with other elements of data, such that method 2800 operates in a vectorized way. Method 2800 may implement, in whole or part, operation 2065 or operation 2730.

At 2805, in one embodiment a performance monitor associated with deadlock from excessive snoop delay may be measured. The measurement may be performed by any suitable part of a processor, including a core, uncore module, or an MEU. The performance monitor may measure the number of held snoops, the average delay for held snoops, the maximum delay for held snoops, or any other suitable criteria for detecting deadlock from excessive snoop delay. The performance monitor measurement may be an absolute raw numeric value, or a relative numeric value, such as a counter. At 2810, in one embodiment an interrupt may be raised for excessive snoop delay based on the measured performance monitor exceeding a threshold. The threshold may represent the maximum acceptable measurement. At 2815, in one embodiment the interrupt raised for excessive delay may be acknowledged or processed. At 2820, in one embodiment a history table associated with DSE may be checked to determine whether there is an entry matching one or more instructions associated with the raised interrupt. These instructions may be redundant stores. In one embodiment, the history table resides in the front end 1806 of the processor to assist with decoding instructions. In another embodiment, the history table resides in a binary translator. The history table may be any suitable structure for storing historic information, including an array or a content addressable memory (CAM). At 2825, in one embodiment it may be determined whether there is a match. If there is a match, method 2800 may proceed to 2830. Otherwise, method 2800 may proceed to 2835. At 2830, a matching entry in the history table may be updated based on the raised interrupt. The raising of the interrupt may correspond to a bad result associated with DSE, including a deadlock from excessive snoop delay. At 2835, in one embodiment, an entry may be added to the history table for one or more instructions associated with the raised interrupt. At 2840, in one embodiment, the identified region or DSE region may be re-translated without DSE. In one embodiment, the retranslation may be performed by a binary translator. In another embodiment, the original instruction stream, which may be stored separately from the modified instruction stream, may be available for execution. The processor may be restored to a previously stored architectural state and execution may resume with the original instruction stream or the re-translated instruction stream.

Method 2065 may optionally repeat or terminate.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code may be applied to input instructions to perform the functions described herein and generate output information. The output information may be applied to one or more output devices, in known fashion. For purposes of this application, a processing system may include any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine-readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

Accordingly, embodiments of the disclosure may also include non-transitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part-on and part-off processor.

Thus, techniques for performing one or more instructions according to at least one embodiment are disclosed. While certain exemplary embodiments have been described and shown in the accompanying drawings, it is to be understood that such embodiments are merely illustrative of and not restrictive on other embodiments, and that such embodiments not be limited to the specific constructions and arrangements shown and described, since various other modifications may occur to those ordinarily skilled in the art upon studying this disclosure. In an area of technology such as this, where growth is fast and further advancements are not easily foreseen, the disclosed embodiments may be readily modifiable in arrangement and detail as facilitated by enabling technological advancements without departing from the principles of the present disclosure or the scope of the accompanying claims.

In some embodiments of the present disclosure, a processor for redundant stores may include a front end, a data cache unit, a binary translator, and a memory execution unit. A front end may include circuitry to decode instructions from an instruction stream. A data cache unit may include circuitry to cache data for the processor. A binary translator may include circuitry to identify a first region of the instruction stream, which may include a first redundant store, mark a first starting instruction of the first region with a protection designator, mark a first ending instruction of the first region with a clear designator, and store an amended instruction stream, which may include the markings. A memory execution unit (MEU) may include circuitry to track the first redundant store. The circuitry to track may be based on the protection designator and the clear designator and may eliminate the first redundant store.

In combination with any of the above embodiments, in an embodiment the processor may comprise circuitry to receive a snoop, determine an address of the snoop, compare the address of the snoop to a destination address of a store in the first region of the instruction stream, hold the snoop based, and release the snoop after the first ending instruction of the first region is drained to the data cache unit. The comparison between the address of the snoop and the destination address may determine whether the address of the snoop may match the destination address of the store in the first region of the instruction stream. The hold of the snoop may be based on a determination that the address of the snoop may match the destination address of the store. The store may be the first redundant store. In combination with any of the above embodiments, in an embodiment the binary translator may include circuitry to store an architectural state of the processor before execution of the amended instruction stream. In combination with any of the above embodiments, in an embodiment the processor may comprise circuitry to measure a snoop response, compare the measured snoop response to a response threshold to determine whether the measured snoop response may be greater than the response threshold, and raise an interrupt based on a determination that the measured snoop response may be greater than the response threshold. The binary translator may include circuitry to process the raised interrupt, restore the processor to the stored architectural state, and restart execution from the instruction stream. In combination with any of the above embodiments, in an embodiment the amended instruction stream may be stored in the instruction stream, a Level-1 cache, a Level-2 cache, a Level-3 cache, a Level-4 cache, a last level cache, a memory, or a dedicated storage. In combination with any of the above embodiments, in an embodiment the binary translator may include circuitry to identify a second region of the instruction stream, which may include a second redundant store, mark a second starting instruction of the second region with the protection designator, mark a second ending instruction of the second region with the clear designator, mark the first starting instruction and first ending instruction of the first region with a first assigned memory number, mark the second starting instruction and the second ending instruction with a second assigned memory number, and the circuitry to store the amended instruction stream is to store the first and second assigned memory numbers. In combination with any of the above embodiments, in an embodiment the circuitry to identify the first redundant store may include circuitry to determine a destination address of the first redundant store based on a previously executed instruction.

In some of the present embodiments, a method for redundant stores may include decoding instructions from an instruction stream, identifying a first region of the instruction stream including a first redundant store, marking a first starting instruction of the first region with a protection designator, marking a first ending instruction of the first region with a clear designator, storing an amended instruction stream, which may include the markings, tracking the first redundant store using the protection designator and the clear designator, and eliminating the first redundant store.

In combination with any of the above embodiments, in an embodiment the method may include receiving a snoop, determining an address of the snoop, comparing the address of the snoop to a destination address of a store in the first region of the instruction stream, holding the snoop, draining the first ending instruction of the first region, and releasing the held snoop. The comparison between the address of the snoop to the destination address of the store may determine whether the address of the snoop matches the destination address of the store in the first region of the instruction stream. Holding the snoop may be based on a determination that the address of the snoop matches the destination address of the store. The store may be the first redundant store. In combination with any of the above embodiments, in an embodiment the method may include storing an architectural state before executing the amended instruction stream. In combination with any of the above embodiments, in an embodiment the method may include measuring a snoop response, comparing the measured snoop response to a response threshold, raising an interrupt, processing the raised interrupt, restoring the stored architectural state, and restarting execution from the instruction stream. The comparison between the measured snoop response and the response threshold may determine whether the measured snoop response may be greater than the response threshold. Raising the interrupt may be based on a determination that the measured snoop response is greater than the response threshold. In combination with any of the above embodiments, in an embodiment the method may include identifying a second region of the instruction stream, which may include a second redundant store, marking a second starting instruction with the protection designator, marking a second ending instruction with the clear designator, marking the first starting instruction and first ending instruction of the first region with a first assigned memory number, marking the second starting instruction and second ending instruction of the second region with a second assigned memory number, and the storing of the amended instruction stream, including storing the first and second assigned memory numbers. In combination with any of the above embodiments, in an embodiment the method may include identifying the first redundant store by determining a destination address of the first redundant store based on a previously executed instruction. In combination with any of the above embodiments, in an embodiment the method may include storing the amended instruction stream to the instruction stream, a Level-1 cache, a Level-2 cache, a Level-3 cache, a Level-4 cache, a last level cache, a memory, or a dedicated storage.

In some embodiments of the present disclosure, a system for redundant stores may include a front end, a data cache unit, a binary translator, and a memory execution unit. A front end may include circuitry to decode instructions from an instruction stream. A data cache unit may include circuitry to cache data for the system. A binary translator may include circuitry to identify a first region of the instruction stream, which may include a first redundant store, mark a first starting instruction of the first region with a protection designator, mark a first ending instruction of the first region with a clear designator, and store an amended instruction stream, which may include the markings. A memory execution unit (MEU) may include circuitry to track the first redundant store. The circuitry to track may be based on the protection designator and the clear designator and may eliminate the first redundant store.

In combination with any of the above embodiments, in an embodiment the system may comprise circuitry to receive a snoop, determine an address of the snoop, compare the address of the snoop to a destination address of a store in the first region of the instruction stream, hold the snoop based, and release the snoop after the first ending instruction of the first region is drained to the data cache unit. The comparison between the address of the snoop and the destination address may determine whether the address of the snoop may match the destination address of the store in the first region of the instruction stream. The hold of the snoop may be based on a determination that the address of the snoop may match the destination address of the store. The store may be the first redundant store. In combination with any of the above embodiments, in an embodiment the binary translator may include circuitry to store an architectural state of the system before execution of the amended instruction stream. In combination with any of the above embodiments, in an embodiment the system may comprise circuitry to measure a snoop response, compare the measured snoop response to a response threshold to determine whether the measured snoop response may be greater than the response threshold, and raise an interrupt based on a determination that the measured snoop response may be greater than the response threshold. The binary translator may include circuitry to process the raised interrupt, restore the system to the stored architectural state, and restart execution from the instruction stream. In combination with any of the above embodiments, in an embodiment the amended instruction stream may be stored in the instruction stream, a Level-1 cache, a Level-2 cache, a Level-3 cache, a Level-4 cache, a last level cache, a memory, or a dedicated storage. In combination with any of the above embodiments, in an embodiment the binary translator may include circuitry to identify a second region of the instruction stream, which may include a second redundant store, mark a second starting instruction of the second region with the protection designator, mark a second ending instruction of the second region with the clear designator, mark the first starting instruction and first ending instruction of the first region with a first assigned memory number, mark the second starting instruction and the second ending instruction with a second assigned memory number, and the circuitry to store the amended instruction stream is to store the first and second assigned memory numbers. In combination with any of the above embodiments, in an embodiment the circuitry to identify the first redundant store may include circuitry to determine a destination address of the first redundant store based on a previously executed instruction.

In some of the present embodiments, a binary translator for redundant stores may include circuitry to identify a first region of an instruction stream, which may include a first redundant store, mark a first starting instruction of the first region with a protection designator, mark a first ending instruction of the first region with a clear designator, and store an amended instruction stream including the markings for elimination of the first redundant store.

In combination with any of the above embodiments, in an embodiment the binary translator may include circuitry to store the architectural state of a processor before the processor executes an amended instruction stream. In combination with any of the above embodiments, in an embodiment the binary translator may include circuitry to process an interrupt raised in response to a measured snoop response in excess of a response threshold, restore a processor to a previously stored architectural state, and direct the processor to restart execution from an instruction stream. In combination with any of the above embodiments, in an embodiment the binary translator may store the amended instruction stream in the instruction stream, a Level-1 cache, a Level-2 cache, a Level-3 cache, a Level-4 cache, a last level cache, a memory, or a dedicate storage. In combination with any of the above embodiments, in an embodiment the binary translator may include circuitry to identify a second region of the instruction stream, which may include a second redundant store, mark a second starting instruction of the second region with the protection designator, mark a second ending instruction of the second region with the clear designator, mark the first starting instruction and the first ending instruction of the first region with a first assigned memory number, mark the second starting instruction and the second ending instruction with a second assigned memory number, and store the amended instruction stream with the first and second assigned memory numbers. In combination with any of the above embodiments, in an embodiment the binary translator may include circuitry to determine a destination address of the first redundant store based on a previously executed instruction.

In some of the present embodiments, a memory execution unit for redundant stores may include circuitry to buffer a first data. The first data may include a first assigned memory number. The memory execution unit may include circuitry to receive a first snoop, compare the address of the first snoop to a destination address of the first data buffered, hold the first snoop, buffer a second data, retire the first data, retire the second data, and release the first snoop. The comparison between the address of the first snoop and the destination address of the first data buffered may determine whether the address of the first snoop may match the destination address of the first data buffered. The hold of the first snoop may be based on a determination that the address of the first snoop may match the destination address of the first data buffered. The second data may include the first assigned memory number and a clear designator. The retirement of the first data may be via a bypass to a drain operation. The retirement of the second data may be via a drain operation. The release of the first snoop may be after the second data is retired.

In combination with any of the above embodiments, in an embodiment the memory execution unit may include circuitry to buffer a third data, receive a second snoop, determine an address of the second snoop, compare the address of the second snoop to a destination address of the third data buffered, hold the second snoop, buffer a fourth data, retire the third data, retire the fourth data, release the second snoop, and continue to hold the first snoop. The comparison between the address of the second snoop and the destination address of the third data buffered may determine whether the address of the second snoop may match the destination address of the third data buffered. The hold of the second snoop may be based on a determination that the address of the second snoop may match the destination address of the third data buffered. The fourth data may include the second assigned memory number and the clear designator. The retirement of the third data may be via a bypass to a drain operation. The retirement of the fourth data may be via a drain operation. The release of the second snoop may be after the fourth data is retired. The continuation of the hold on the first snoop may be after the fourth data is retired. In combination with any of the above embodiments, in an embodiment the memory execution unit may include circuitry to track the first assigned number designator with an assigned number field in a store buffer. In combination with any of the above embodiments, in an embodiment the memory execution unit may include circuitry to track a first marble identifier with a marble identifier field in an eliminated store buffer. The first marble identifier may be associated with the first data or the second data. In combination with any of the above embodiments, in an embodiment the memory execution unit may include circuitry to receive a second snoop, determine an address of the second snoop, compare the address of the second snoop to a destination address of the first data buffered, and process the second snoop without a hold on the second snoop. The comparison between the address of the second snoop and the destination address of the first data buffered may determine whether the address of the second snoop may match the destination address of the first data buffered. The processing of the second snoop without a hold may be based on a determination that the address of the second snoop does not match the destination address of the first data buffered. In combination with any of the above embodiments, in an embodiment the memory execution unit may include circuitry to push the first snoop to hold onto a snoop queue. In combination with any of the above embodiments, in an embodiment the memory execution unit may include circuitry to measure a snoop response, compare the measured snoop response to a response threshold, and raise an interrupt. The comparison between the measured snoop response and the response threshold may determine whether the measured snoop response may be greater than the response threshold. The interrupt may be raised based on a determination that the measured snoop response may be greater than the response threshold.

In some of the present embodiments, a data cache unit for processing snoops may include any portion, in whole or part, of the circuitry in a memory execution unit.

In some of the present embodiments, at least one non-transitory machine readable storage medium may be included. The machine readable storage medium may comprise computer-readable instructions carried on the machine readable medium. The instruction may be readable by a hardware processor. The instructions when read and executed may cause the processor to perform decoding instructions from an instruction stream, identifying a first region of the instruction stream including a first redundant store, marking a first starting instruction of the first region with a protection designator, marking a first ending instruction of the first region with a clear designator, storing an amended instruction stream including the markings, tracking the first redundant store using the protection designator and the clear designator, and eliminating the first redundant store.

In combination with any of the above embodiments, the at least one non-transitory machine readable storage medium may comprise instructions to cause the processor to perform receiving a snoop, determining an address of the snoop, comparing the address of the snoop to a destination address of a store in the first region of the instruction stream to determine whether the address of the snoop matches the destination address of the store in the first region of the instruction stream, holding the snoop based on a determination that the address of the snoop may match the destination address of the store, wherein the store is the first redundant store, draining the first ending instruction of the first region, and releasing the held snoop. In combination with any of the above embodiments, the at least one non-transitory machine readable storage medium may comprise instructions to cause the processor to perform storing an architectural state before executing the amended instruction stream. In combination with any of the above embodiments, the at least one non-transitory machine readable storage medium may comprise instructions to cause the processor to perform measuring a snoop response, comparing the measured snoop response to a response threshold to determine whether the measured snoop response may be greater than the response threshold, raising an interrupt based on a determination that the measured snoop response is greater than the response threshold, processing the raised interrupt, restoring the stored architectural state, and restarting execution from the instruction stream. In combination with any of the above embodiments, the at least one non-transitory machine readable storage medium may comprise instructions to cause the processor to perform identifying a second region of the instruction stream including a second redundant store, marking a second starting instruction with the protection designator, marking a second ending instruction with the clear designator, marking the first starting instruction and first ending instruction of the first region with a first assigned memory number, marking the second starting instruction and second ending instruction of the second region with a second assigned memory number, and the storing of the amended instruction stream, including storing the first and second assigned memory numbers. In combination with any of the above embodiments, the at least one non-transitory machine readable storage medium may comprise instructions to cause the processor to perform identifying the first redundant store further including determining a destination address of the first redundant store based on a previously executed instruction.

In some of the present embodiments, an apparatus for redundant stores may include a means for decoding instructions from an instruction stream, a means for identifying a first region of the instruction stream, which may include a first redundant store, a means for marking a first starting instruction of the first region with a protection designator, a means for marking a first ending instruction of the first region with a clear designator, a means for storing an amended instruction stream, which may include the markings, a means for tracking the first redundant store using the protection designator and the clear designator, and a means for eliminating the first redundant store.

In combination with any of the above embodiments, in an embodiment the apparatus may include a means for receiving a snoop, a means for determining an address of the snoop, a means for comparing the address of the snoop to a destination address of a store in the first region of the instruction stream, a means for holding the snoop, a means for draining the first ending instruction of the first region, and a means for releasing the held snoop. The means for comparison between the address of the snoop to the destination address of the store may determine whether the address of the snoop matches the destination address of the store in the first region of the instruction stream. The means for holding the snoop may be based on a determination that the address of the snoop may match the destination address of the store. The store may be the first redundant store. In combination with any of the above embodiments, in an embodiment the apparatus may include a means for storing an architectural state before a means for executing the amended instruction stream. In combination with any of the above embodiments, in an embodiment the apparatus may include a means for measuring a snoop response, a means for comparing the measured snoop response to a response threshold, a means for raising an interrupt, processing the raised interrupt, a means for restoring the stored architectural state, and a means for restarting execution from the instruction stream. The means for comparison between the measured snoop response and the response threshold may determine whether the measured snoop response may be greater than the response threshold. The means for raising the interrupt may be based on a determination that the measured snoop response may be greater than the response threshold. In combination with any of the above embodiments, in an embodiment the apparatus may include a means for identifying a second region of the instruction stream, which may include a second redundant store, a means for marking a second starting instruction with the protection designator, a means for marking a second ending instruction with the clear designator, a means for marking the first starting instruction and first ending instruction of the first region with a first assigned memory number, a means for marking the second starting instruction and second ending instruction of the second region with a second assigned memory number, and the means for storing of the amended instruction stream, including a means for storing the first and second assigned memory numbers. In combination with any of the above embodiments, in an embodiment the apparatus may include a means for identifying the first redundant store by a means for determining a destination address of the first redundant store based on a previously executed instruction. In combination with any of the above embodiments, in an embodiment the apparatus may include a means for storing the amended instruction stream to the instruction stream, a Level-1 cache, a Level-2 cache, a Level-3 cache, a Level-4 cache, a last level cache, a memory, or a dedicated storage means.

What is claimed is:

1. A processor for redundant stores, comprising:
a front end including hardware circuitry to decode instructions from an instruction stream;
a data cache unit including hardware circuitry to cache data for the processor;
a binary translator including hardware circuitry to:
identify a first region of the instruction stream, the first region including a first redundant store;
mark a first starting instruction of the first region with a protection designator;
mark a first ending instruction of the first region with a clear designator; and
store an amended instruction stream including the marked first starting instruction and the marked first ending instruction; and
a memory execution unit (MEU) including hardware circuitry to track the first redundant store based on the protection designator and the clear designator to eliminate the first redundant store.

2. The processor of claim 1, further comprising hardware circuitry to:
receive a snoop;
determine an address of the snoop;
compare the address of the snoop to a destination address of a store in the first region of the instruction stream to determine whether the address of the snoop matches the destination address of the store in the first region of the instruction stream;
hold the snoop based on a determination that the address of the snoop matches the destination address of the store, wherein the store is the first redundant store; and
release the snoop after the first ending instruction of the first region is drained to the data cache unit.

3. The processor of claim 1, wherein the hardware circuitry of the binary translator is further to store an architectural state of the processor before execution of the amended instruction stream.

4. The processor of claim 3, further comprising hardware circuitry to:
measure a snoop response;
compare the measured snoop response to a response threshold to determine whether the measured snoop response is greater than the response threshold; and
raise an interrupt based on a determination that the measured snoop response is greater than the response threshold;
wherein the hardware circuitry of the binary translator is further to:
process the raised interrupt;
restore the processor to the stored architectural state; and
restart execution from the instruction stream.

5. The processor of claim 4, wherein the marked first starting instruction and the marked first ending instruction are to be stored in:
the instruction stream;
a Level-1 cache;
a Level-2 cache;
a Level-3 cache;
a Level-4 cache;
a last level cache;
a memory; or
a dedicated storage.

6. The processor of claim 1, wherein the hardware circuitry of the binary translator is to mark the first starting instruction of the first region with a first instance of the protection designator and mark the first ending instruction of the first region with a first instance of the clear designator, and is further to:
identify a second region of the instruction stream including a second redundant store;
mark a second starting instruction of the second region with a second instance of the protection designator;
mark a second ending instruction of the second region with a second instance of the clear designator;
mark the first starting instruction and the first ending instruction of the first region with a first assigned memory number;
mark the second starting instruction and the second ending instruction with a second assigned memory number; and
store the first and second assigned memory numbers.

7. The processor of claim 1, wherein the hardware circuitry of the binary translator is to identify the first redundant store by determining a destination address of the first redundant store based on a previously executed instruction.

8. A method for redundant stores, comprising:
decoding instructions from an instruction stream;
identifying a first region of the instruction stream, the first region including a first redundant store;
marking a first starting instruction of the first region with a protection designator;
marking a first ending instruction of the first region with a clear designator;

storing an amended instruction stream including the marked first starting instruction and the marked first ending instruction;
tracking the first redundant store using the protection designator and the clear designator; and
eliminating the first redundant store.

9. The method of claim 8, further comprising:
receiving a snoop;
determining an address of the snoop;
comparing the address of the snoop to a destination address of a store in the first region of the instruction stream to determine whether the address of the snoop matches the destination address of the store in the first region of the instruction stream;
holding the snoop based on a determination that the address of the snoop matches the destination address of the store, wherein the store is the first redundant store;
draining the first ending instruction of the first region; and
releasing the held snoop.

10. The method of claim 8, further comprising storing an architectural state before executing the amended instruction stream.

11. The method of claim 10, further comprising
measuring a snoop response;
comparing the measured snoop response to a response threshold to determine whether the measured snoop response is greater than the response threshold;
raising an interrupt based on a determination that the measured snoop response is greater than the response threshold;
processing the raised interrupt;
restoring the stored architectural state; and
restarting execution from the instruction stream.

12. The method of claim 8, wherein the first starting instruction of the first region is marked with a first instance of the protection designator and the first ending instruction of the first region is marked with a first instance of the clear designator, and the method further comprises:
identifying a second region of the instruction stream, the second region including a second redundant store;
marking a second starting instruction of the second region with a second instance of the protection designator;
marking a second ending instruction of the second region with a second instance of the clear designator;
marking the first starting instruction and the first ending instruction of the first region with a first assigned memory number; and
marking the second starting instruction and the second ending instruction of the second region with a second assigned memory number;
wherein storing the amended instruction stream comprises storing the first and second assigned memory numbers.

13. The method of claim 8, wherein identifying the first region comprises determining a destination address of the first redundant store based on a previously executed instruction.

* * * * *